(12) United States Patent
Iizuka et al.

(10) Patent No.: US 10,609,005 B2
(45) Date of Patent: *Mar. 31, 2020

(54) SECURITY NETWORK CONTROLLER

(71) Applicant: Cypress Semiconductor Corporation, San Jose, CA (US)

(72) Inventors: Kenichi Iizuka, Kanagawa (JP); Kumiko Toshimori, Kanagawa (JP); Machiko Mikami, Kanagawa (JP)

(73) Assignee: Cypress Semiconductor Corporation, San Jose, CA (US)

( * ) Notice: Subject to any disclaimer, the term of this patent is extended or adjusted under 35 U.S.C. 154(b) by 86 days.

This patent is subject to a terminal disclaimer.

(21) Appl. No.: 15/897,867

(22) Filed: Feb. 15, 2018

(65) Prior Publication Data

US 2018/0295111 A1    Oct. 11, 2018

Related U.S. Application Data

(60) Continuation of application No. 15/181,201, filed on Jun. 13, 2016, now Pat. No. 9,942,207, which is a (Continued)

(51) Int. Cl.
*H04L 29/06* (2006.01)
*G06F 13/38* (2006.01)
(Continued)

(52) U.S. Cl.
CPC .......... *H04L 63/0471* (2013.01); *G06F 13/24* (2013.01); *G06F 13/28* (2013.01);
(Continued)

(58) Field of Classification Search
CPC ..... G06F 13/24; G06F 13/385; G06F 13/4063
See application file for complete search history.

(56) References Cited

U.S. PATENT DOCUMENTS

| 4,030,074 A * | 6/1977 | Giorcelli | G06F 11/1407 |
| | | | 714/11 |
| 4,047,157 A * | 9/1977 | Jenkins | G06F 13/4022 |
| | | | 710/38 |

(Continued)

FOREIGN PATENT DOCUMENTS

| JP | 04369756 A | 12/1992 |
| JP | 07121474 A | 5/1995 |

(Continued)

OTHER PUBLICATIONS

Akihiro Ebina, et al., "Proposing IPsec Implementation for an embedded system", Proceedings of the 65th National Convention of the Information Processing Society of Japan, vol. 1, Mar. 25, 2003; pp. 1-55 to 1-56.

(Continued)

*Primary Examiner* — Joseph P Hirl
*Assistant Examiner* — Sayed Aresh Beheshti Shirazi

(57) ABSTRACT

A method includes using a direct memory access controller, transferring first data from a memory to an input/output control circuit via a first bus and transferring the first data from the input/output control circuit to an authentication processing circuit via a second bus, without using the first bus. The method includes using the authentication processing circuit, generating authentication data based on the first data and transferring the first data from the input/output control circuit to a cryptography processing circuit via a third bus, without using the first bus. Responsive to authentication of the first data by a first CPU coupled to the first bus, the method includes using the cryptography processing circuit, decrypting the first data, and using the direct memory access controller, transferring the decrypted first data from the input/output control circuit to the memory via the first bus.

20 Claims, 49 Drawing Sheets

Related U.S. Application Data continuation of application No. 14/297,200, filed on Jun. 5, 2014, now Pat. No. 9,378,165, which is a continuation of application No. 12/580,993, filed on Oct. 16, 2009, now Pat. No. 8,832,460, which is a division of application No. 10/790,176, filed on Mar. 2, 2004, now abandoned.

(51) Int. Cl.

| | | |
|---|---|---|
| *G06F 13/24* | (2006.01) | |
| *G06F 13/40* | (2006.01) | |
| *G06F 13/28* | (2006.01) | |
| *G06F 21/60* | (2013.01) | |
| *G06F 21/72* | (2013.01) | |
| *H04L 9/06* | (2006.01) | |

(52) U.S. Cl.
CPC ........ *G06F 13/385* (2013.01); *G06F 13/4063* (2013.01); *G06F 21/602* (2013.01); *G06F 21/72* (2013.01); *H04L 9/0643* (2013.01)

(56) References Cited

U.S. PATENT DOCUMENTS

| | | | | |
|---|---|---|---|---|
| 4,954,983 | A | * | 9/1990 | Klingman ........... G06F 13/4226 710/11 |
| 5,167,020 | A | * | 11/1992 | Kahn .................. G06F 11/2221 711/119 |
| 5,535,341 | A | | 7/1996 | Shah et al. |
| 5,761,464 | A | | 6/1998 | Hopkins |
| 5,778,071 | A | | 7/1998 | Caputo et al. |
| 5,825,878 | A | * | 10/1998 | Takahashi ............. G06F 21/79 713/190 |
| 5,898,848 | A | * | 4/1999 | Gulick ............. G06F 13/4022 710/310 |
| 5,964,859 | A | * | 10/1999 | Steinbach ........... G06F 13/4059 710/310 |
| 6,134,638 | A | * | 10/2000 | Olarig ................. G06F 13/1694 710/112 |
| 6,295,604 | B1 | * | 9/2001 | Callum ................ G06F 21/602 713/160 |
| 6,378,072 | B1 | * | 4/2002 | Collins ................ G06F 21/572 713/161 |
| 6,394,905 | B1 | * | 5/2002 | Takeda .................... A63F 13/02 463/29 |
| 6,438,666 | B2 | * | 8/2002 | Cassagnol ........... G06F 21/6245 711/103 |
| 6,477,646 | B1 | * | 11/2002 | Krishna ................ G06F 9/3879 712/E9.066 |
| 6,704,871 | B1 | * | 3/2004 | Kaplan .................. G06F 21/72 713/192 |
| 6,757,763 | B1 | * | 6/2004 | Preiss .................. G06F 13/387 710/105 |
| 6,901,516 | B1 | * | 5/2005 | Howard ............. H04L 41/0893 380/201 |
| 6,983,366 | B1 | * | 1/2006 | Huynh .................. H04L 9/0643 713/168 |
| 7,158,637 | B2 | | 1/2007 | Ohta et al. |
| 7,194,088 | B2 | * | 3/2007 | Langston .................. G06F 7/72 380/28 |
| 8,832,460 | B2 | | 9/2014 | Iizuka et al. |
| 9,378,165 | B2 | | 6/2016 | Iizuka et al. |
| 2001/0006520 | A1 | * | 7/2001 | Moulsley .......... H04L 12/40058 370/364 |
| 2001/0052070 | A1 | | 12/2001 | Oishi et al. |
| 2002/0078466 | A1 | | 6/2002 | Beyda |
| 2002/0078468 | A1 | | 6/2002 | Yazawa |
| 2002/0083317 | A1 | | 6/2002 | Ohta et al. |
| 2002/0129272 | A1 | * | 9/2002 | Terrell .................. H04L 63/083 726/15 |
| 2002/0188839 | A1 | | 12/2002 | Noehring et al. |
| 2002/0191790 | A1 | | 12/2002 | Anand et al. |
| 2002/0194401 | A1 | * | 12/2002 | Sakugawa ............... G06F 13/30 710/28 |
| 2003/0131250 | A1 | * | 7/2003 | Quere ..................... G06F 21/72 713/189 |
| 2004/0061783 | A1 | * | 4/2004 | Choi ................... H04N 1/00204 348/207.1 |
| 2004/0117642 | A1 | * | 6/2004 | Mowery ................. G06F 21/72 713/193 |
| 2004/0136368 | A1 | * | 7/2004 | Wakayama ............. H04L 29/06 370/389 |
| 2004/0172581 | A1 | * | 9/2004 | Tamura ............... G06F 11/1008 714/718 |
| 2004/0193763 | A1 | * | 9/2004 | Iizuka ................... G06F 13/385 710/52 |
| 2008/0209203 | A1 | * | 8/2008 | Haneda .................... G06F 21/72 713/150 |
| 2011/0086616 | A1 | * | 4/2011 | Brand .................... G06Q 20/10 455/411 |
| 2016/0366114 | A1 | | 12/2016 | Iizuka et al. |

FOREIGN PATENT DOCUMENTS

| | | |
|---|---|---|
| JP | 08202650 A | 8/1996 |
| JP | 11018122 | 1/1999 |
| JP | 11500241 A | 1/1999 |
| JP | 11161162 A | 6/1999 |
| JP | 2001175605 | 6/2001 |
| JP | 2002163105 A | 6/2002 |
| JP | 2002287620 A | 10/2002 |
| JP | 2003005636 A | 1/2003 |
| JP | 2003022248 A | 1/2003 |
| JP | 2003032244 | 1/2003 |
| WO | 9718652 A | 5/1997 |

OTHER PUBLICATIONS

Katsuhiko Aoki, et al., "Encryption Authentication Hardwarde Accelerator," NTT Technical Review, Mar. 1999, vol. 11, No. 3; pp. 17-22.

Mariko Kasai, et al.,"A High-performance Method for IPsec Processing," Information Processing Society of Japan Reports, vol. 2001,No. 15, Feb. 21, 2001; pp. 67-72.

Toshikazu Yamaguchi, et al., "An implementation for LAN cipher communications and its evaluation," Information Processing Society of Japan Reports, vol. 93, No. 508, Mar. 11, 1994; pp. 7-12.

USPTO Advisory Action for U.S. Appl. No. 14/297,200 dated Oct. 22, 2015; 3 pages.

USPTO Advisory Action for U.S. Appl. No. 15/181,201 dated Aug. 11, 2017; 3 pages.

USPTO Final Rejection for U.S. Appl. No. 10/790,176 dated Feb. 21, 2007; 6 pages.

USPTO Final Rejection for U.S. Appl. No. 10/790,176 dated Jul. 1, 2008; 6 pages.

USPTO Final Rejection for U.S. Appl. No. 10/790,176 dated Aug. 6, 2009; 6 pages.

USPTO Final Rejection for U.S. Appl. No. 12/580,993 dated Aug. 30, 2012; 13 pages.

USPTO Final Rejection for U.S. Appl. No. 12/580,993 dated Nov. 1, 2013; 9 pages.

USPTO Final Rejection for U.S. Appl. No. 14/297,200 dated Sep. 10, 2015; 22 pages.

USPTO Final Rejection for U.S. Appl. No. 15/181,201 dated Jun. 27, 2017; 36 pages.

USPTO Non-Final Rejection for U.S. Appl. No. 10/790,176 dated Sep. 12, 2007; 7 pages.

USPTO Non-Final Rejection for U.S. Appl. No. 10/790,176 dated Jun. 13, 2006; 6 pages.

USPTO Non-Final Rejection for U.S. Appl. No. 10/790,176 dated Dec. 29, 2008; 7 pages.

USPTO Non-Final Rejection for U.S. Appl. No. 12/580,993 dated Jan. 23, 2012; 11 pages.

USPTO Non-Final Rejection for U.S. Appl. No. 12/580,993 dated Jul. 25, 2013; 11 pages.

(56) References Cited

OTHER PUBLICATIONS

USPTO Non-Final Rejection for U.S. Appl. No. 14/297,200 dated Apr. 7, 2015; 22 pages.
USPTO Non-Final Rejection for U.S. Appl. No. 15/181,201 dated Apr. 6, 2017; 30 pages.
USPTO Notice of Allowance for U.S. Appl. No. 12/580,993 dated Feb. 28, 2014; 14 pages.
USPTO Notice of Allowance for U.S. Appl. No. 15/181,201 dated Nov. 16, 2017; 22 pages.
USPTO Notice of Allowance for U.S. Appl. No. 14/297,200 dated Feb. 26, 2016; 7 pages.
USPTO Restriction Requirement for U.S. Appl. No. 10/790,176 dated Apr. 21, 2006; 4 pages.
Yasushi Nagai, et al., "Implementation of IPsec Hardware," Proceedings of the 65th National Convention of the Information Processing Society of Japan, vol. 1, Mar. 25, 2003; pp. 1-57 to 1-58.

* cited by examiner

| BIT | BIT NAME | INITIAL VALUE | R/W | FUNCTION |
|---|---|---|---|---|
| 31:10 | - | 0 | - | RESERVED |
| 7:6 | TX_FIFO | 00 | R | STATUS OF TX_FIFO<br>INDICATE STATUS OF TX_FIFO<br>00: NO DATA EXISTS IN TX_FIFO OR DATA HAS BEEN CLEARED<br>01: DATA EXISTS IN TX_FIFO<br>10: TX_FIFO IS FULL OF DATA<br>11: RESERVED |
| 5:4 | RX_FIFO_B | 00 | R | STATUS OF RX_FIFO: SIDE-B<br>INDICATES STATUS OF TWO-SIDED RX_FIFO (SIDE-A/SIDE-B)<br>00: NO DATA EXISTS IN RX_FIFO (SIDE-B) OR DATA HAS BEEN CLEARED<br>01: DATA EXISTS IN RX_FIFO (SIDE-B)<br>10: RX_FIFO (SIDE-B) IS FULL OF DATA<br>11: RESERVED |
| 3:2 | RX_FIFO_A | 00 | R | STATUS OF RX_FIFO: SIDE-A<br>INDICATES STATUS OF TWO-SIDED RX_FIFO (SIDE-A/SIDE-B)<br>00: NO DATA EXISTS IN RX_FIFO (SIDE-A) OR DATA HAS BEEN CLEARED<br>01: DATA EXISTS IN RX_FIFO (SIDE-A)<br>10: RX_FIFO (SIDE-A) IS FULL OF DATA<br>11: RESERVED |
| ... | ... | ... | ... | ... |

FIG. 4

| BIT | BIT NAME | INITIAL VALUES | R/W | FUNCTION |
|---|---|---|---|---|
| ... | ... | ... | ... | ... |
| 1 | TX_REG_OUT | 0 | R | TX_REG REGISTER OUTPUT STATUS<br>INDICATES DATA OUTPUT STATUS OF TX_REG REGISTER<br>※READ-CLEARING<br>0 : NO DATA OUTPUT FROM TX_REG REGISTER OR DATA HAS BEEN CLEARED<br>1 : DATA IS OUTPUT FROM TX_REG REGISTER |
| 0 | RX_REG_IN | 0 | R | RX_REG REGISTER INPUT STATUS<br>INDICATES DATA INPUT STATUS OF RX_REG REGISTER<br>※READ-CLEARING<br>0 : NO DATA INPUT TO RX_REG REGISTER OR DATA HAS BEEN CLEARED<br>1 : DATA IS INPUT TO RX_REG REGISTER |

FIG. 5

EXAMPLE OF CONFIGURATION OF SIGNALS VIA INTERNAL BUS

| TERMINAL NAME | NAME | INPUT/ OUTPUT | FUNCTION |
|---|---|---|---|
| MCLKI | CLOCK SIGNAL | I | INPUT OF CLOCK SIGNAL |
| RSTXI | RESET SIGNAL | I | INPUT OF RESET SIGNAL |
| A0[3:0] | ADDRESS SIGNAL | I | INPUT OF ADDRESS SIGNAL |
| DO[31:0] | WRITE DATA SIGNAL | I | INPUT OF WRITE DATA |
| DI[31:0] | READ DATA SIGNAL | O | OUTPUT OF READ DATA |
| RDXO | READ STROBE SIGNAL | I | INPUT OF READ STROBE SIGNAL ACTIVE-LOW |
| WRXO[3:0] | WRITE STROBE SIGNAL | I | INPUT OF WRITE STROBE SIGNAL ACTIVE-LOW |
| CSX | CHIP SELECT SIGNAL | I | INPUT OF CHIP SELECT SIGNAL ACTIVE-LOW |
| INT | INTERRUPT SIGNAL | O | OUTPUT OF INTERRUPT SIGNAL ACTIVE-HIGH |

FIG. 8

EXAMPLE OF CONFIGURATION OF SIGNALS VIA EXTERNAL TERMINAL.

| TERMINAL NAME | NAME | INPUT/OUTPUT | FUNCTION |
|---|---|---|---|
| EX_DI[15:0] | INPUT DATA SIGNAL | I | INPUT OF DATA. |
| EX_DO[15:0] | OUTPUT DATA SIGNAL | O | OUTPUT OF DATA. |
| EX_DOE | DATA BUS DIRECTION SWITCHING SIGNAL | O | OUTPUT OF DATA BUS DIRECTION SWITCHING SIGNAL. |
| EX_CSX | CHIP SELECT SIGNAL | I | INPUT OF CHIP SELECT SIGNAL. ACTIVE-LOW |
| EX_A | ADDRESS SIGNAL | I | INPUT OF ADDRESS SIGNAL. "0" FOR REGISTER SELECTION AND "1" FOR FIFO SELECTION |
| EX_RDX | READ STROBE SIGNAL | I | INPUT OF READ STROBE SIGNAL. ACTIVE-LOW |
| EX_WRX | WRITE STROBE SIGNAL | I | INPUT OF WRITE STROBE SIGNAL. ACTIVE-LOW |
| RX_DRQX | RECEIVE DATA-RELATED REQUEST SIGNAL | O | OUTPUT OF RECEIVE DATA-RELATED REQUEST SIGNAL. ACTIVE-LOW ASSERTED "LOW" UNTIL RECEIVE FIFO BECOMES FULL. |
| TX_DRQX | TRANSMIT DATA-RELATED REQUEST SIGNAL | O | OUTPUT OF TRANSMIT DATA-RELATED REQUEST SIGNAL. ACTIVE-LOW ASSERTED "LOW" WHEN READABLE DATA EXISTS IN TRANSMIT REGISTER OR TRANSMIT INTERNAL RAM. |

3DES-CBC-CRYPTOGRAPHIC PROCESSING
1466-BYTE DATA PROCESSING PERFORMANCE SPEED UNIT/ $\mu s\,cc$

| | 3DES-CBC-ENCRYPTION | 3DES-CBC-DECRYPTION |
|---|---|---|
| SOFTWARE | 264917 | 264919 |
| CPU + CRYPTOGRAPHIC PROCESSING CIRCUIT | 2977 | 2979 |
| Pico CONTROL CIRCUIT + CRYPTOGRAPHIC PROCESSING CIRCUIT | 679 | 681 |

FIG. 43

HMAC-SHA1 HASH FUNCTION PROCESSING
1500-BYTE DATA PROCESSING PERFORMACE   SPEED UNIT/μsec

|  | HMAC-SHA1 |
|---|---|
| SOFTWARE | 41309 |
| CPU + HASH FUNCTION PROCESSING CIRCUIT | 2258 |
| IPsec CONTROL CIRCUIT + HASH FUNCTION PROCESSING CIRCUIT | 297 |

FIG. 44

SECURITY NETWORK CONTROLLER

CROSS-REFERENCE TO RELATED APPLICATIONS

This application is a continuation of U.S. application Ser. No. 15/181,201, filed on Jun. 13, 2016, which is a Continuation of U.S. application Ser. No. 14/297,200, filed on Jun. 5, 2014, now U.S. Pat. No. 9,378,165, issued on Jun. 28, 2016, which is a continuation of U.S. application Ser. No. 12/580,993, filed on Oct. 16, 2009, now U.S. Pat. No. 8,832,460, issued on Sep. 9, 2014, which is a Division of U.S. application Ser. No. 10/790,176, filed on Mar. 2, 2004, now abandoned, which claims the benefit of priority from Japanese Patent Application No. 2003-090293, filed on Mar. 28, 2003, and Japanese Patent Application No. 2003-112992, filed on Apr. 17, 2003, all of which are incorporated by reference herein in their entirety.

BACKGROUND OF THE INVENTION

(1) Field of the Invention

This invention relates to an inter-bus communication interface device for transmitting/receiving data between a plurality of buses, and a data security device for carrying out secure communication, and more particularly to an inter-bus communication interface device for carrying out transfer of data via a buffer, and a data security device capable of carrying out cryptographic processing by using a hardware circuit.

(2) Description of the Related Art

Electronic equipment, such as a video camera and the like, sometimes includes an information processing unit for performing predetermined processing, in addition to a CPU (Central Processing Unit) for control of the whole equipment. For example, when electronic equipment is connected to a LAN (Local Area Network), a LAN interface containing the CPU can be mounted in the equipment to carry out highly sophisticated processing, such as encryption of communication data.

Data communication is carried out as required between an information processing unit containing the CPU (hereinafter referred to as the "internal CPU") and an external host apparatus (hereinafter referred to as the "external host") for control of the whole electronic equipment. The external host as well contains a CPU, and in an interface of various kinds of devices and apparatuses requiring data communication with such an external device or apparatus, a buffer called a FIFO (First-In First-Out) is generally used to secure transfer efficiency. The FIFO is a buffer of a type that outputs data in the order that the data are stored. Data transmitted/received between the external host and the internal CPU is once written in the FIFO, and then read out from the FIFO by the opposite party of communication.

FIG. 46 is a conceptual view showing a method employed by the internal CPU in receiving data from the external host. As shown in FIG. 46, a receive FIFO 920 for receiving data is disposed between the external host 910 and the internal CPU 930. In the illustrated example, it is assumed that the FIFO 920 includes a buffer area for storing data, and an interrupt-generating circuit for asserting an interrupt signal when the buffer area is full of data.

The external host 910 writes communication data into the FIFO 920 (step S101). Then, the FIFO 920 asserts an interrupt signal (step S102). The internal CPU 930 having detected the interrupt signal reads the communication data therein from the FIFO 920 (step S103).

FIG. 47 is a flowchart showing the procedure of operations executed in a process for receiving data from the external host by the internal CPU. In the following, the process shown in FIG. 47 will be described in the order of step numbers.

[Step S111] The external host 910 writes data into the FIFO 920. It should be noted that the external host 910 adds data end information to a trailing end of data to be transferred. After the data end information is added, when the FIFO 920 has an empty area, the external host 910 writes invalid data (e.g. data formed by only "0") so as to fill the FIFO 920 becomes with data.

[Step S112] If the buffer area is not full of data by determination of the FIFO 920 as to whether or not the buffer area in the FIFO 920 is full of data, the step S111 is repeatedly carried out.

[Step S113] If the buffer area is full of data by determination of the FIFO 920 as to whether or not the buffer area in the FIFO 920 is full of data, the process proceeds to a step S114.

[Step S114] The FIFO 920 asserts an interrupt signal.

[Step S115] The internal CPU 930 reads out data in the FIFO 920, when it has detected the assertion of the interrupt signal.

[Step S116] When the FIFO 920 becomes empty of data, the internal CPU 930 terminates the reading of data, and the process proceeds to the step S111. After that, following data is written in the FIFO 920 by the external host 910.

[Step S117] Further, whenever the internal CPU 930 reads out data from the FIFO 920, it always checks whether or not the data read out is the data end information. When the data end information is detected, the internal CPU 930 terminates the data-receiving process.

FIG. 48 is a conceptual view showing a method employed by the internal CPU for transmitting data to the external host. As shown in FIG. 48, a transmit FIFO 940 for transmitting data is disposed between the external host 910 and the internal CPU 930. It should be noted that the FIFO 940 includes a buffer area for storing data, and a circuit for asserting a transmit data-related request signal when the buffer area is full of data.

The internal CPU 930 writes communication data in the FIFO 940 (step S121). Then, the FIFO 940 asserts the transmit data-related request signal (step S122). The external host 910 having detected the transmit data-related request signal reads the communication data therein from the FIFO 940 (step S123).

FIG. 49 is a flowchart showing the procedure of operations executed in a process for transmitting data to the external host by the internal CPU. In the following, the process shown in FIG. 49 will be described in the order of step numbers.

[Step S131] The internal CPU 930 writes data into the FIFO 940.

[Step S132] The FIFO 940 asserts the transmit data-related request signal.

[Step S133] The external host 910 reads data from the buffer area in the FIFO 940.

[Step S134] If the FIFO 940 is not empty, the external host 910 continues the reading of data in the step S133.

[Step S135] If the FIFO 940 becomes empty of data, the external host 910 terminates the reading of data.

As described above, the transmission/reception of data via the FIFO is carried out.

Although in the above example, the termination of writing of data into the FIFO 920 is notified by the assertion of the interrupt signal when data is transferred from the external host 910 to the internal CPU 930, this is not limitative, but the termination of writing of data into the FIFO 920 can be notified by another method. For example, if there is provided a request circuit for transmitting a reading request, a reading request can be transmitted via the circuit (as disclosed e.g. in Japanese Unexamined Patent Publication (Kokai) No. H11-18122, FIGS. 1 and 2).

SUMMARY OF THE INVENTION

In the conventional technique, however, to detect the trailing end of data transferred from the external host 910 to the internal CPU 930, the internal CPU 930 has to sequentially analyze the contents of the data, which has imposes an excess load on the internal CPU. Moreover, since all the data required for communication are transferred via the FIFOs 920 and 940, it is impossible to change communication control information during execution of transmission/reception of data.

Further, although the internal CPU 930 starts to read data from the FIFOs 920 and 940 in response to the interrupt signal, unless the FIFOs 920 and 940 are full of data, all the data in the FIFOs cannot be read by interrupt control. To overcome this problem, invalid data is required to be added to the trailing end of data by the external host 910 to cause the amount of data in the FIFOs 920 and 940 to reach a fixed value. Consequently, data to be written into the FIFOs 920 and 940 by software is processed by the external host 910, resulting in an increased time period of execution therefor. This offers an obstacle to high-speed communication.

It should be noted that the above request circuit disclosed in Japanese Unexamined Patent Publication (Kokai) No. 11-18122 simply transmits a reading request, and it cannot be used for transmitting desired control information concerning data communication. More specifically, the processing for asserting the interrupt signal (step S102) in FIG. 46 is simply replaced by processing for setting a request for reading data into the request circuit. Furthermore, in response to the setting the reading request, the reading of data is started by the opposite party of communication, and therefore, writing of information other than the reading request in the request circuit makes it impossible to perform normal data communication.

Further, the input or output of data sometimes involves encryption or decryption of the data. The processing for encryption or decryption of data imposes a excessively heavy load on the internal CPU, so that to input or output data efficiently, it is important to make the process for encryption or decryption of data to be transferred, more efficient than ever.

The present invention has been made in view of above described points to be improved, and a first object thereof is to provide an inter-bus communication interface device, an information processing unit, an external host apparatus, and an inter-bus communication control method, which are capable of efficiently performing transfer of data between a plurality of devices connected to different buses.

A second object of the present invention is to provide a data security device, a data communication device, and a data-securing method, which are capable of performing cryptographic processing at a high speed irrespective of the processing performance of CPUs.

To attain the first object, there are provided an inter-bus communication interface device, an information processing unit, an external host apparatus, and an inter-bus communication control method.

The inter-bus communication interface device controls data communication between a first bus and a second bus and is characterized by comprising a buffer for storing communication data sent from a first device connected to the first bus, a register for storing communication control information concerning the communication data, and a control circuit for passing the communication data stored in the buffer to a second device connected to the second bus, and passing the communication control information stored in the register to the second device.

The information processing unit carries out information processing in cooperation with an external host apparatus connected thereto via an external connection bus, and is characterized by comprising an internal CPU, a receive buffer for storing receive data received from the external host apparatus, a receive register for storing receive communication control information concerning the receive data, a transmit buffer for storing transmit data transmitted from the internal CPU via an internal bus, a transmit register for storing transmit communication control information concerning the transmit data, and a control circuit for passing the receive data stored in the receive register to the internal CPU and passing the receive communication control information stored in the receive register to the internal CPU, and further passing the transmit data stored in the transmit buffer to the external host apparatus and passing the transmit communication control information stored in the transmit register to the external host apparatus.

The external host apparatus carries out processing in cooperation with an information processing unit for performing specific information processing, and is characterized by comprising data-reading unit for reading transmit data into a transmit buffer within the information processing unit by designating an address of the transmit buffer in response to a transmit data-related request signal for requesting reception of transmit data outputted from the information processing unit, and reading transmit communication control information into a transmit register within the information processing unit by designating an address of the transmit register, and data-writing means for writing receive data into a receive buffer within the information processing unit by designating an address of the receive buffer in response to a receive data-related request signal outputted from the information processing unit for indicating that data can be received, and writing receive communication control information into a receive register within the information processing unit by designating an address of the receive register.

The inter-bus communication control method controls data communication between a first device connected to a first bus and a second device connected to a second bus, via an inter-bus communication interface device, and is characterized by comprising the steps of causing the first device to store communication data to be passed to the second device in a buffer within the inter-bus communication interface device, causing the first device to store communication control information concerning the communication data in a register within the inter-bus communication interface device, causing the inter-bus communication interface device to output an interrupt signal to the second device, when the buffer is full of the communication data, or when the communication control information is stored in the register, and causing the second device to read out the communication data in the buffer or the communication control information in the register in response to the interrupt signal.

To attain the second object, there are provided a data security device, a data communication device, and a data security method.

The data security device carries out processing for securing data, and is characterized by comprising a data-acquiring circuit for acquiring data to be processed, a cryptographic processing circuit for performing cryptographic processing of input data, and a data input/output control circuit connected to the data-acquiring circuit via a first bus and connected to the cryptographic processing circuit via a second bus, for acquiring the data to be processed which is acquired by the data-acquiring circuit via the first bus, for storage in an internal memory thereof, inputting the data to be processed to the cryptographic processing circuit via the second bus, and acquiring result data as a result of execution of the cryptographic processing from the cryptographic processing circuit via the second bus.

The data communication device transmits/receives secured data via a network, and is characterized by comprising a main CPU for generating transmit data, a cryptographic processing circuit for encrypting input data, a communication circuit for transmitting the input data via the network, and a data input/output control circuit connected to the main CPU and the communication circuit via a first bus and connected to the cryptographic processing circuit via a second bus, for acquiring the transmit data acquired by the main CPU via the first bus, for storage in an internal memory thereof, inputting the transmit data to the cryptographic processing circuit via the second bus, acquiring encrypted data from the cryptographic processing circuit via the second bus, and inputting the encrypted data to the communication circuit.

The data-securing method of securing data is characterized by comprising the steps of causing a data input/output control circuit to acquire data to be process which is acquired by a data-acquiring circuit, via a first bus, for storage in an internal memory thereof, causing the data input/output control circuit to input the data to be processed to an authentication processing circuit via a second bus, and causing the authentication processing circuit to carry out authentication processing of the data to be processed.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 is a first diagram showing an example of the data structure of data stored in a status register;

FIG. 5 is a second diagram showing the remaining part of the data structure of the data stored in the status register;

FIG. 8 is a diagram showing an example of configuration of signals in the internal bus;

FIG. 9 is a diagram showing an example of configuration of signals of the external connection interface;

FIG. 33 is a first diagram showing operations of each circuit for cryptographic processing in a time sequence;

FIGS. 39A and 39B are diagrams useful in explaining the respective ranges of encryption and authentication in the transport mode ESP, in which FIG. 39(A) shows an IPv4 packet, while FIG. 39(B) shows an IPv6 packet;

FIG. 43 is a diagram showing results of evaluations of performance of the cryptographic processing by the prior art and that of the cryptographic processing by the second embodiment;

FIG. 44 is a diagram showing results of evaluations of performance of the hash function processing by the prior art and that of the hash function processing by the second embodiment;

DESCRIPTION OF THE PREFERRED EMBODIMENTS

The present invention will now be described in detail with reference to the accompanying drawings showing preferred embodiments thereof.

First Embodiment

First, the outline of the invention applied to the first embodiment will be described, and then a description will be give of details of the first embodiment.

Figure 1:
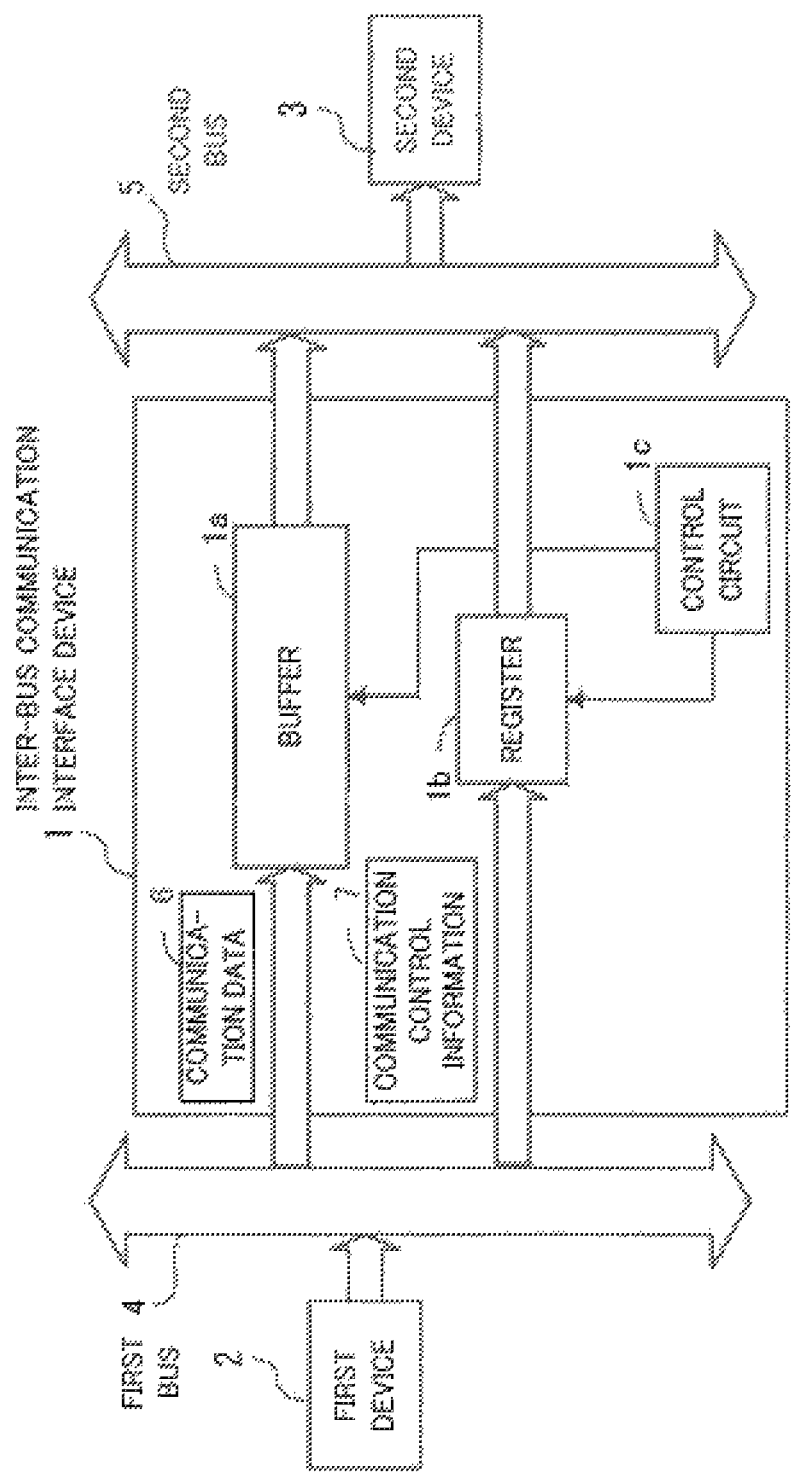
FIG. 1 is a conceptual diagram of the invention applied to a first embodiment of the present invention.

FIG. 1 is a conceptual diagram of the invention applied to the first embodiment. An inter-bus communication interface device 1 controls data communication between a first bus 4 and a second bus 5. A first device 2 is connected to the first bus 4, while a second device 3 is connected to the second bus 5. The inter-bus communication interface device 1 includes a buffer 1a, a register 1b, and a control circuit 1c. The buffer 1a stores communication data 6 sent from the first device 2 connected to the first bus 4. The register 1b stores communication control information 7 of the communication data 6. The control circuit 1c passes the communication data 6 stored in the buffer 1a to the second device 3 connected to the second bus 5 and passes the communication control information 7 stored in the register 1b to the second device 3 at the same time.

In the device configured as above, to transmit communication data 6 from the first device 2, the communication data 6 is written into the buffer 1a, while to transmit communication control information 7 from the first device 2, the communication control information 7 is written into the register 1b. For example, when there is streaming communication data 6 to be transmitted, the first device 2 sequentially writes the communication data 6 into the buffer 1a. Then, when the writing of the communication data 6 has been completed, the first device 2 writes data end information indicative of the end of the communication data 6 into the register 1b, as communication control information 7. This causes the communication data 6 to be transferred from the first device 2 to the second device 3 via the buffer 1a, and the communication control information 7 to be transferred from the first device 2 to the second device 3 via the register 1b.

As described above, the communication control information 7 is transferred via the register 1b provided separate from the buffer 1a storing the communication data 6, which simplifies a process executed in the second device 3 for discriminating between the communication data 6 and the communication control information 7. More specifically, the second device 3 can recognize that the data read from the buffer 1a is the communication data 6 and that the data read from the register 1b is the communication control information 7. Thus, data communication between the buses is performed efficiently. To be more specific, since the data end information is transferred via the register 1b, the second device 3 can recognize the end of the communication data 6 without analyzing the contents of the communication data 6. As a result, processing load on the second device 3 is reduced.

Although FIG. 1 shows only data communication from the first device 2 to the second device 3, it is also possible to perform data communication in the reverse direction with the same configuration. Hereafter, the first embodiment will be described in detail by taking the example of an information processing unit incorporating an inter-bus communication interface device capable of bi-directional communication to which the present invention is applied.

Figure 2:
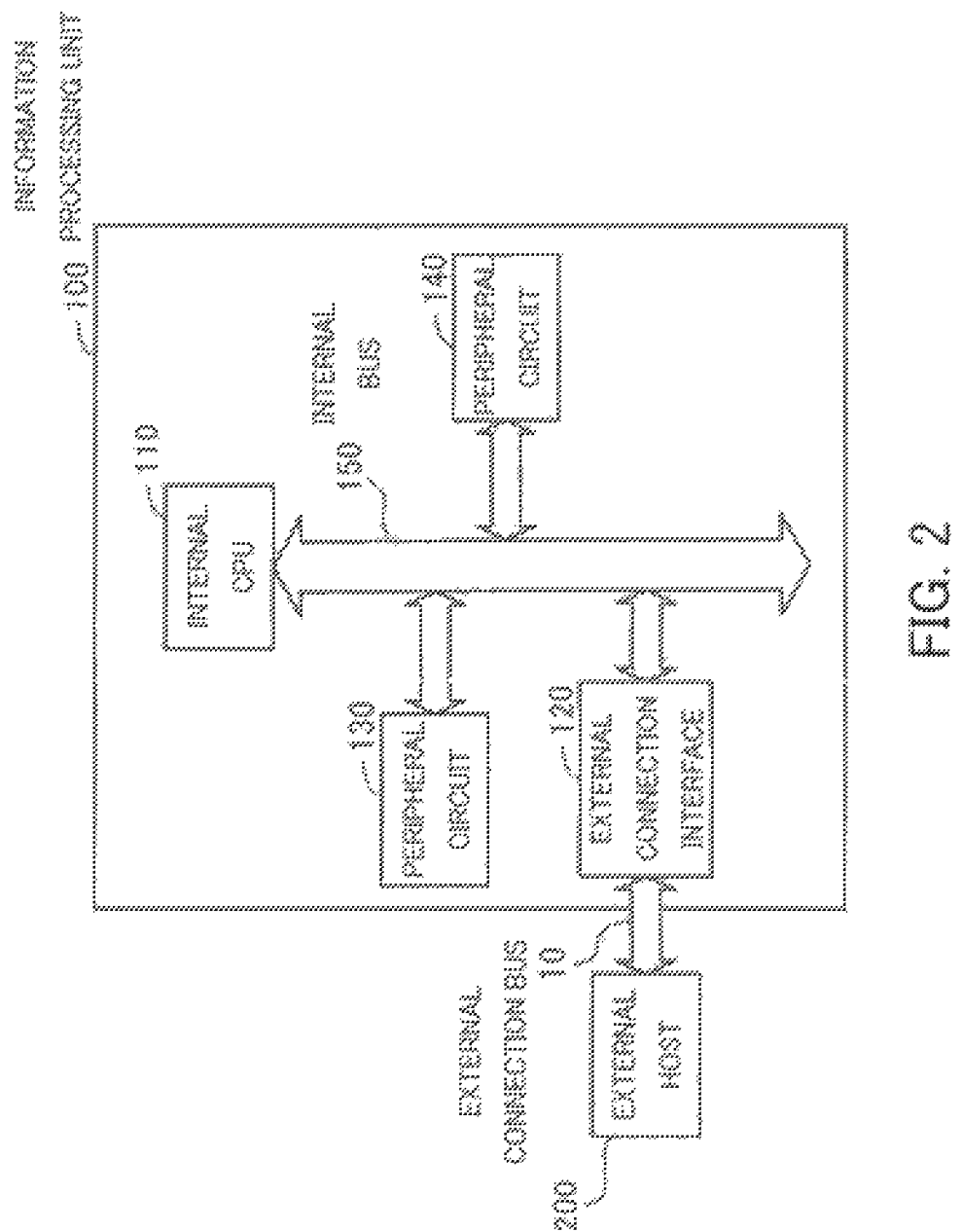
FIG. 2 is a diagram showing a hardware configuration of a device according to the first embodiment.

FIG. 2 is a diagram showing a hardware configuration of the device according to the first embodiment. As shown in FIG. 2, the information processing unit 100 is connected to an external host 200 via an external connection bus 10.

The information processing unit 100 is comprised of an internal CPU 110, an external connection interface 120, and peripheral circuits 130 and 140, all of which are interconnected via an internal bus 150.

The internal CPU 110 controls the overall operation of the information processing unit 100. The external connection interface 120 is connected to the external host 200 via the external connection bus 10, for relay of data communication between the external host 200 and the internal CPU 110. The peripheral circuits 130 and 140 are circuits for carrying out predetermined data processing. For example, the peripheral circuits 130 and 140 may be encryption/decryption circuits and a LAN communication circuit.

In the device having the circuit configuration described above, data communication is performed between the external host 200 and the internal CPU 110 within the information processing unit 100 via the external connection interface 120. In the following, the configuration of the external connection interface 120 will be described in detail.

Figure 3:
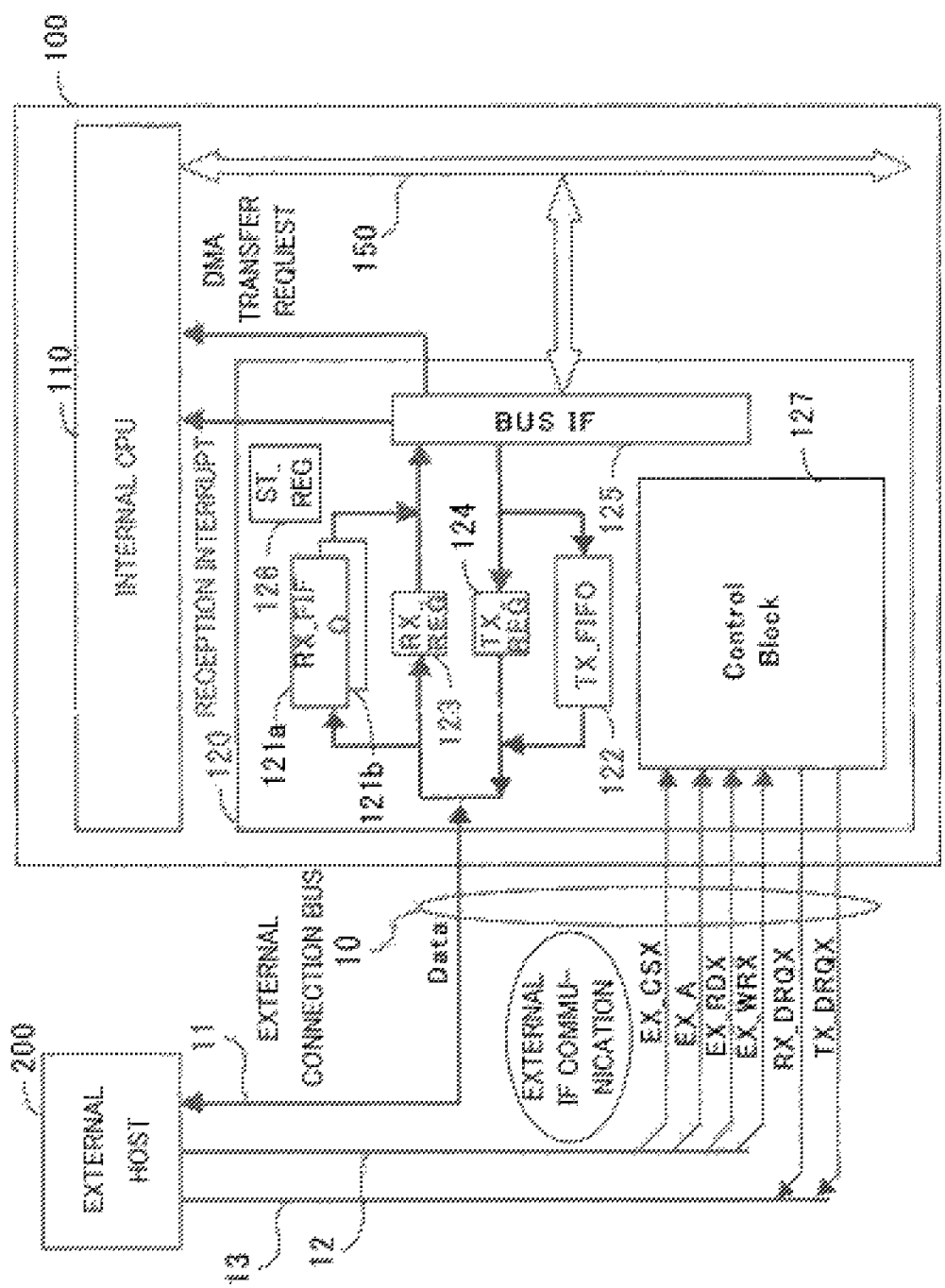
FIG. 3 is a diagram showing an example of the internal configuration of an external connection interface.

FIG. 3 is a diagram showing an example of the internal configuration of the external connection interface. The external connection bus 10 is comprised of a data bus 11, a control signal input bus 12, and a control signal output bus 13. The data bus 11 is a bus for bi-directional transfer of data communicated between the external host 200 and the information processing unit 100.

The control signal input bus 12 is a bus for inputting control signals from the external host 200 to the external connection interface 120. The control signal input bus 12 includes signal lines provided, respectively, for a chip select signal (EX_CSX), an address signal (EX_A), a read strobe signal (EX_RDX), and a write strobe signal (EX_WRX). The chip select signal (EX_CSX) is a signal that designates one of memory circuits (including FIFOs and various registers) to be accessed. The address signal (EX_A) is a signal that designates a storage area to be accessed in the memory circuit to be accessed. The read strobe signal (EX_RDX) is a signal that indicates the access is for reading. The write strobe signal (EX_WRX) is a signal that indicates the access is for writing.

The control signal output bus 13 is a bus for outputting control signals from the external connection interface 120 to the external host 200. The control signal output bus 13 includes signal lines provided, respectively, for a receive data-related request signal (RX_DRQX) and a transmit data-related request signal (TX_DRQX). The receive data-related request signal (RX_DRQX) is a signal that notifies the external host 200 that data can be received. The transmit data-related request signal (TX_DRQX) is a signal that notifies the external host 200 that there is data to be transmitted.

The external connection interface 120 is comprised of receive FIFOs (RX_FIFO) 121a and 121b, a transmit FIFO (TX_FIFO) 122, a receive register (RX_REG) 123, a transmit register (TX_REG) 124, a bus interface (BUS IF) 125, a status register (ST_REG) 126, and a control block 127.

The receive FIFOs 121a and 121b are data storage areas for storing data received from the external host 200. The receive FIFOs 121a and 121b are connected to the external host 200 via the data bus 11 within the external connection bus 10. The receive FIFOs 121a and 121b are also connected to the bus interface 125. The receive FIFOs 121a and 121b are configured as a double buffer formed by single-port buffers, wherein it is possible to read data from one of the receive FIFOs while storing data in the other receive FIFO. In the description of the first embodiment, the receive FIFO 121a is referred to as an A-side receive FIFO, and the receive FIFO 121b as a B-side receive FIFO. When storing and reading of data have been completed, the receive FIFO for storing and the receive FIFO for reading are swapped, and then storing and reading of data are continued.

The transmit FIFO 122 is a data storage area for storing data to be transmitted to the external host 200. The transmit FIFO 122 is connected to the external host 200 via the data bus 11 of the external connection bus 10. On the other hand, the receive FIFOs 121a and 121b are connected to the bus interface 125. In the first embodiment, the transmit FIFO 122 is implemented by a dual-port buffer which can perform data writing and data reading at the same time.

The receive register 123 is a storage area for storing communication control information such as data end information of receive data. The receive register 123 is connected between the data bus 11 of the external connection bus 10 and the bus interface 125, in parallel with the receive FIFOs 121a and 121b.

The transmit register 124 is a storage area for storing communication control data such as data end information of transmit data. The transmit register 124 is connected between the data bus 11 of the external connection bus 10 and the bus interface 125, in parallel with the transmit FIFO 122.

The bus interface 125 is an interface for communication with the internal CPU 110 via the internal bus 150. The bus interface 125 transmits data stored in the receive FIFOs 121a and 121b to the internal CPU 110 via the internal bus 150, and stores data from the internal CPU 110 in the transmit FIFO 122. Further, the bus interface 125 transmits signals, such as a reception interrupt signal and a DMA transfer request signal, to the internal CPU 110. The reception interrupt signal is asserted when the receive FIFOs 121a and 121b are filled with data or when data end information is stored in the receive register 123. The DMA transfer request signal is a signal asserted for execution of DMA transfer.

The status register 126 is a register that indicates the status of each of the FIFOs and the registers. The information registered in the status register 126 will be described in detail hereinafter (see FIGS. 4 and 5).

The control block 127 is a controller that controls the external connection interface 120. Although not shown in FIG. 3, the control block 127 is connected to other components. Further, the control block 127 is connected to the control signal input bus 12 and the control signal output bus 13 of the external connection bus 10.

Next, the data structure of the status register 126 will be described with reference to FIGS. 4 and 5.

FIG. 4 is a first diagram showing an example of the data structure of data stored in the status register. FIG. 5 is a second diagram showing the remaining part of the data structure of the data stored in the status register. The status register 126 is a 32-bit register. FIG. 4 shows information set to bit 31 to bit 2, and FIG. 5 shows information set to bit 1 and bit 0. In FIGS. 4 and 5, bit names, initial values, restrictions on access (permission/inhibition of read (R)/write (w)) by the internal CPU 110, and functions, are specifically shown for the bits.

As shown in FIG. 4, bits 31 to 10 are not used currently, but reserved for future use. The initial value thereof is "0".

Bits 7 and 6 have a bit name "TX_FIFO", and an initial value "00". These bits can be accessed only for read (R). The two bits indicate the status of the transmit FIFO 122. The value "00" indicates that no data exists in the transmit FIFO 122 or that data has been cleared. A value "01" indicates that data exists in the transmit FIFO 122. A value "10" indicates that the transmit FIFO 122 is full of data. A value "11" is reserved for future use.

Bits 5 and 4 have a bit name "RX_FIFO_B" and an initial value "00". These bits can be accessed only for read (R). The two bits indicate the status of the B-side receive FIFO 121b. The value "00" indicates that no data exists in the B-side receive FIFO 121b or that data has been cleared. A value "01" indicates that data exists in the B-side receive FIFO 121b. A value "10" indicates that the B-side receive FIFO 121b is full of data. A value "11" is reserved for future use.

Bits 3 and 2 have a bit name "RX_FIFO_A" and an initial value "0". These bits can be accessed only for read (R). The two bits indicate the status of the A-side receive FIFO 121a. The value "00" indicates that no data exists in the A-side receive FIFO 121a or that data has been cleared. A value "01" indicates that data exists in the A-side receive FIFO 121a. A value "10" indicates that the A-side receive FIFO 121a is full of data. A value "11" is reserved for future use.

Bit 1 has a bit name "TX_REG_OUT" and an initial value "0". This bit can be accessed only for read (R). The bit indicates the status of the transmit register 124. It should be noted that the value of this bit is cleared immediately after the data is read out (i.e. read-cleared). The value "0" indicates that there is no data outputted to the transmit register 124 or that data has been cleared. The value "1" indicates that there has been data outputted to the transmit register 124.

Bit 0 has a bit name "RX_REG_IN" and an initial value "0". This bit can be accessed only for read (R). The bit indicates the status of the receive register 123. It should be noted that the value of this bit is cleared immediately after the data is read out (i.e. read-cleared). The value "0" indicates that no data exists in the receive register 123 or that data has been cleared. A value "1" indicates that data exists in the receive register 123.

With the configuration described above, processes described below are executed.

First, a process for receiving data from the external host 200 will be described in detail.

Figure 6:
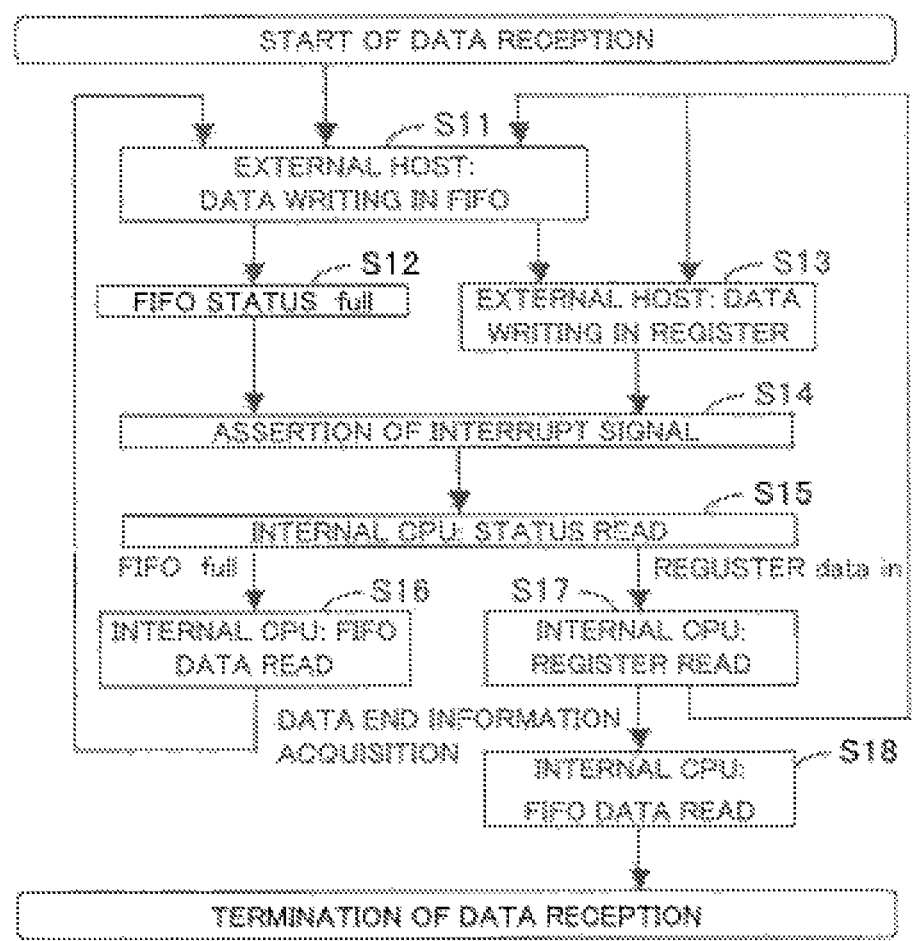
FIG. 6 is a flowchart showing the procedure of operations executed in a process for receiving data.

FIG. 6 is a flowchart showing the procedure of operations executed in the process for receiving data. In the following, the process shown in FIG. 6 will be described in the order of step numbers.

[Step S11] The external host 200 writes data into one of the receive FIFOs 121a and 121b. It should be noted that when writing of data in the receive FIFO 121a or 121b is started, information indicating that valid data exists in the receive FIFO in use for the writing is set in the status register 126. More specifically, if writing of data into the A-side receive FIFO 121a is executed, the value "01" is set to the bits 3 and 2 of the status register 126. On the other hand, if writing of data into the B-side receive FIFO 121b is executed, the value "01" is set to the bit 5 and 4 of the status register 126.

[Step S12] When the receive FIFO in use for the writing becomes full of data, the control block 127 of the external connection interface 120 detects the status, and the process proceeds to a step S14.

At this time, the control block 127 sets in the status register 126 the value indicating that the receive FIFO is full of data. More specifically, if the A-side receive FIFO 121a has become full of data, the value "10" is set to the bits 3 and 2 of the status register 126. On the other hand, if the B-side receive FIFO 121b has become full of data, the value "10" is set to the bits 5 and 4 of the status register 126.

Further, the control block 127 swaps the receive FIFOs for writing. More specifically, when the A-side receive FIFO 121a becomes full of data, the receive FIFO for use in writing by the external host 200 is switched to the B-side receive FIFO 121b. On the other hand, when the B-side receive FIFO 121b becomes full of data, the receive FIFO for use in writing by the external host 200 is switched to the A-side receive FIFO 121a. After the swapping of the receive FIFOs for writing, data sent from the external host 200 is written into the receive FIFO newly selected for writing, in parallel with execution of the steps S14 to S16.

[Step S13] Further, when it is time for transmission of communication control information, e.g. when writing of data to be transferred has been completed, the external host 200 writes communication control information, such as data end information, into the receive register 123. At the same time, the control block 127 sets in the status register 126 a value indicating that the communication control information has been set in the receive register 123. More specifically, the value "1" is set to the bit 0 of the status register 126.

[Step S14] When the receive FIFO becomes full of data or when the communication control information is written into the receive register 123, the control block 127 controls the bus interface 125 to assert an interrupt signal to the internal CPU 110.

[Step S15] In response to the assertion of the interrupt signal, the internal CPU 110 reads data from the status register 126 of the external connection interface 120 (i.e. executes status read). Then, the internal CPU 110 analyzes the contents of the status register 126. If it is indicated that the receive FIFO is full of data, the process proceeds to the step S16, whereas if it is indicated that data, such as the data end information, has been set in the receive register 123, the process proceeds to a step S17.

[Step S16] The internal CPU 110 reads the data written in the receive FIFO. More specifically, when the value "10" has been set to the bits 3 and 2 of the status register 126, the internal CPU 110 acquires the data from the A-side receive FIFO 121a. When the value "10" has been set to the bits 5 and 4 of the status register 126, the internal CPU 110 acquires the data from the B-side receive FIFO 121b.

It should be noted that when data in the receive FIFO is read by the internal CPU 110, the value indicative of absence of data in the receive FIFO is set to the status register 126 by the control block 127. More specifically, when data is read from the A-side receive FIFO 121a, the value "00" is set to the bits 3 and 2 of the status register 126. On the other hand, when data is read from the B-side receive FIFO 121b, the value "00" is set to the bits 5 and 4 of the status register 126.

Then, the process proceeds to the step S11, wherein writing of data from the external host 200 into the receive FIFO is continued.

[Step S17] The internal CPU 110 reads the contents of the receive register 123. If the contents written in the receive register 123 are data end information, the process proceeds to a step S18. If communication control information other than data end information has been written in the receive register 123, the process proceeds to the step S11, wherein writing of data from the external host 200 into the receive FIFO is continued.

[Step S18] When having acquired the data end information of the received data, the internal CPU 110 reads data from the receive FIFO storing data. Which of the two receive FIFOs 121a and 121b stores valid data can be determined based on a value set to the status register 126. More specifically, when the value "01" has been set to the bits 3 and 2 of the status register 126, the valid data is stored in the A-side receive FIFO 121a. On the other hand, when the value "01" has been set to the bits 5 and 4 of the status register 126, the valid data is stored in the B-side receive FIFO 121b.

The above described passing of communication control information via the receive register 123 eliminates the need to analyze contents of data stored in the receive FIFOs 121a and 121b. As a result, data reception from the external host 200 can be performed efficiently.

Figure 7:
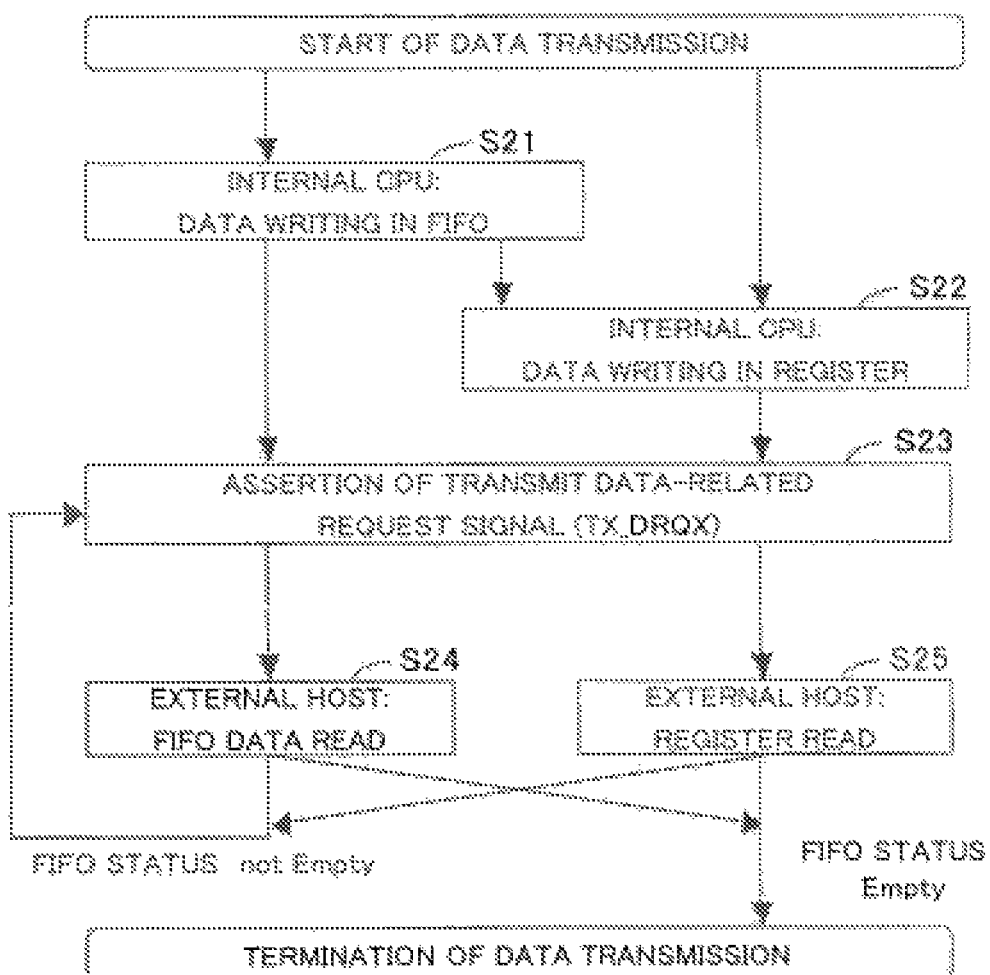
FIG. 7 is a flowchart showing the procedure of operations executed in a process for transmitting data.

FIG. 7 is a flowchart showing the procedure of operations executed in a process for transmitting data. In the following, the process shown in FIG. 7 will be described in the order of step numbers.

[Step S21] The internal CPU 110 of the external connection interface 120 writes data into the transmit FIFO 122. If communication control information other the data, which is to be sent to the external host 200, exists, the process proceeds to a step S22. If there is no communication control information, the process proceeds to a step S23.

When the writing of the data in the transmit FIFO 122 is started, information indicating that valid data exists in the transmit FIFO 122 is set in the status register 126 by the control block 127. More specifically, the value "01" is set to the bits 7 and 6 of the status register 126.

[Step S22] The internal CPI 110 writes communication control information into the transmit register 124. At this time, the control block 127 sets in the status register 126 the value indicating that communication control information, such as data end information, has been set in the transmit register 124. More specifically, the value "1" is set to the bit 1 of the status register 126.

[Step S23] The control block 127 asserts a transmit data-related request signal.

[Step S24] When the transmit data-related request signal is asserted, the external host 200 reads the data from the transmit FIFO 122. When the transmit FIFO 122 becomes empty of data after the data reading, the data transmission process is terminated. If the transmit FIFO 122 is not empty, the process proceeds to the step S23, wherein the data transmission process is continued.

[Step S25] As long as the transmit data-related request signal is asserted, the external host 200 periodically reads contents of the transmit register 124. If any management information is stored in the transmit register 124, the external host 200 carries out processing according to the management information. Then, when the transmit FIFO 122 becomes empty, the data transmission process is terminated. If the transmit FIFO 122 is not empty, the process proceeds to the step S23, wherein the data transmission process is continued.

FIG. 8 is a diagram showing an example of configuration of signals in the internal bus. The internal bus 150 has nine kinds of signal lines.

A signal communicated via a signal line with a terminal name "MCLK0" is named "clock signal", which is an input signal to the external connection interface 120. This signal line is used for inputting the synchronizing clock signal.

A signal communicated via a signal line with a terminal name "RSTXI" is named "reset signal", which is an input signal to the external connection interface 120. This signal line is used for inputting the reset signal.

A signal communicated via a signal line with a terminal name "A0 [3:0]" is named "address signal", which an input signal to the external connection interface 120. This signal line is used for inputting an address.

A signal communicated via a signal line with a terminal name "DO [31:0]" is named "write data signal", which is an input signal to the external connection interface 120. This signal line is used for inputting write data.

A signal communicated via a signal line with a terminal name "DI [31:0]" is named "read data signal", which is an output signal from the external connection interface 120. This signal line is used for outputting read data.

A signal communicated via a signal line with a terminal name "RDX0" is named "read strobe signal", which is an input signal to the external connection interface 120. This signal line is used for inputting the read strobe signal. The read strobe signal is an active-low signal.

A signal communicated via a signal line with a terminal name "WRX0 [3:0]" is named "write strobe signal", which is an input signal to the external connection interface 120. This signal line is used for inputting the write strobe signal. The write strobe signal is an active-low signal.

A signal communicated via a signal line with a terminal name "CSX" is named "chip select signal", which is an input signal to the external connection interface 120. This signal line is used for inputting the chip select signal. The chip select signal is an active-low signal.

A signal communicated via a signal line with a terminal name "INT" is named "interrupt signal", which is an output signal from the external connection interface 120. This signal line is used for outputting the interrupt signal. The interrupt signal is an active-high signal.

FIG. 9 is a diagram showing an example of configuration of signals of the external connection interface. The external bus 10 has nine kinds of signal lines.

A signal communicated via a signal line with a terminal name "EX_DI [15:0]" is named "input data signal", which is an input signal to the external connection interface 120. This signal line is used for inputting data from the external host 200.

A signal communicated via a signal line with a terminal name "EX_DO [15:0]" is named "output data signal", which is an output signal from the external connection interface 120. This signal line is used for outputting data to the external host 200.

A signal communicated via a signal line with a terminal name "EX_DOE" is named "data bus direction switching signal", which is an output signal from the external connection interface 120. This signal line is used for outputting the data bus direction switching signal.

A signal communicated via a signal line with a terminal name "EX_CSX" is named "chip select signal", which is an input signal to the external connection interface 120. This signal line is used for inputting the chip select signal. The chip select signal is an active-low signal.

A signal communicated via a signal line with a terminal name "EX_A" is named "address signal", which is an input signal to the external connection interface 120. This signal line is used for inputting the address signal. The address signal indicates register selection when its value is "0" and indicates FIFO selection when its value is "1".

A signal communicated via a signal line with a terminal name "EX_RDX" is named "read strobe signal", which is an input signal to the external connection interface 120. This signal line is used for inputting the read strobe signal. The read strobe signal is an active-low signal.

A signal communicated via a signal line with a terminal name "EX_WRX" is named "write strobe signal", which is an input signal to the external connection interface 120. This signal line is used for inputting the write strobe signal. It should be noted that the write strobe signal is an active-low signal.

A signal communicated via a signal line with a terminal name "RX_DRQX" is named "receive data-related request signal", which is an output signal from the external connection interface 120. This signal line is used for outputting the receive data-related request signal. The receive data-related request signal is an active-low signal. The receive data-related request signal is asserted low until one of the receive FIFOs 121a and 121b becomes full of data.

A signal communicated via a signal line with a terminal name "TX_DRQX" is named "transmit data-related request signal", which is an output signal from the external connection interface 120. This signal line is used for outputting the transmit data-related request signal. The transmit data-related request signal is an active-low signal. When readable data exists in the transmit register 124 and an internal RAM for transmission, the transmit data-related request signal is asserted low until the transmit FIFO 122 becomes full of data.

Data communication between the external host 200 and the internal CPU 110 is carried out using the signals described above. In the following, data reception from the external host 200 and data transmission to the external host 200 will be described with reference to timing charts.

Figure 10:
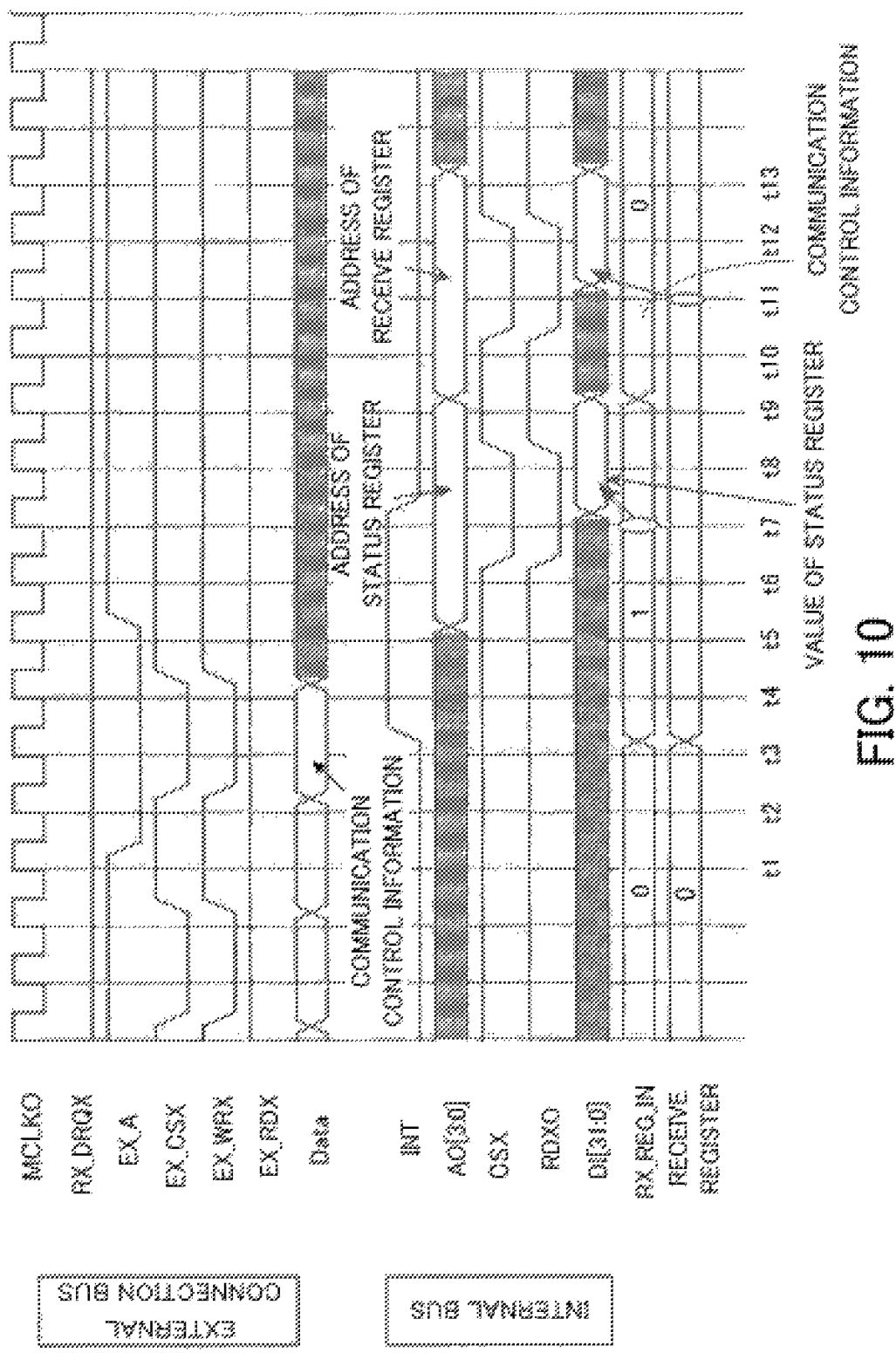
FIG. 10 is a timing chart useful in explaining data reception.

FIG. 10 is a timing chart useful in explaining data reception. In FIG. 10, under the clock signal (MCLKO)

supplied via the internal bus 150, there are illustrated the signals of the external connection bus 10, and thereunder, there are illustrated the signals of the internal bus 150.

The signals of the external connection bus 10 are the receive data-related request signal (RX_DRQX), the address signal (EX_A), the chip select signal (EX_CSX), the write strobe signal (EX_WRX), the read strobe signal (EX_RDX), and a data signal (Data) for transmission of data via the data bus 11. The signals of the internal bus 150 are the interrupt signal (INT), the address signal (AO [3:0]), the chip select signal (CSX), the read strobe signal (RDXO), and the read data signal (DI [31:0]). Further, the value of the receive register input status (RX_REG_IN) and that of the receive register 123 are shown to indicate the internal status of the information processing unit 100.

In FIG. 10, the interrupt signal is an active-high signal whereas the others are active-low signals. Further, the address signal (EX_A) of the external connection bus 10 selects the register when it is low, and selects the FIFO when it is high. The receive register input status (RX_REG_IN) is the value set to the bit 0 of the status register 126.

When the receive FIFO 121a (or 121b) is full, the interrupt signal is generated. At this time, the internal CPU 110 recognizes by reading the contents of the status register 126 that the FIFO is full of data, and starts reading from the receive FIFO 121b (or 121a). When it is possible to write data in the receive FIFO 121a or 121b (i.e. when it is not full), the receive request signal always continues to be asserted.

In the following, changes in the signals in FIG. 10 will be described in a time sequence.

First, at a time t1, data to be passed to the internal CPU 110 is generated in the external host 200, and the receive register 123 is designated by the address signal (EX_A) via the external connection bus 10.

At a time t2 (one cycle after the time t1), the chip select signal (EX_CSX) and the write strobe signal (EX_WRX) are asserted, and at the same time communication control information is outputted from the external host 200 to the data bus 11.

At a time t3 (one cycle after the time t2), the interrupt signal (INT) of the internal bus 150 is asserted. At this time, the receive register input status (RX_REG_IN) of the status register 126 is changed from "0" (indicating that there is no unread data in the receive register 123) to "1" (indicating that there is unread data in the receive register 123). At the same time, the communication control information is stored in the receive register 123.

At a time t4 (one cycle after t3), the chip select signal (EX_CSX) and the write strobe signal (EX_WRX) are negated. At this time, the output of the communication data from the external host 200 is stopped.

At a time t5 (one cycle after the time t4), the internal CPU 110 outputs the address of the status register 126 as the address signal (AO [3:0]) of the internal bus 150.

At a time t6 (one cycle after the time t5), the chip select signal (CSX) and the read strobe signal (RDXO) are asserted by the internal CPU 110.

At a time t7 (one cycle after the time t6), the contents of the status register 126 are outputted as the read data signal (DI [31:0]). At this time, the receive register input status (RX_REG_IN) in the status register 126 has been set to "1". Since the contents of the status register 126 have been read, the interrupt signal (INT) is negated.

At a time t8 (one cycle after the time t7), the chip select signal (CSX) and the read strobe signal (RDXO) are negated.

At a time t9 (one cycle after the time t8), the internal CPU 110 recognizes that unread data exists in the receive register 123, and outputs the address of the receive register 123 as the address signal (AO [3:0]). At this time, the output of the contents from the status register 126 as the read data signal (DI [31:0]) is stopped, and the receive register input status (RX_REG_IN) in the status register 126 is set to "0".

At a time t10 (one cycle after the time t9), the chip select signal (CSX) and the read strobe signal (RDXO) are asserted.

At a time t11 (one cycle after the time t10), the contents of the receive register 123 are outputted as the read data signal (DI [31:0]). Thus, the communication data stored in the receive register 123 is transferred to the internal CPU 110.

At a time t12 (one cycle after the time t11), the chip select signal (CSX) and the read strobe signal (RDXO) are negated.

At a time t13 (one cycle after the time t12), the output of the address of the receive register 123 as the address signal (AO [3:0]) by the internal CPU 110 is stopped, and at the same time the output of the contents of the receive register 123 as the read data signal (DI [31:0]) by the external connection interface 120 is also stopped.

Next, a description will be given of the processes executed for data transmission.

Figure 11:
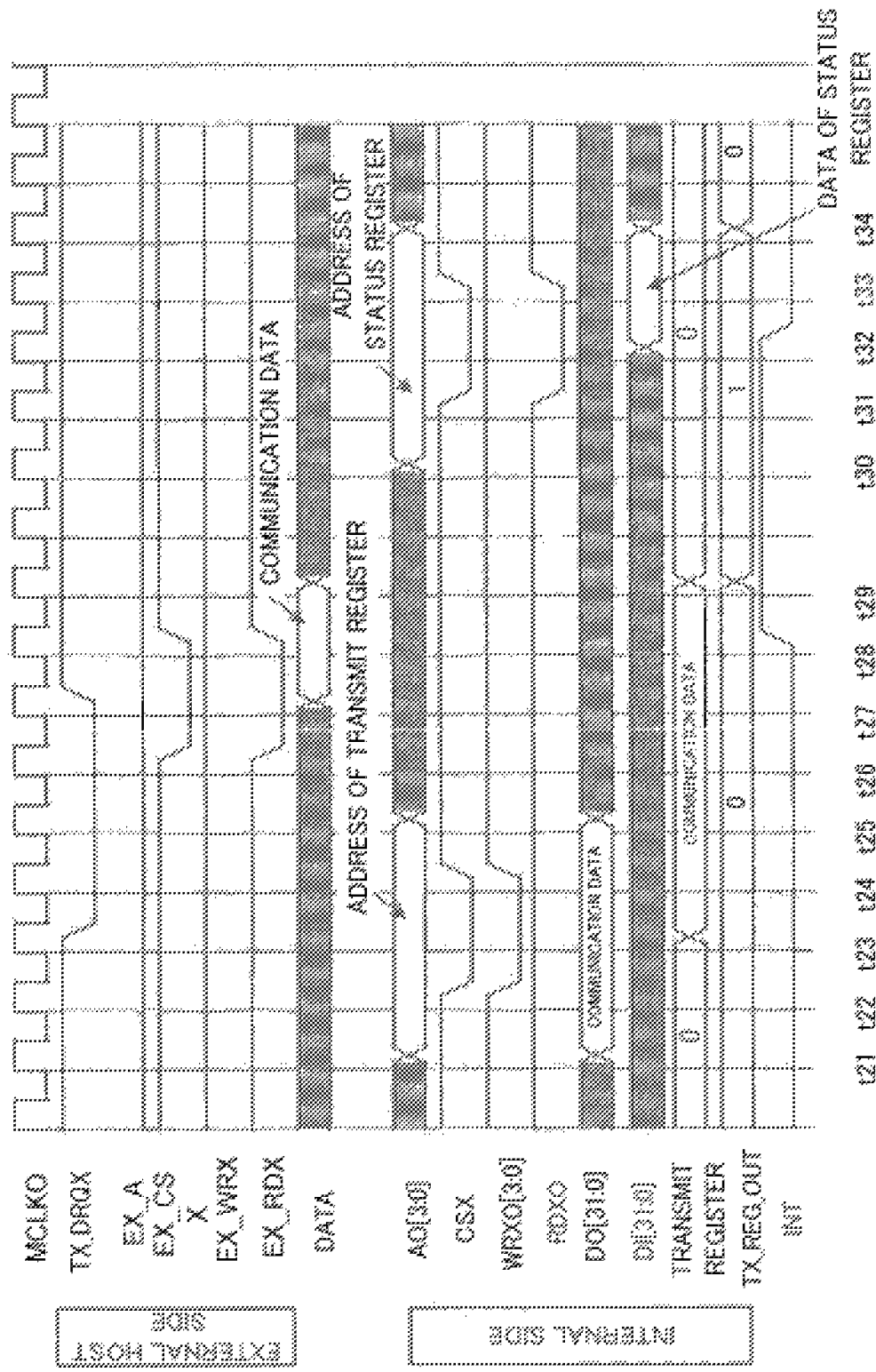
FIG. 11 is a timing chart useful in explaining data transmission.

FIG. 11 is a timing chart useful in explaining data transmission. In FIG. 11, under the clock signal (MCLKO) supplied via the internal bus 150, there are illustrated the signals of the external connection bus 10, and thereunder, there are illustrated the signals of the internal bus 150.

The signals of the external connection bus 10 are the transmit data-related request signal (TX_DRQX), the address signal (EX_A), the chip select signal (EX_CSX), the write strobe signal (EX_WRX), the read strobe signal (EX_RDX), and the data signal (Data) for transmission of data via the data bus 11. The signals transmitted via the internal bus 150 are the address signal (AO [3:0]), the chip select signal (CSX), the write strobe signal (WRXO [3:0]), the read strobe signal (RDXO), the write data signal (DO [31:0]), the read data signal (DI [31:0]), and the interrupt signal (INT). Further, the value of the transmit register 124 and that of the transmit register output status (TX_REG_OUT) are shown to indicate the internal status of the information processing unit 100.

In FIG. 11, the interrupt signal (INT) is an active-high signal (i.e. active when the value thereof is "1"), and the other signals are active-low signals (i.e. active when the values thereof are "0"). The address signal (EX_A) of the external connection bus 10 selects the register when it is low, and selects the FIFO 122 when it is high. The transmit register status is the value set to the bit 1 of the status register 126. The transmit data-related request signal (TX_DRQX) is asserted when untransmitted data exists in the transmit register 124 or when transmittable data exists in the transmit FIFO 122. When the contents of the status register 126 are read, the value of the transmit register output status (TX_REG_OUT) is cleared. As data in the transmit register 124 is read, the transmit register 124 clears the read data stored therein to "0". If the data in the transmit register 124 is not "0" when the data is read, the external host 200 recognizes the data as new data for transmission.

In the following, changes in the signals in FIG. 11 will be described in a time sequence.

First, at a time t21, the address of the transmit register 124 is outputted as the address signal (AO [3:0]) by the internal CPU 110, and at the same time communication data is outputted as the data signal (DO [31:0]). At this time, the value of the transmit register 124 is "0". Further, the value of the transmit register output status (TX_REG_OUT) is also "0".

At a time t22 (one cycle after the time t21), the chip select signal (CSX) and the write strobe signal (WRXO [3:0]) are asserted.

At a time t23 (one cycle after the time t22), the communication data is written into the transmit register 124. More specifically, since the chip select signal (CSX) and the write strobe signal (WRXO [3:0]) have been asserted, the communication data is written into the address (the address of the transmit register 124) designated by the address signal (AO [3:0]). At this time, the transmit data-related request signal (TX_DROX) of the external connection bus 10 is asserted.

At a time t24 (one cycle after the time t23), the chip select signal (CSX) and the write strobe signal (WRXO [3:0]) are negated.

At a time t25 (one cycle after the time t24), the output of the address of the transmit register 124 as the address signal (AO [3:0]) is stopped, and the output of the write data signal (DO [31:0]) is stopped at the same time.

At a time t26 (one cycle after the time t25), the chip select signal (EX_CSX) and the read strobe signal (EX_RDX) of the external connection bus 10 are asserted.

At a time t27 (one cycle after the time t26), the communication data stored in the transmit register 124 is outputted to the data bus 11, and the transmit data-related request signal (TX_DROX) is negated.

At a time t28 (one cycle after the time t27), the chip select signal (EX_CSX) and the read strobe signal (EX_RDX) of the external connection bus 10 are negated. Further, since the communication data has been outputted to the data bus 11, the interrupt signal (INT) to the internal CPU 110 is asserted.

At a time t29 (one cycle after the time t28), the transmit register 124 is cleared to "0", and the transmit register output status (TX_REG_OUT) is set to "1". At this time, the output of the communication data to the data bus 11 of the external connection bus 10 is stopped.

At a time t30 (two cycles after the time t29), the internal CPU 110 outputs the address of the status register 126 as the address signal (AO [3:0]).

At a time t31 (one cycle after the time t30), the chip select signal (CSX) and the read strobe signal (RDXO) are asserted.

At a time t32 (one cycle after the time t31), the data of the status register 126 is outputted as the read data signal (DI [31:0]). Thus, the value of the status register 126 is read by the internal CPU 110. At this time, the interrupt signal (INT) is negated.

At a time t33 (one cycle after the time t32), the chip select signal (CSX) and the read strobe signal (RDXO) are negated.

At a time t34 (one cycle after the time t33), the output of the address of the status register 126 as the address signal (AO [3:0]) and the output of the data as the read data signal (DI [31:0]) are stopped. At this time, since the value of the status register 126 has been read by the internal CPU 110, the transmit register output status (TX_REG_OUT) is cleared to "0".

As described above, data communication between the external host 200 and the internal CPU 110 is carried out via the external connection interface 120. In this data communication, since the receive register 123 and the transmit register 124 are provided in addition to the FIFOs, management information (such as data end information) can be passed via those registers. This eliminates the need to analyze data contents transmitted via the FIFOs, one by one, which reduces processing load on the internal CPU 110 and other components. The internal CPU 110 can allocate the processing power saved by the reduction of the processing load thereon, to other processing including encryption and decryption.

It should be noted that to realize the first embodiment, an address designated for data transmission or reception by the external host 200 is required to be switched between the FIFO and the register as appropriate. Hereafter, a description will be given of the procedure of operations executed in a process for data communication, which is executed by the external host 200.

Figure 12:
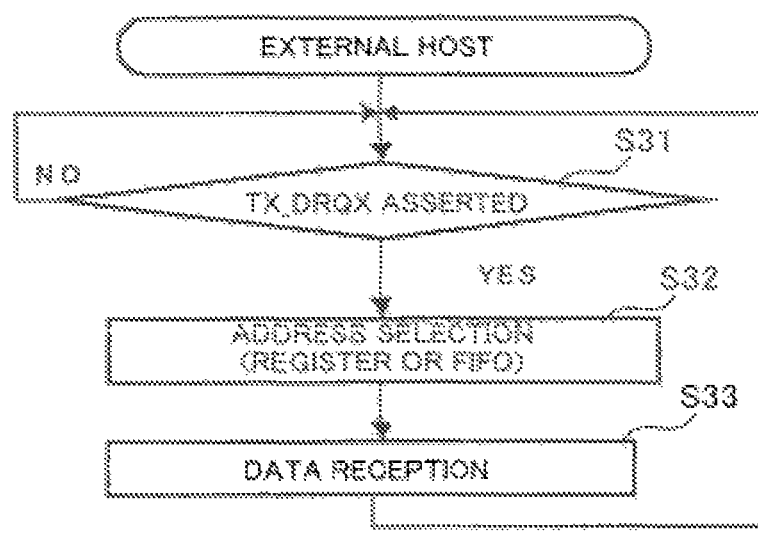
FIG. 12 is a flowchart showing the procedure of operations executed in a process for data reception by the external host.

FIG. 12 is a flowchart showing the procedure of operations executed in the process for data reception by the external host. In the following, the process shown in FIG. 12 will be described in the order of step numbers.

[Step S31] The external host 200 determines whether or not the transmit data-related request signal (TX_DRQX) is asserted. If the transmit data-related request signal (TX_DRQX) is asserted, the process proceeds to a step S32, whereas if the transmit data-related request signal is not asserted, the step S31 is repeatedly carried out.

[Step S32] The external host 200 selects one of the address of the transmit register 124 and the address of the transmit FIFO 122. The selection is performed according to a predetermined rule. For example, a cycle of referring to data in the transmit register 124 is determined in advance, for causing the address of the transmit register 124 to be selected according to this cycle, and the address of the transmit FIFO 122 to be selected in the other timing.

[Step S33] The external host 200 receives data of the selected address. When the address of the transmit register 124 is selected, the data in the transmit register 124 is received, whereas when the address of the transmit FIFO 122 is selected, the data in the transmit FIFO 122 is received. Then, the process proceeds to the step S31.

As described above, as long as the transmit data-related request signal (TX_DRQX) is asserted, the external host 200 periodically reads from the transmit register 124. It should be noted that when data to be sent from the information processing unit 100 to the external host 200 runs out, the transmit data-related request signal (TX_DRQX) is negated, and read access to the transmit register 124 or the transmit FIFO 122 by the external host 200 is interrupted.

Figure 13:
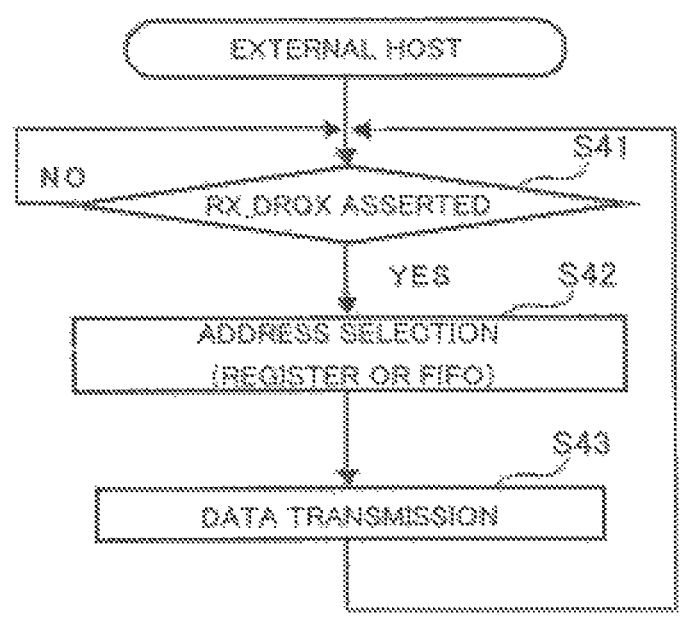
FIG. 13 is a flowchart showing the procedure of operations executed in a process for data transmission by the external host.

FIG. 13 is a flowchart showing the procedure of operations executed in a process for data transmission by the external host. In the following, the process shown in FIG. 13 will be described in the order of step numbers.

[Step S41] The external host 200 determines whether or not the receive data-related request signal (RX_DRQX) is asserted. If the receive data-related request signal is asserted, the process proceeds to a step S42, whereas if the receive data-related request signal is not asserted, the step S41 is repeatedly carried out.

[Step S42] The external host 200 selects one of the address of the receive register 123 and the address of the receive FIFO 121*a* or 121*b*. The selection of the address is determined according to data contents to be transmitted. For example, when actual data to be sent to the internal CPU 110 is to be transmitted, the address of the FIFO 121*a* or 121*b* is selected. Then, when data end information is to be transmitted after completion of the transmission of the actual data, the address of the receive register 123 is selected.

[Step S43] The external host 200 transmits the data to the selected address. When the address of the receive register 123 is selected, the data is transmitted to the receive register 123, and when the address of the receive FIFO 121a or 121b is selected, the data is transmitted to the FIFO 121a or 121b. Then, the process proceeds to the step S41.

As described above, when the receive data-related request signal (RX_DRQX) is asserted, the external host 200 can store data in the receive FIFOs 121a or 121b and the receive register 123. For example, a series of data is read. It should be noted that when data to be transmitted from the information processing unit 100 to the external host 200 runs out, the transmit data-related request signal (TX_DRQX) is negated, and the read access from the external host 200 to the transmit register 124 or the transmit FIFO 122 is interrupted.

It should be noted that the processing functions of the external host 200 shown in FIGS. 12 and 13 are accomplished by executing a program, prepared in advance, by a CPU within the external host 200. The program describing the details of the processes can be recorded in a computer-readable recording medium. The computer-readable recording medium includes a magnetic recording device, an optical disk, a magneto-optical recording medium, and a semiconductor memory. The magnetic recording device includes a hard disk drive (HDD), a flexible disk (FD), and a magnetic tape. The optical disk includes a DVD (Digital Versatile Disk), a DVD-RAM (Random Access Memory), and a CD-ROM (Compact Disk Read Only Memory), and a CD-R (Recordable)/RW (ReWritable). Further, the magneto-optical recording medium includes an MO (Magneto-Optical disk).

To make the program available on the market, portable recording media, such as DVD and CD-ROM, which store the program, are sold. Further, the program can be stored in a storage device of a server computer connected to a network, and transferred from the server computer to another computer via the network.

When the program is executed by a computer, the program stored e.g. in a portable recording medium or transferred from the server computer is stored into a storage device of the computer. Then, the computer reads the program from the storage device of its own and executes processing based on the program. The computer can also read the program directly from the portable recording medium and execute processing based on the program. Further, the computer may also execute processing based on a program which is transferred from the server computer whenever the processing is to be carried out.

As described above, in the first embodiment, communication with external devices is enabled by providing a transmit FIFO (TX_FIFO) and a receive FIFO (RX_FIFO) as well as a transmit register (TX_REG) and a receive register (RX_FIFO) in the external interface section. When the external host 200 has written communication control information into the receive register 123, an interrupt signal is asserted, whereby the internal CPU 110 can recognize that the information has been written into the receive register 123. On the other hand, when writing in the transmit register 124 has been performed, the transmit data-related request signal via the external connection bus 10 is asserted, whereby the external host 200 can recognize that data has been written into the transmit register 124. Whether or not the data in the transmit register 124 has already been read can be determined by read-clearing of the data in the transmit register 124.

Thus, the information needed for communication of termination and the like of data reception/transmission is exchanged via the registers as described above, whereby the need to analyze data in the FIFOs is eliminated, which contributes to reduction of load on the internal CPU 110. That is, the external host 200 or the internal CPU 100 is required to send each other information of contents to be communicated, depending on the state of communication. At this time, the data transmitting side can select a register using the address signal (EX_A or AO) and write the data in the register, whereby communication control information can be sent to the data receiving side without using the FIFOs. Therefore, the internal CPU 110 only needs to recognize data from the register as communication control information, and there is no need to analyze data from the FIFO to find whether the data is communication control information or actual data. As a result, load on the internal CPU 110 is reduced, which promises improved performance.

Further, it is possible to exchange any information via the registers during data transmission/reception. That is, differently from the conventional external connection interface having a configuration in which information can be exchanged only after the data is read since communication control information is stored as data in a FIFO, in the first embodiment, an interruption to the internal CPU 110 occurs when communication control information is stored in a register, which enables the communication control information to be passed to the internal CPU 110 without delay. This makes it possible to perform fast exchange of information between the external host 200 and the internal CPU 110 even during data transmission/reception.

Since the registers provided separately from the FIFOs, as described above, are used for transmission/reception of communication control information, it is possible to pass other information without degrading the efficiency of transfer of communication data. Therefore, the effects of the present embodiment are more advantageous particularly when data is transmitted as streaming data e.g. on a network. For example, the present embodiment makes it possible to exchange communication control information while distributing data stream of a moving image sequence, without degrading the efficiency of transfer of the stream.

Further, since the data end information is stored in a register, it is possible to determine the end of data transmission/reception without reading data in a FIFO. Consequently, in the case of a FIFO using a single-port RAM, for example, it is possible to determine that writing of data in the FIFO should be stopped and reading of data therefrom should be allowed, even when the FIFO has not become full of data. More specifically, according to the conventional art, in a FIFO using a single-port RAM, an interrupt signal or a transmit or receive data-related request signal is not asserted until the FIFO becomes full of data. For this reason, the data receiving side cannot start reading until the FIFO becomes full of data. In contrast, according to the first embodiment, even when data transmission has been completed and the FIFO is not full, the data end information is written into the register, whereby the internal CPU 110 is notified that the final data has been stored. As a result, even when the FIFO is not full of data, reading from the FIFO can be started.

It should be noted that the transmit register 124 can be also used as a free register. For example, it is possible to use the transmit register 124 to send free data, such as data of the number of bytes writable in the receive FIFO 121a or 121b, to the external host 200. This widens the use of the external connection interface 120 as well as enables smooth data communication.

Similarly, the receive register 123 can be used as a free register. For example, the external host 200 can use the receive register 124 to send free data, such as data of a size of transmit data. This widens the use of the external connection interface 120 as well as enables smooth data communication.

As described above, in the first embodiment, since communication data is transferred via buffers, and communication control information is transferred via registers, it is possible to pass the communication control information without analyzing the contents of the communication data, which makes it possible to achieve efficient transmission/reception of communication data.

Second Embodiment

Next, a second embodiment of the present invention will be described. The second embodiment is provided for enhancing efficiency in data communication by a data security device for ensuring secure communication.

First, a description will be given of necessity of improving efficiency in data communication by a data security device for ensuring secure communication and difficulty in doing so.

The widespread use of the Internet has enabled various data communications via the Internet. Data communicated via the Internet includes personal information and company secrets. These kinds of important data are encrypted, for example, to be protected from illegal data acquisition by a third party.

In cryptographic processing (encryption and decryption processing), more complicated encryption algorithm is required for enhancement of difficulty in decryption. For this reason, in a system executing cryptographic processing and authentication processing by software, processing load applied to a CPU has become excessively large. As a result, the cryptographic processing and the authentication processing seriously affect processing power of the whole system.

Particularly, IPv6 (Internet Protocol version 6) as a next generation Internet protocol defines IPsec as an essential function, which was defined in IPv4 (Internet Protocol version 4) as an optional function. IPsec is a protocol formed by adding a security function to TCP/IP (Transmission Control Protocol/Internet Protocol). The use of IPsec makes it possible to ensure security of communication over a LAN (Local Area Network), a private or public WAN (Wide Area Network), or the Internet.

IPsec can be roughly divided into three protocols, i.e. IKE (Internet Key Exchange), ESP (Encapsulating Security Payload) and AH (Authentication Header), to all of which is applied cryptographic processing.

Encrypted communication by IPsec is started by establishing a SA (Security Association) including key exchange. IPsec defines "IKE" as a key exchange protocol which makes it possible to automatically negotiate and establish SAs. It should be noted that there exist some other key exchange protocols, but in IPsec, IKE is the standard, which is created based on a key exchange protocol called "ISAKMP/Oakley".

If the contents of communication data leak to a third party at the stage of the key exchange, encrypted communication performed by using ISpec after the key exchange counts for nothing. Further, since encryption by IPsec takes effect only after completion of key exchange, IPsec cannot be used for IKE. Therefore, IKE supports encrypted communication by itself.

For the encrypted communication by IKE itself, another key exchange procedure for IKE is determined, and hence IKE is comprised of two phases as a whole. First, in a phase 1, an encryption algorithm to be used in a phase 2 is determined, and at the same time an encryption key is generated. After sharing of the encryption keys, the process proceeds to the phase 2 using the encryption keys, whereby encrypted communication limited to IKE is enabled. Subsequently, negotiation is started for encrypted communication by IPsec.

In the negotiation for the encrypted communication, various pieces of information concerning determination of encryption algorithms, exchange of encryption keys, and so forth, which are required for communication by IPsec, are sequentially exchanged, whereafter encrypted communication of data is enabled.

After negotiation of the "ESP" protocol for use in data transfer is completed, communication by encrypted packets is started between the parties concerned. In IPsec, data is encrypted on a packet-by-packet basis, and transmitted in a state packed in a container called "ESP". In IPsec, there are provided two methods called "the transport mode" and "the tunnel mode", selectively used depending on a portion of data to be encrypted.

In the transport mode, only a data portion to be sent in an IP packet is encrypted, and an IP header designating an address and the like is added to the data portion, whereafter the IP packet is transmitted. On the other hand, in the tunnel mode, an IP header once received from another host and a data portion are collectively encrypted, and then a new IP header is added to the encrypted data, whereafter the IP packet is transmitted.

Further, as a technique for preventing tampering of communication data, authentication processing is employed. In the authentication processing, authentication data is generated so as to authenticate the contents of communication data.

The authentication data is responsible for "assurance of integrity" and "authentication". The authentication data contains data called "MAC (Message Authentication Code)". MAC is obtained by performing computation on a combination of the contents of communication data and a password using a computing method called a hash function. The hash function makes it possible to generate a fixed-length data unit of several tens of bits to several hundreds of bits from a data unit of any size. The operation using the hash function is similar to cryptographic processing, and in many cases, the cryptographic processing includes authentication processing using the hash function, as a function thereof.

DES-CBC, 3DES-CBC, MD5, SHA1, HMAC-MD5 and HMAC-SHA1 are typical algorithms used in the cryptographic processing or authentication processing.

On a transmitting side, the combination of the data and the password is processed by a message digest algorithm, and then the processed data is added to a packet, as authentication data within ESP. When the data reaches a receiving side without error, the receiving side performs computation on a combination of the received data and a password stored on its own side, by the same message digest algorithm as used by the transmitting side. Then, an obtained result and the received data are compared, and when no difference is found between the two, it is proved that the data has arrived without being tampered with on the way.

The "AH" protocol is designed for "assurance of integrity" and "authentication". In the AH, encryption of data is not performed, but only an SPI, a sequence number, and authentication data are packed and added to a conventional IP packet. Although the ESP alone can perform the authentication function, the AH is defined for ensuring at least "assurance of integrity" and "authentication" in case of the encrypted communication being unavailable. The well-known data authentication methods include SHA1 (Secure Hash Algorithm 1) as a hash function algorithm (Bruce Schneier "Applied Cryptography (Second Edition)", 1996, John Wiely & Sons. Inc pp. 265-278, pp. 429-459).

Presently, IPsec is mainly used as a protocol for a "VPN (Virtual Private Network)" utilizing the Internet. The VPN is a network that interconnects a home office and branches of the company or LANs via the Internet, which has been conventionally realized using a private line. On the Internet, however, contents of communication are exposed to an indefinite number Internet users. Therefore, a method of protecting transmit data is necessitated. To solve this problem, IPsec is used for the VPN. The use of IPsec makes it possible to ensure communication security, as in a case where a private line is used, at a far more inexpensive communication charge than when the private line is used.

Many of currently leading IPsec-based products are provided for use in VPNs. The products are in the form of private or dedicated encryption devices, or in the form of functions added to routers and firewall products. By installing such products at entrances of access lines connected to the Internet at respective bases, and there by making use of IPsec in the tunnel mode, it is possible to encrypt all communications between the bases. Further, recent commercial OSs (Operating Systems) have come to support IPsec as standard, so that encrypted communications between SOHOs (Small Offices/Home Offices) and between a home and an office are becoming available. As the Internet gains a significant foothold as an infrastructure in the future, security techniques become indispensable to users whether the users are individuals or companies. For this reason, IPsec is a very promising technique.

Software processing by a CPU is well-known as a general method for executing cryptographic processing or overall processing by hash functions, or forming a HMAC (Keyed-Hashing for Message Authentication Code) message authentication function by using a particular hash function. In this method, since the cryptographic processing frequently uses product-sum operation, bit inversion, exclusive OR operation, and bit shift, heavy operational load is placed on the CPU, and hence, when the CPU is low in performance, processing takes so long a time that it is difficult to ensure even normal protocol processing. On the other hand, although a CPU high in performance is capable of performing processing at a sufficiently high speed, such a CPU is also high in price and consumes much power. Further, it is difficult for a system using a high-performance CPU to perform stable operation. Moreover, since a high-performance CPU is expensive, it is impossible to use such a CPU in an inexpensive product which can incorporate only a low-performance CPU.

The speed of cryptographic processing by software completely depends on the CPU occupation rate and processing power of a CPU. For this reason, besides being low in speed of the cryptographic processing, if the cryptographic processing is combined with other processing, processing speed is further reduced, and difficulty in processing is increased. For example, when IPsec processing is executed with a low-performance CPU, processing takes such long a time that it is difficult to ensure even normal protocol processing. Although a high-performance CPU is capable of performing processing at a sufficiently high speed, such a CPU is high in price and consumes much power, and it is difficult for a system using such a CPU to perform stable operation. Therefore, in introducing IPsec into products having a CPU that does not have a particularly high performance, it has been difficult to realize products with built-in IPsec functions such that they have a practical performance and a reasonable price.

In the prior art, cryptographic processing takes long time as described above, and hence streaming processing cannot be performed at a speed comfortable to users. Processing of large data, such as cryptographic processing and authentication processing executed in IPsec key exchange, and encryption and authentication of IP packets, takes enormous amount of time.

Further, it is possible to use an LSI (Large Scale Integration) chip specifically for cryptographic processing so as to speed up the processing. Similarly to the cryptographic processing, hash function processing is realized by a circuit (see e.g. Japanese Unexamined Patent Publication (Kokai) No. H11-500241 and No. 2001-175605). Further, there has been proposed a stream encryption device for use in IPsec processing e.g. in Japanese Unexamined Patent Publication (Kokai) No. 2003-32244.

By incorporating such dedicated circuits into a system, it is possible to obtain improvements in performance, costs, and power consumption, compared with the processing using software. Further, the memory is not excessively used for memory copying e.g. in software operation.

However, in the prior art, data input/output to and from a dedicated circuit are performed via a CPU. More specifically, the CPU has to write/read in and from registers within the dedicated circuit in timing corresponding to the number of blocks to be processed. Therefore, the burden of the register read/write is placed on the CPU, and an increase in the amount of processing causes degradation of performance of the CPU in this respect.

Further, the conventional circuit uses a control register, which when register write of data to be encrypted/decrypted is completed, turns on a cryptographic operation start bit to start the cryptographic processing. Therefore, this circuit is not suitable for streaming processing.

Since the amount of processing executed via the CPU is enormous as described above, the speed of the cryptographic processing completely depends on the CPU occupation rate and processing power of the CPU. For this reason, the capability of the dedicated circuit cannot be fully utilized. In addition, it is expected that when the cryptographic processing is combined with other processing, processing speed is further reduced, and difficulty in processing is increased.

To overcome the above problems, it is necessary to realize a dedicated circuit and a system which can be manufactured at reasonable costs and can achieve comfortable communication speed.

Hereafter, the second embodiment of the present invention will be described with reference to drawings.

First, the outline of the invention applied to the second embodiment will be described, and then a description will be given of details of the second embodiment.

Figure 14:
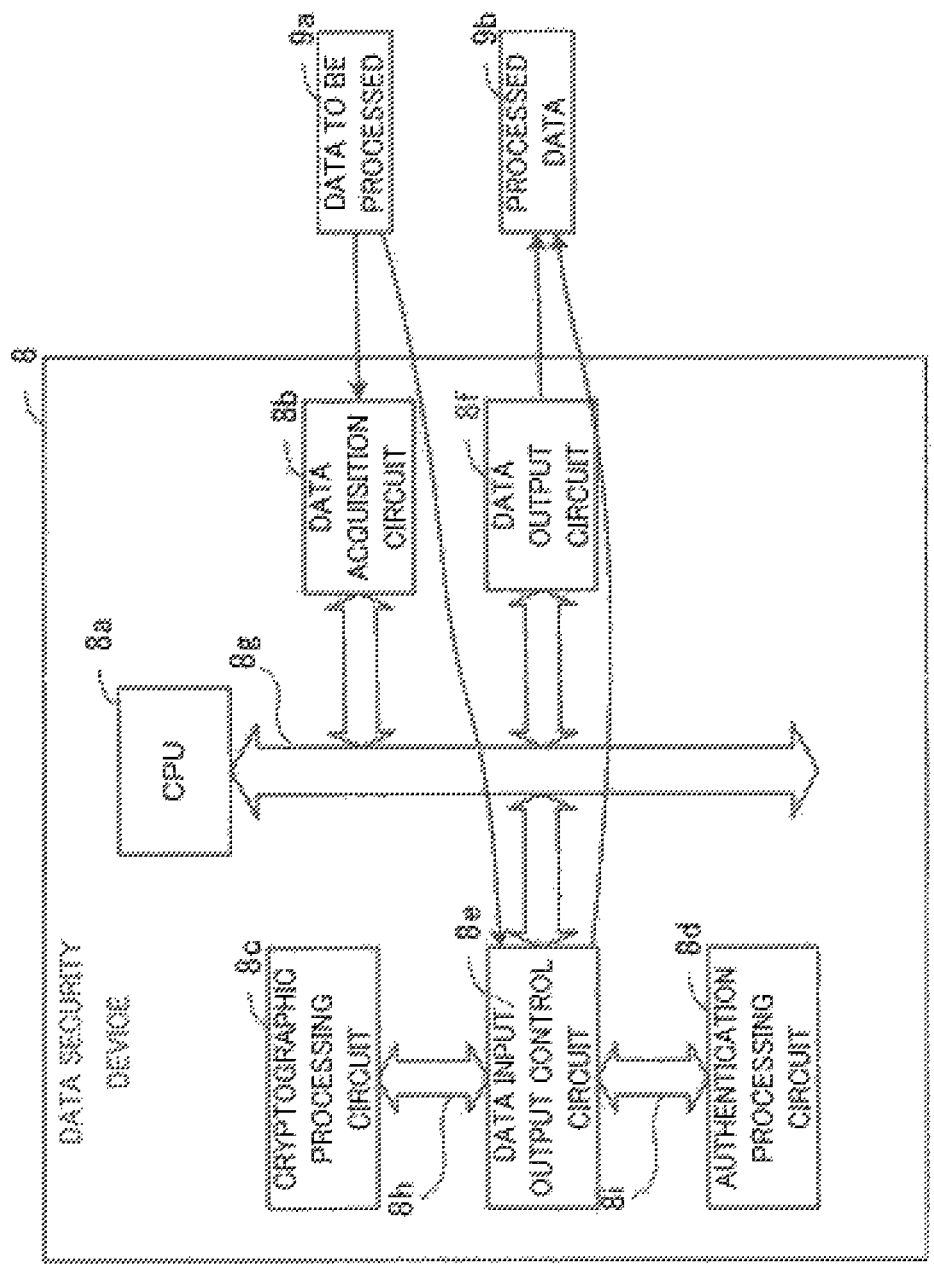
FIG. 14 is a conceptual diagram of the invention applied to a second embodiment of the present invention.

FIG. 14 is a conceptual diagram of the invention applied to the second embodiment. The data security device 8 is comprised of a CPU (Central Processing Unit) 8a, a data acquisition circuit 8b, a cryptographic processing circuit 8c, an authentication processing circuit 8d, a data input/output control circuit 8e, and a data output circuit 8f. The CPU 8a, the data acquisition circuit 8*b*, the data input/output control circuit 8*e*, and the data output circuit 8*f* are interconnected via a first bus 8*g*. The cryptographic processing circuit 8*c* and the data input/output control circuit 8*e* are connected by a second bus 8*h*. The authentication processing circuit 8*d* and the data input/output control circuit 8*e* are connected by a third bus 8*i*.

The CPU 8*a* controls the overall operation of the data security device 8. The data acquisition circuit 8*b* acquires object data 9*a* to be processed. This circuit 8*b* receives data inputted via a network, for example. When having received authentication data from the authentication processing circuit 8*d*, the CPU 8*a* carries out processing for authentication of the object data 9*a* to be processed and addition of the authentication data to the processed data 9*b*.

The cryptographic processing circuit 8*c* executes cryptographic processing on inputted data. The cryptographic processing is encryption or decryption processing. For example, data to be transmitted via a wide area network, such as the Internet, is subjected to the encryption processing. On the other hand, when encrypted data is received, the decryption processing is carried out.

The authentication processing circuit 8*d* executes authentication processing on data. The authentication processing is for generating authentication data, such as a hash value generated based on a hash function. The generated authentication data is passed to the CPU 8*a*, for example.

The data input/output control circuit 8*e* controls input/output of data to and from the cryptographic processing circuit 8*c* and the authentication processing circuit 8*d*. More specifically, the data input/output control circuit 8*e* acquires the object data 9*a* from the data acquisition circuit 8*b* via the first bus 8*g* and stores the same in an internal memory. When the cryptographic processing is required, the data input/output control circuit 8*e* inputs the object data 9*a* to the cryptographic processing circuit 8*c* via the second bus 8*h*. Then, the data input/output control circuit 8*e* acquires the processed data 9*b* subjected to the cryptographic processing, from the cryptographic processing circuit 8*c* via the second bus 8*h*. On the other hand, when the authentication processing is required, the data input/output control circuit 8*e* inputs the object data 9*a* to the authentication processing circuit 8*d* via the third bus 8*i*. The data input/output control circuit 8*e* passes the processed data 9*b* to the data output circuit 8*f*.

It should be noted that by incorporating a DMA (Direct Memory Access) controller in the data input/output control circuit 8*e*, transfer of data via the first bus 8*g* can be performed by DMA.

The data output circuit 8*f* outputs the received processed data 9*b*. When the processed data 9*b* is encrypted data, authentication data, such as a hash value, is added to the processed data 9*b* according to control e.g. by the CPU 8*a*.

The data security device 8 configured as above carries out processes described below. It should be noted that the processes executed by the data security device 8 includes a process for enhancing security by encrypting plaintext data and outputting the encrypted data and processing of converting encrypted data by decryption into a data format that can be viewed and then outputting the decrypted data.

First, a description will be given of a case where plaintext data is encrypted and then outputted. When plaintext object data 9*a* to be processed is received by the data acquisition circuit 8*b*, the data input/output control circuit 8*e* acquires the object data 9*a* and stores the same in the internal memory. Then, the object data 9*a* stored in the internal memory is inputted to the cryptographic processing circuit 8*c* by the data input/output control circuit 8*e*. The object data 9*a* is encrypted by the cryptographic processing circuit 8*c* and then passed to the data input/output control circuit 8*e*.

The encrypted object data 9*a* is passed to the authentication processing circuit 8*d* by the data input/output control circuit 8*e*. The authentication processing circuit 8*d* carries out authentication processing. For example, authentication data, such as a hash value, is generated. The processed data 9*b* is passed to the data output circuit 8*f* by the data input/output control circuit 8*e*. Then, the authentication data is added to the processed data 9*b* by data processing and the like executed by the CPU 8*a*, followed by being outputted from the data output circuit 8*f*.

Next, a description will be given of a case where encrypted data is decrypted and then outputted. When encrypted object data 9*a* (assumed to have authentication data added thereto) is received by the data acquisition circuit 8*b*, the data input/output control circuit 8*e* acquires the object data 9*a* and stores the same in the internal memory. Then, the object data 9*a* stored in the internal memory is inputted to the authentication processing circuit 8*d* by the data input/output control circuit 8*e*. The authentication processing circuit 8*d* carries out authentication processing. For example, authentication data, such as a hash value, is generated. The generated authentication data is compared with the authentication data added to the object data 9*a*. The comparison is performed e.g. by the CPU 8*a*.

When the object data 9*a* is authenticated by the comparison, the object data 9*a* stored in the internal memory is passed to the cryptographic processing circuit 8*c* by the data input/output control circuit 8*e*. Then, the object data 9*a* is decrypted by the cryptographic processing circuit 8*c*, and passed to the data input/output control circuit 8*e*. The processed data 9*b* converted into plaintext data is passed to the data output circuit 8*f* by the data input/output control circuit 8*e*, followed by being outputted from the data output circuit 8*f*.

As described above, once object data to be subjected to cryptographic processing or authentication processing has been stored in the internal memory of the data input/output control circuit 8*e*, the CPU 8*a* can input and output the data to and from the cryptographic processing circuit 8*c* and the authentication processing circuit 8*d*, respectively, via the second bus 8*h* and the third bus 8*i* separate from the first bus 8*g* connected to the CPU 8*a*. As a result, the CPU 8*a* does not need to manage data input/output to and from the cryptographic processing circuit 8*c* and the authentication processing circuit 8*d*, which reduces processing load applied to the CPU 8*a*.

In addition, since the DMA controller is incorporated in the data input/output control circuit 8*e*, acquisition of object data 9*a* and passing of processed data 9*b*, which are carried out via the first bus 8*g*, can be performed under the control of the data input/output control circuit 8*e*. For example, when object data 9*a* is large in volume, the object data 9*a* can be stored in another memory beforehand, and the data input/output control circuit 8*e* can acquire the object data 9*a* from the memory by DMA transfer. Further, the data input/output control circuit 8*e* can also use DMA transfer so as to transfer processed data 9*b* to another memory. As a consequence, processing load on the CPU 8*a* is further reduced.

By incorporating a communication interface having both the functions of the data acquisition circuit 8*b* and the data output circuit 8*f* in the data security device 8*a*, it is possible to construct a data communication device equipped with the data security function. This data communication device is capable of achieving functions equivalent to those of a VPN device. Hereafter, the data security device having the VPN function is referred to as the security network controller.

If a security network controller is installed in an electronic device or apparatus of any kind, the electronic device or apparatus will be able to readily perform secure data communication. For example, if a security network controller to which is applied the present invention is installed in a camera system (computer system equipped with a function of picking up a digital image and a function of processing data of the picked-up image), it is possible to distribute moving pictures on-line to predetermined users (e.g. registered members) via the Internet. Further, it is also possible to securely control a camera from a remote site.

It should be noted that the utilization of IPsec functions ensures secure communication with ordinary users other than predetermined users. More specifically, when IPsec is used, it is possible to authenticate the other party and exchange keys securely by utilizing ISAKMP (Internet Security Association Key Management Protocol). Therefore, if key exchange is carried out under the ISAKMP protocol at the start, it is possible to perform secure communication between any devices.

Figure 15:
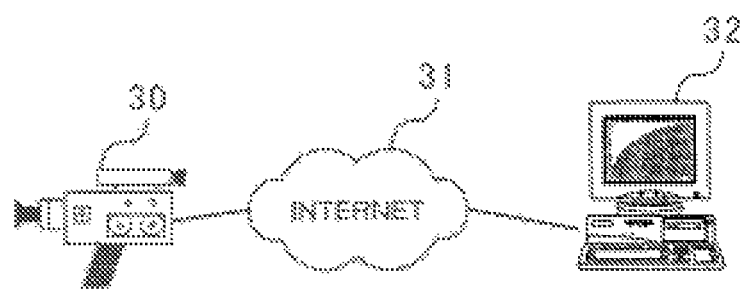
FIG. 15 shows an example of a system configuration according to the second embodiment.

FIG. 15 shows an example of a system configuration according to the second embodiment. As shown in FIG. 15, a camera system 30 having a security network controller installed therein is connected to a terminal unit 32 via the Internet 31. The terminal unit 32 is e.g. a computer having the VPN function. When the terminal unit 32 is also equipped with a security network controller, cryptographic communication via the Internet 31 is facilitated.

Figure 16:
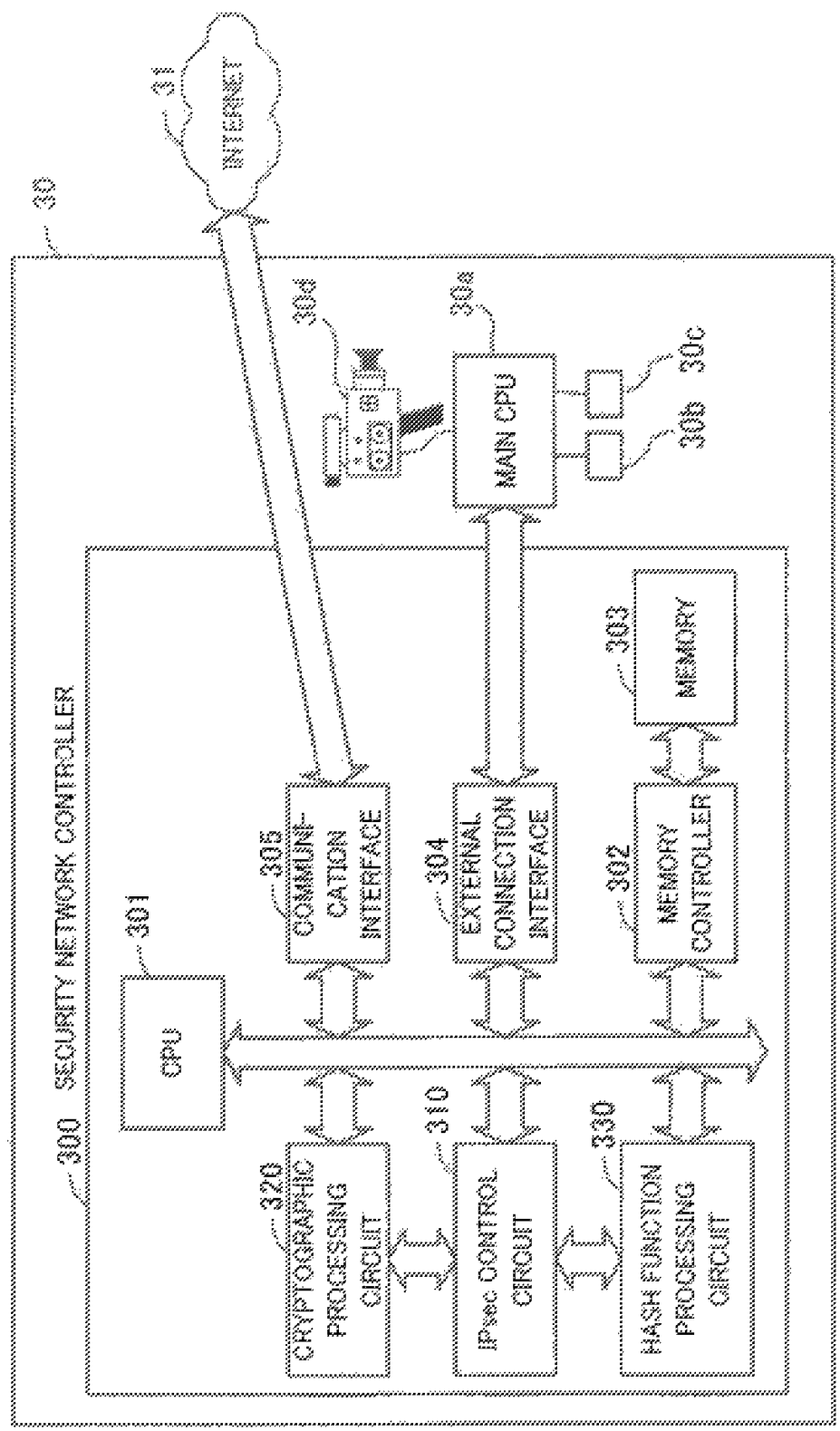
FIG. 16 is a diagram showing the circuit configuration of a camera system.

FIG. 16 is a diagram showing the circuit configuration of the camera system 30. The camera system 30 is comprised of the security network controller 300, a main CPU 30a, peripheral circuits 30b and 30c, and a camera mechanism section 30. The security network controller 300 is equipped with the VPN function and capable of performing processing including encryption and decryption by hardware.

It should be noted that the security network controller 300 can be implemented by an LSI chip. By implementing the security network controller 300 by the LSI chip, it is possible to incorporate the security network controller 300 in an electronic device or apparatus of any kind with ease.

Further, the security network controller 300 can be provided in a single module (e.g. a card module, such as PCMCIA (Personal Computer Memory Card International Association)). This makes it possible to mount the security network controller 300 in the camera system 30 or another device or apparatus via a predetermined communication interface with ease.

The main CPU 30a controls the peripheral circuits 30b and 30c and the camera mechanism section 30d to thereby control overall operation of the camera system 30. The circuits 30b and 30c represent a camera focus control circuit, an image data compression circuit, and so forth. Further, the main CPU 30a transfers a digital image photographed by the camera system 30 to the security network controller 300.

The security network controller 300 is comprised of a CPU 301, a memory controller 302, a memory 303, an external connection interface 304, a communication interface 305, an IPsec control circuit 310, a cryptographic processing circuit 320, and a hash function processing circuit 330. These elements are interconnected by an internal bus and the like.

The CPU 301 controls the entire security network controller 300.

The memory controller 302 controls input/output of data to and from the memory 303. The memory 303 stores data.

Although the memory 303 appears in the security network controller 300 in FIG. 16, it can be connected to the security network controller 300 from the outside. In this case, the memory controller 302 is provided with a connector for external connection, and the memory 303 is connected to the connector, whereby the memory 303 and the security network controller 300 are connected to each other. The memory 303 can be implemented by a semiconductor memory, such as a SRAM (Static Random Access Memory) or a flash memory. The memory controller 302 writes received data into the memory 303 or reads data from the same. The memory 303 is also used for accumulation of object data to be processed or as a work memory during computation.

The external connection interface 304 is connected to the main CPU 30a, for relay of communication data between the main CPU 30a and the CPU 301. The external connection interface 304 is basically comprised of a register and data, and performs bidirectional data communication.

The external connection interface 304 is configured similarly to the external connection interface 120 (appearing in FIGS. 2, 3) according to the first embodiment. Therefore, data communication between the main CPU 30a and the security network controller 300 can be performed efficiently by the external connection interface 304.

The communication interface 305 is connected to the Internet 31, for relay of communication data via the Internet 31. The communication interface 305, which is also referred to as a MAC (Media Access Control), has a function of realizing connection to a network, via a physical layer, such as an Ethernet (registered trademark).

The IPsec control circuit 310 controls input/output of data to and from the cryptographic processing circuit 320 and the hash function processing circuit 330. The cryptographic processing circuit 320 performs data encryption or decryption processing. The hash function processing circuit 330 generates a hash value based on communicated data.

With the system configuration described above, the main CPU 30a controls the camera to be controlled. In this control operation, the main CPU 30a performs communication securely via the Internet 31 to thereby execute control of the camera in response to an instruction from a remote site or distribute images picked up by the camera, via the Internet 31. IPsec is used for the secure communication. It should be noted that the security network controller 300 can be installed not only in cameras, but also in electrical appliances, home appliances, AV apparatuses, etc., to control the devices and apparatuses.

The communication interface 305 or the IPsec control circuit 310 has a function of reducing load on the CPU 301 in the IPsec processing. This function realizes the packet-by-packet encryption and authentication processing in place of the CPU 301.

For example, for data transmission, processes described below are executed.

Data to be distributed from the main CPU 30a onto the Internet 31 is transferred to the memory 303 via the external connection interface 304. Then, when an instruction for DMA transfer of data to be encrypted is issued from the CPU 301 to the IPsec control circuit 310, the IPsec control circuit 310 acquires the data to be encrypted by DMA transfer, and passes the same to the cryptographic processing circuit 320. The cryptographic processing circuit 320 executes encryption processing according to the IPsec protocol. The encrypted data is DMA transferred to the memory 303 by the IPsec control circuit 310. In succession, an instruction for DMA transfer of data for authentication is issued from the CPU 301 to the IPsec control circuit 310. In response to the instruction, the IPsec control circuit 310 acquires the data for authentication by DMA transfer, and passes the same to the hash function processing circuit 330. The hash function processing circuit 330 generates a hash value according to the IPsec protocol. Then, the CPU 301 generates a packet containing the encrypted data and the generated hash value, and transmits the same onto the Internet 31 via the communication interface 305.

When the procedure described above is followed in distribution of images, it is possible to distribute video stream reproducible only by predetermined terminal units (e.g. terminal units of users registered as members).

On the other hand, when control data is sent to the main CPU 30a by a packet subjected to IPsec processing via the Internet, processes described below are executed.

The communication interface 305 receives the transmitted packet. The packet is written into the memory 303 under the control of the CPU 301. Then, when an instruction for DMA transfer of authentication data within the packet is issued from the CPU 301 to the IPsec control circuit 310, the IPsec control circuit 310 acquires the authentication data by DMA transfer, and passes the same to the hash function processing circuit 330. The hash function processing circuit 330 generates a hash value according to the IPsec protocol. The CPU 301 authenticates the received data based on the hash value.

When the data is authenticated based on the generated hash value, an instruction for DMA transfer of encrypted data within the packet is issued from the CPU 301 to the IPsec control circuit 310. In response to the instruction, the IPsec control circuit 310 acquires the encrypted data by DMA transfer, and passes the same to the cryptographic processing circuit 320. The cryptographic processing circuit 320 executes decryption processing according to the IPsec protocol. The decrypted plaintext data is DMA transferred to the memory 303 by the IPsec control circuit 310. Thereafter, the decrypted data is sent to the main CPU 30a via the external connection interface 304 and processed by the main CPU 30a.

When the procedure described above is followed in passing camera control instructions and the like to the main CPU 30a, it is possible to control the camera securely from a remote site.

The procedures of operations executed in processes for data transmission and reception will be described below with reference to FIG. 17.

Figure 17:
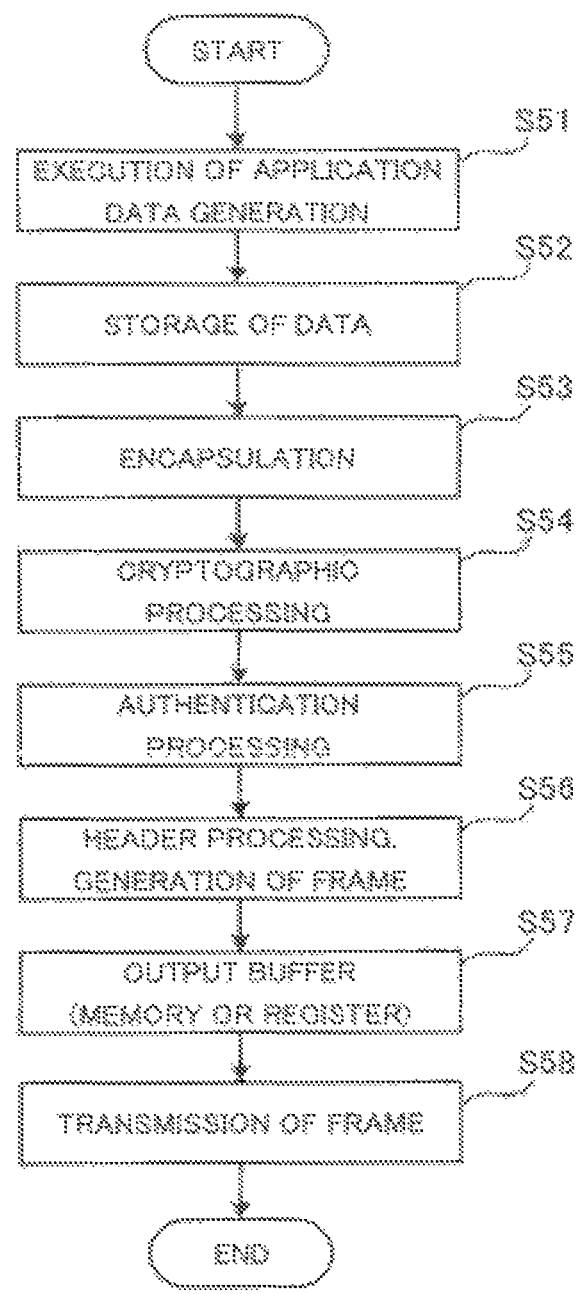
FIG. 17 is a flowchart of the procedure of operations executed in a process for data transmission.

FIG. 17 is a flowchart of the procedure of operations executed in a process for data transmission. Now, the process shown in FIG. 17 will be described in the order of step numbers.

[Step S51] The main CPU 30a executes an application e.g. for video image acquisition and generates data, whereafter the generated data is passed to the security network controller 300.

[Step S52] The data is stored in the memory 303 under the control of the CPU 301.

[Step S53] The CPU 301 performs encapsulation. Encapsulation means to encapsulate data in a header or a trailer.

[Step S54] The data is passed to the cryptographic processing circuit 320 by the IPsec control circuit 310. Then, the cryptographic processing circuit 320 encrypts the data. The encrypted data is returned to the memory 303 by the IPsec control circuit 310.

[Step S55] The encrypted data is passed to the hash function processing circuit 330 by the IPsec control circuit 310. Then, the hash function processing circuit 330 generates a hash value. The generated hash value is passed to the CPU 301.

[Step S56] The CPU 301 generates a frame for transmission.

[Step 557] The CPU 301 writes the frame in an output buffer (of the communication interface 305).

[Step S58] The communication interface 305 transmits the frame onto the Internet 31.

In the following, data flow in distribution of moving image data will be described with reference to FIGS. 18 to 25.

Figure 18:
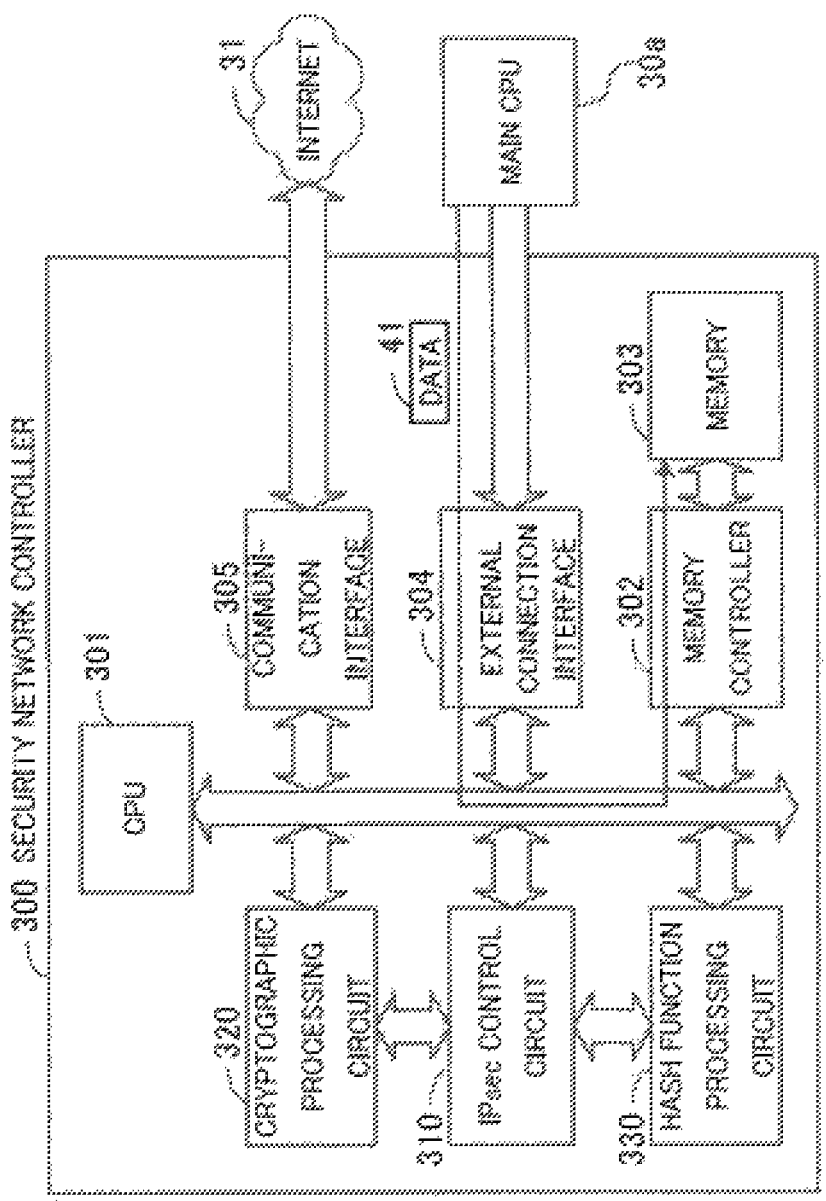
FIG. 18 is a diagram showing a first step in data distribution.

FIG. 18 is a diagram showing a first step in the data distribution. First, data 41 of an image picked up by the camera system 30 is inputted from the main CPU 30a to the security network controller 300. The data 41 is received by the external connection interface 304 and transferred to the memory controller 302. Then, the data 41 is written into the memory 303 by the memory controller 302.

Figure 19:
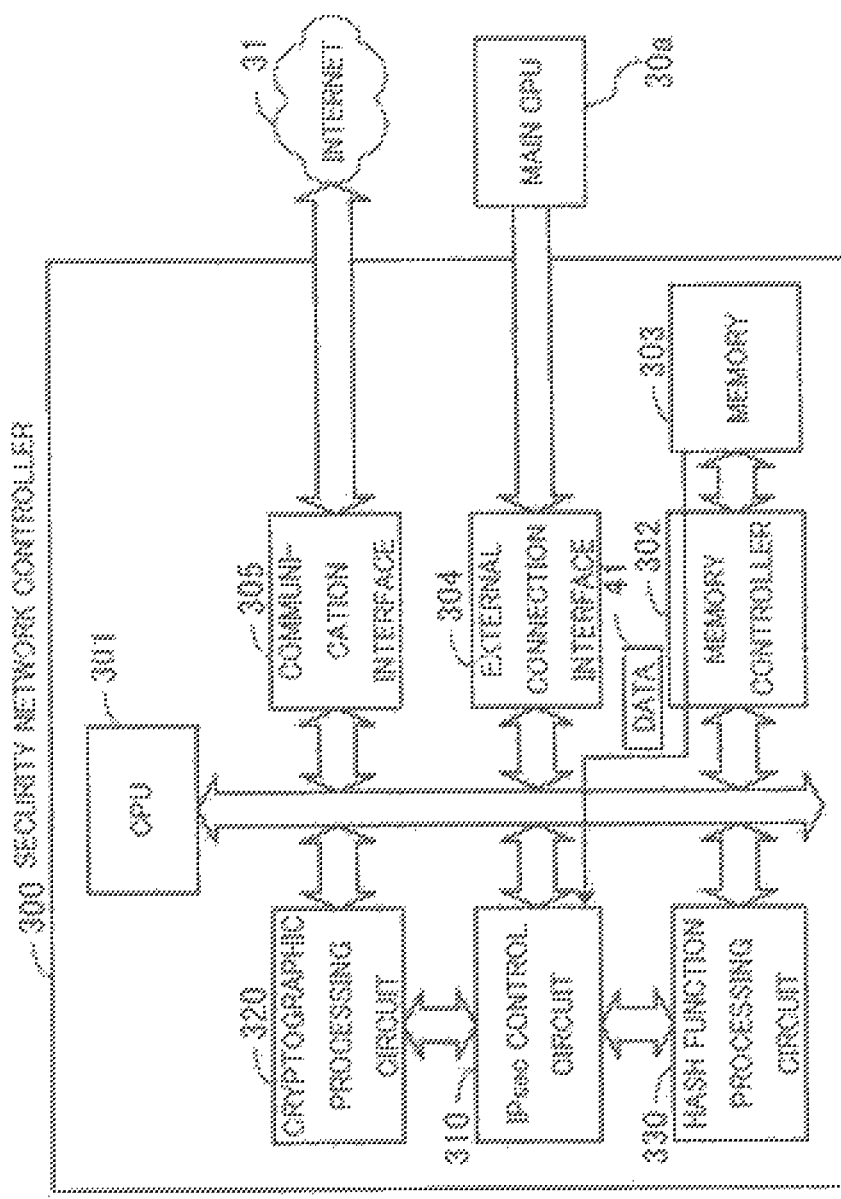
FIG. 19 is a diagram showing a second step in the data distribution.

FIG. 19 is a diagram showing a second step in the data distribution. The IPsec control circuit 310 acquires the data 41 from the memory 303 by DMA transfer.

Figure 20:
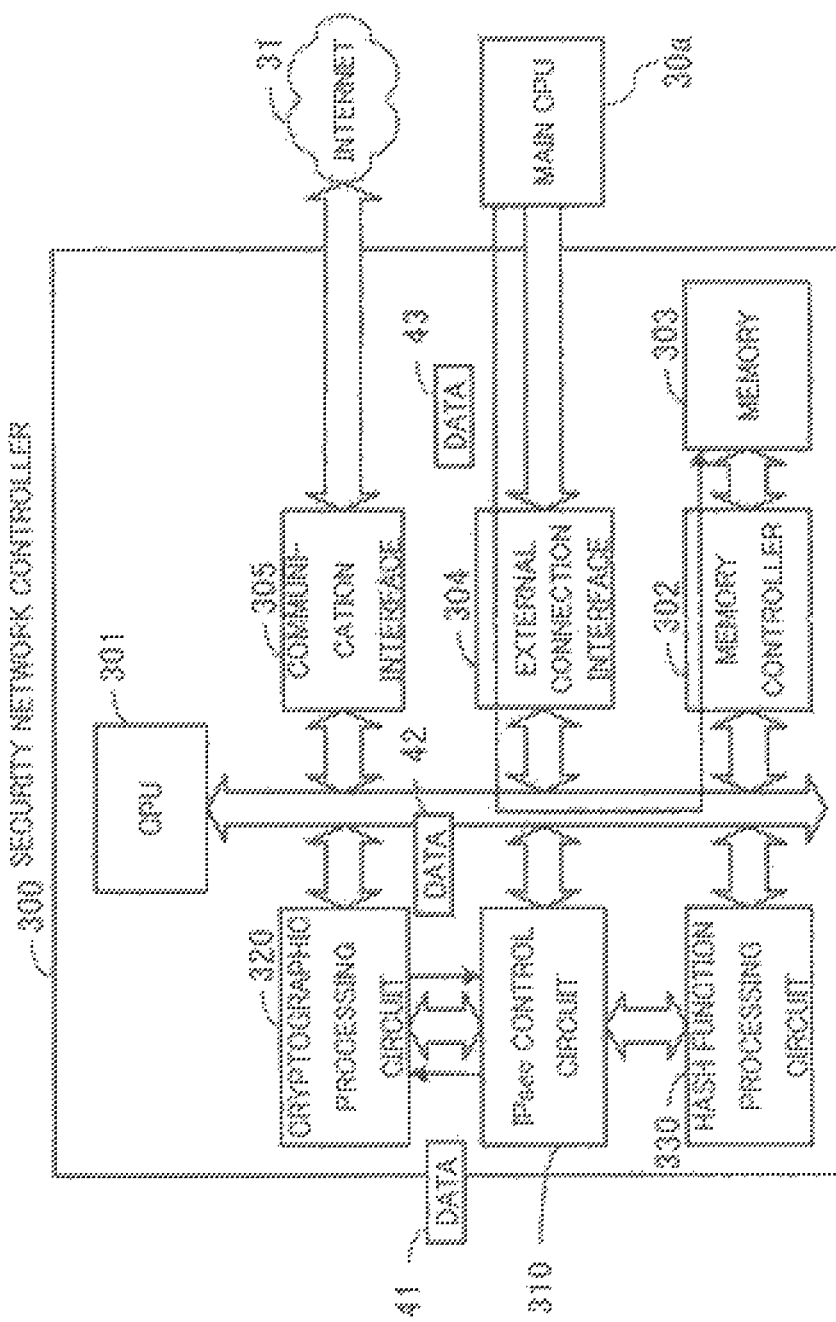
FIG. 20 is a diagram showing a third step in the data distribution.

FIG. 20 is a diagram showing a third step in the data distribution. The IPsec control circuit 310 passes the acquired data 41 to the cryptographic processing circuit 320. The cryptographic processing circuit 320 encrypts the data 41. Then, the cryptographic processing circuit 320 passes the encrypted data 42 to the IPsec control circuit 310. In the meantime, the main bus is kept open, so that the IPsec control circuit 310 can receive following data 43 from the main CPU 30a and transfer the same to the memory 303.

Figure 21:
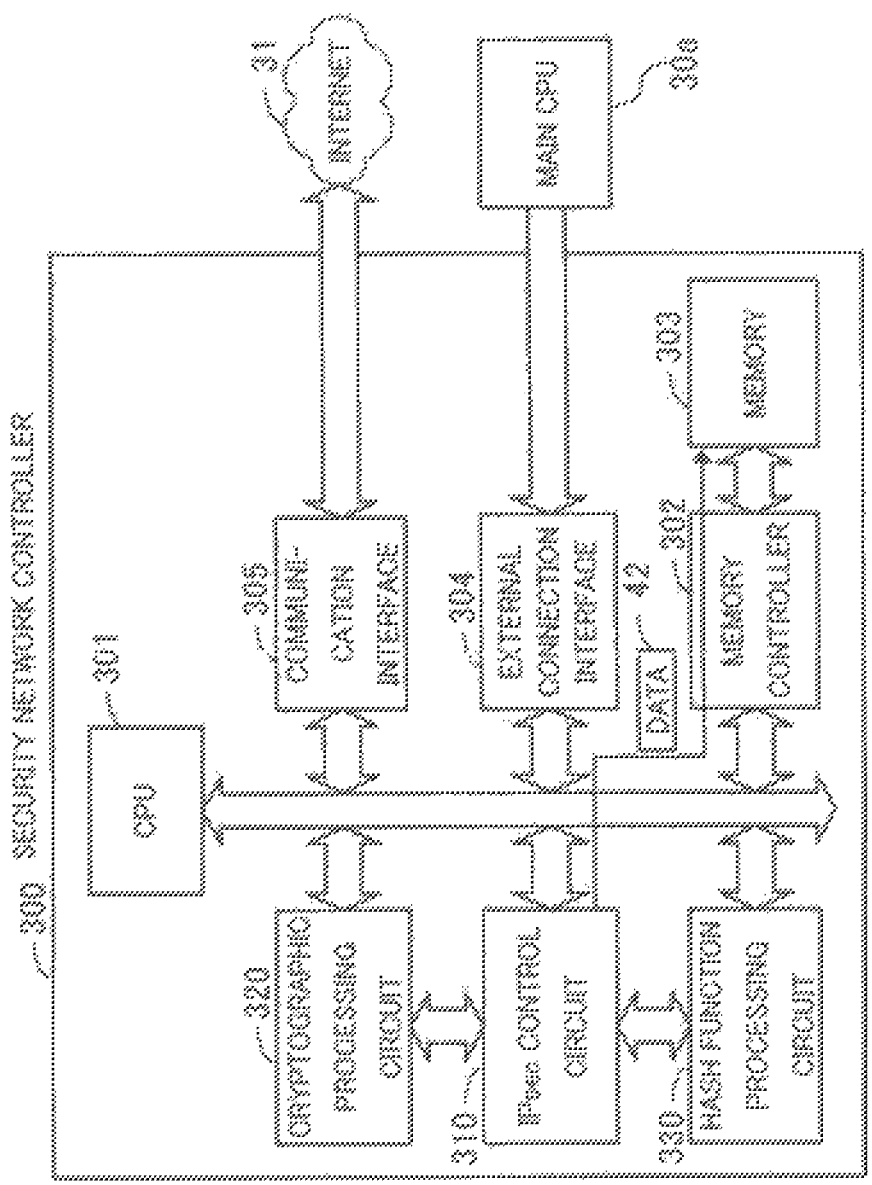
FIG. 21 is a diagram showing a fourth step in the data distribution.

FIG. 21 is a diagram showing a fourth step in the data distribution. The IPsec control circuit 310 passes the encrypted data 42 to the memory controller 302 by DMA transfer. The memory controller 302 stores the received data 42 in the memory 303.

Figure 22:
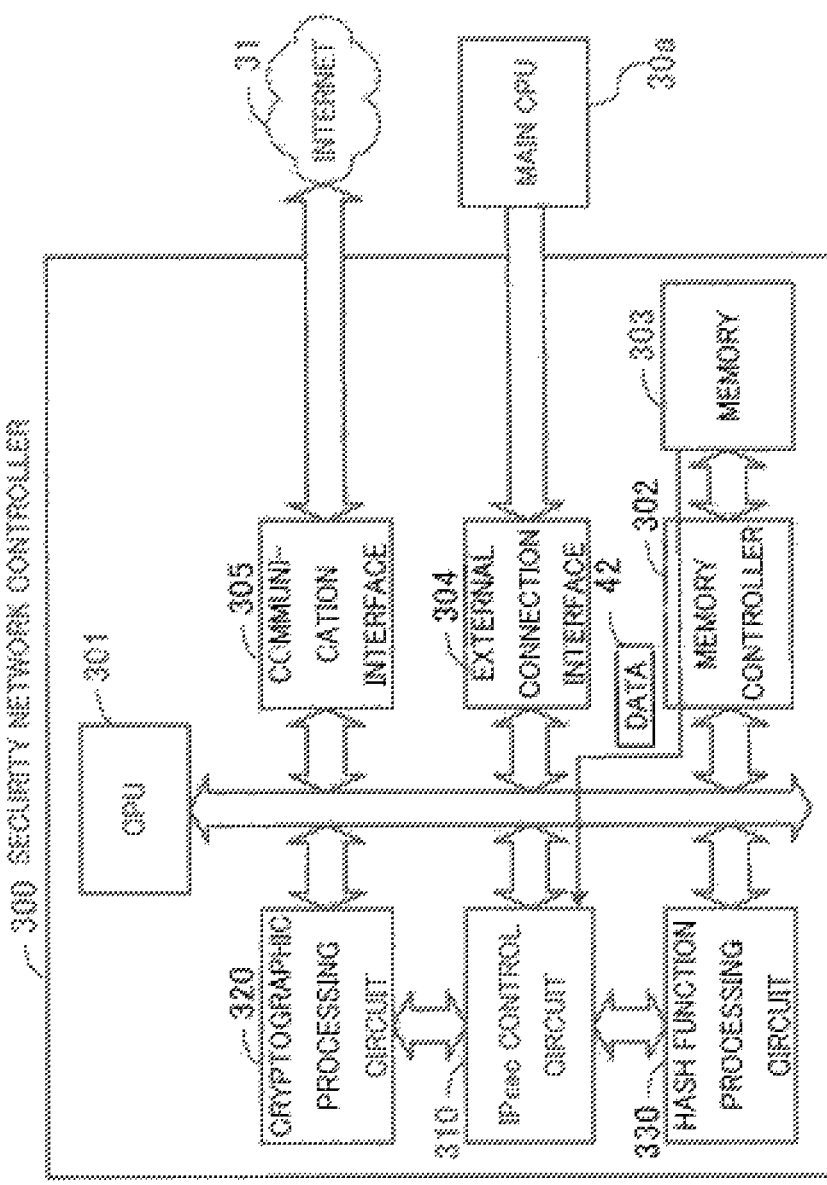
FIG. 22 is a diagram showing a fifth step in the data distribution.

FIG. 22 is a diagram showing a fifth step in the data distribution. The IPsec control circuit 310 acquires the encrypted data 42 from the memory 303 by DMA transfer.

Figure 23:
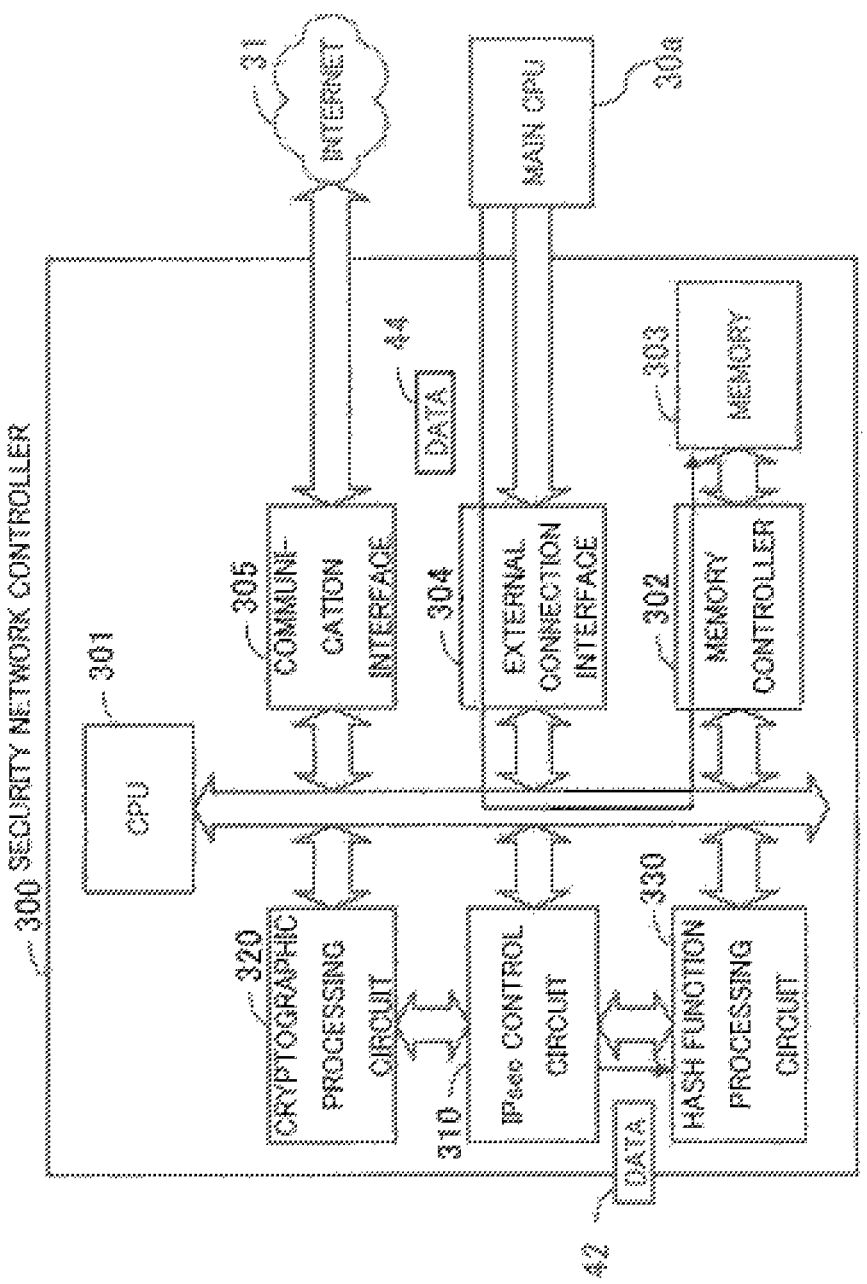
FIG. 23 is a diagram showing a sixth step in the data distribution.

FIG. 23 is a diagram showing a sixth step in the data distribution. The IPsec control circuit 310 passes the encrypted data 42 to the hash function processing circuit 330. The hash function processing circuit 330 applies the hash function to the data 42 to generate a hash value. In the meantime, the main bus is kept open, so that the IPsec control circuit 310 can receive following data 44 from the main CPU 30a and transfer the same to the memory 303.

Figure 24:
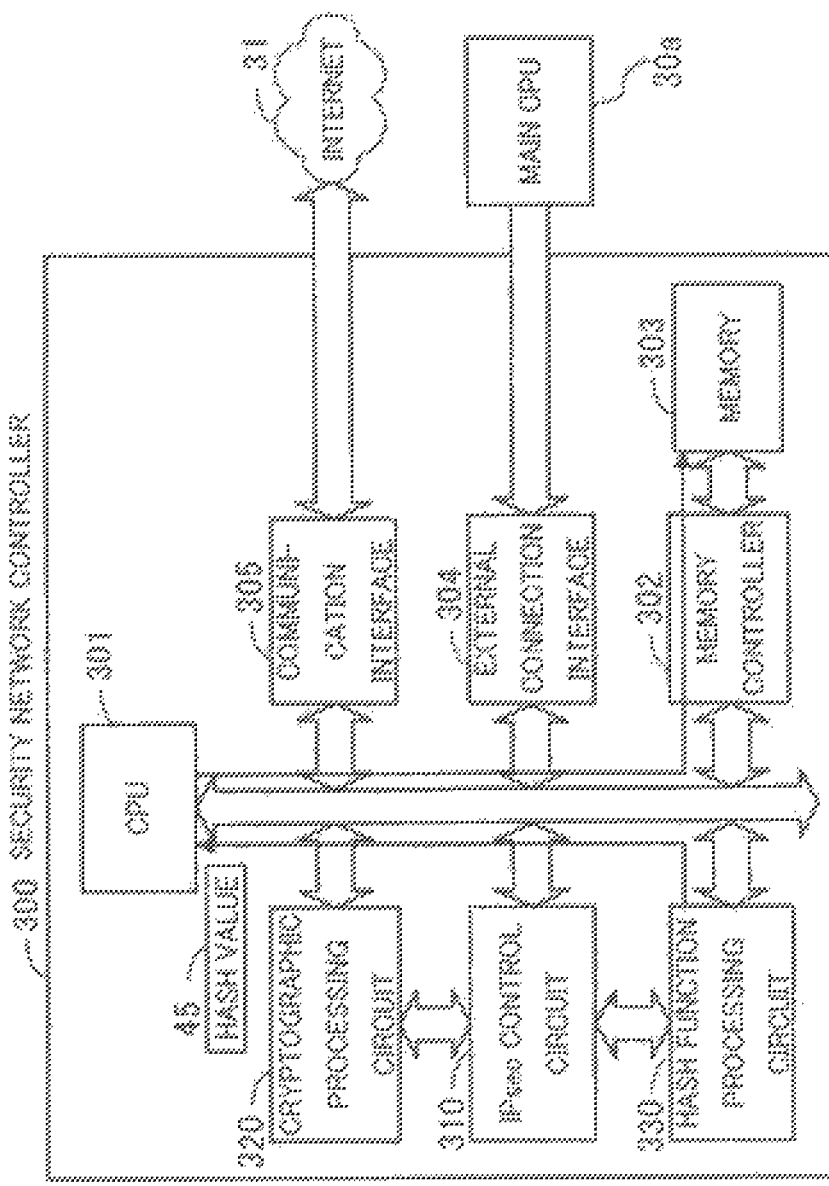
FIG. 24 is a diagram showing a seventh step in data distribution.

FIG. 24 is a diagram showing a seventh step in data distribution. The hash function processing circuit 330 passes the generated hash value 45 to the CPU 301. The CPU 301 adds the hash value 45 to the encrypted data 42 stored in the memory 303.

Figure 25:
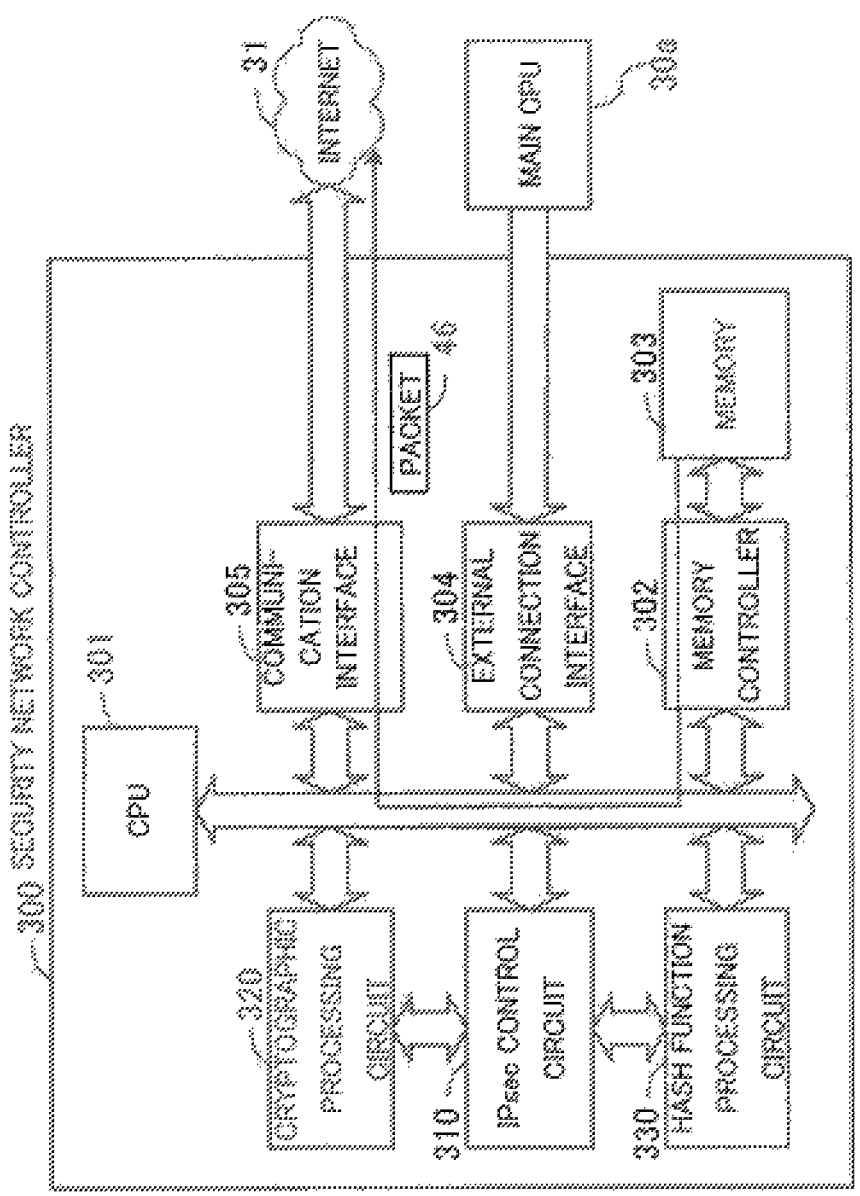
FIG. 25 is a diagram showing an eighth step in the data distribution.

FIG. 25 is a diagram showing an eighth step in the data distribution. The CPU 301 generates a packet 46 for transmission from the encrypted data 42 and the hash value 45 stored in the memory 303 and distributes the packet, via the communication interface 305, to the terminal unit 32 connected to the Internet 31.

The passing of data between the memory 303 and the IPsec control circuit 310 is performed by the DMA function of the IPsec control circuit 310 as described above, so that load on the CPU 301 is small. Further, the IPsec control circuit 310 and the cryptographic processing circuit 320 are connected by a dedicated bus, and the passing of data therebetween for cryptographic processing is performed via the dedicated bus, so that the main bus can be used for transfer of other data during the passing of data for cryptographic processing. Similarly, the IPsec control circuit 310 and the hash function processing circuit 330 are connected by a dedicated bus, and the passing of data therebetween for hash processing is performed via the dedicated bus, so that the main bus can be used for transfer of other data during the passing of data for hash processing. This improves processing efficiency.

Figure 26:
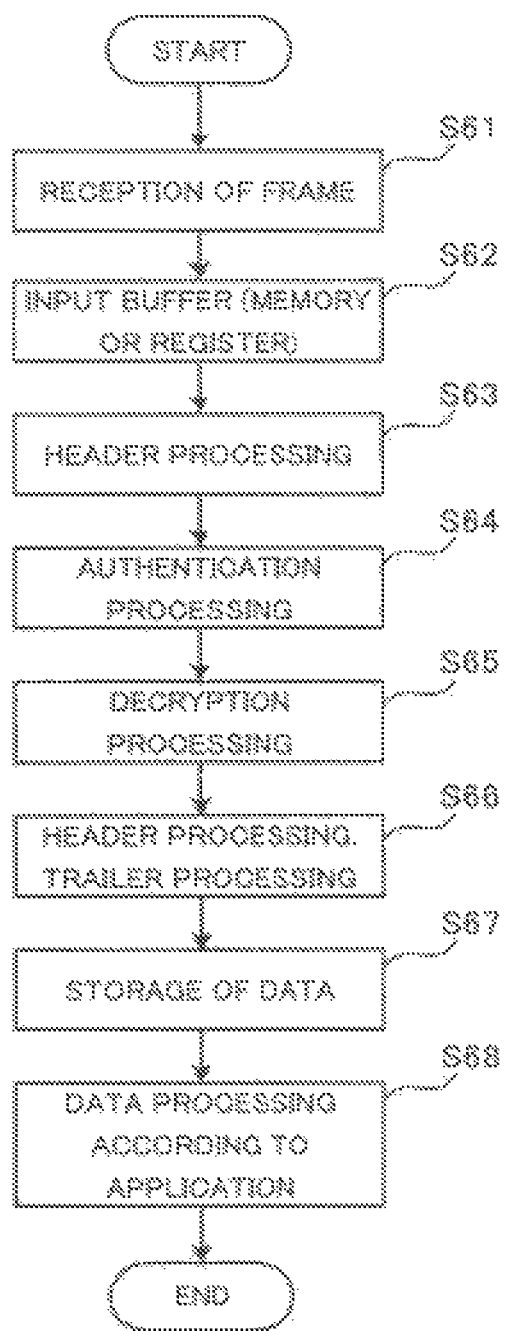
FIG. 26 is a flowchart showing the procedure of operations executed in a process for data reception.

FIG. 26 is a flowchart showing the procedure of operations executed in a process for data reception. Now, the process shown in FIG. 26 will be described in the order of step numbers.

[Step S61] The communication interface 305 receives a frame sent via the Internet 31.

[Step S62] A packet contained in the received frame is stored in an input buffer within the communication interface 305.

[Step S63] The CPU 301 performs header processing of the packet.

[Step S64] The data is passed to the cryptographic processing circuit 320 by the IPsec control circuit 310. Then, the authentication processing is executed by the hash function processing circuit 330 for generating a hash value. The CPU 301 performs authentication of the data by comparing the hash value generated by the hash function processing circuit 330 and a hash value added to the received data.

[Step S65] When the data is authenticated, the IPsec control circuit 310 passes the data to the cryptographic processing circuit 320. Then, the cryptographic processing circuit 320 performs decryption processing.

[Step S66] The CPU 301 analyzes the encapsulated data (i.e. removes a header and a trailer).

[Step S67] The CPU 301 stores the data in the memory 303.

[Step S68] The CPU 301 passes the data to the main CPU 30a via the external connection interface 304. The main CPU 30a processes the data according to an application program.

It should be noted that the data flow in the data reception is reverse to that in the data distribution, i.e. data transmission, described with reference to FIGS. 18 to 25.

As described above, also in the data reception, the IPsec control circuit 310 performs the input/output of data to and from the cryptographic processing circuit 320 and the hash function processing circuit 330. Further, the passing of data between the IPsec control circuit 310 and the other circuits is executed by DMA transfer.

Next, the connection relationship between the IPsec control circuit 310 and the peripheral circuits and the functions of the circuits will be described in detail.

Figure 27:
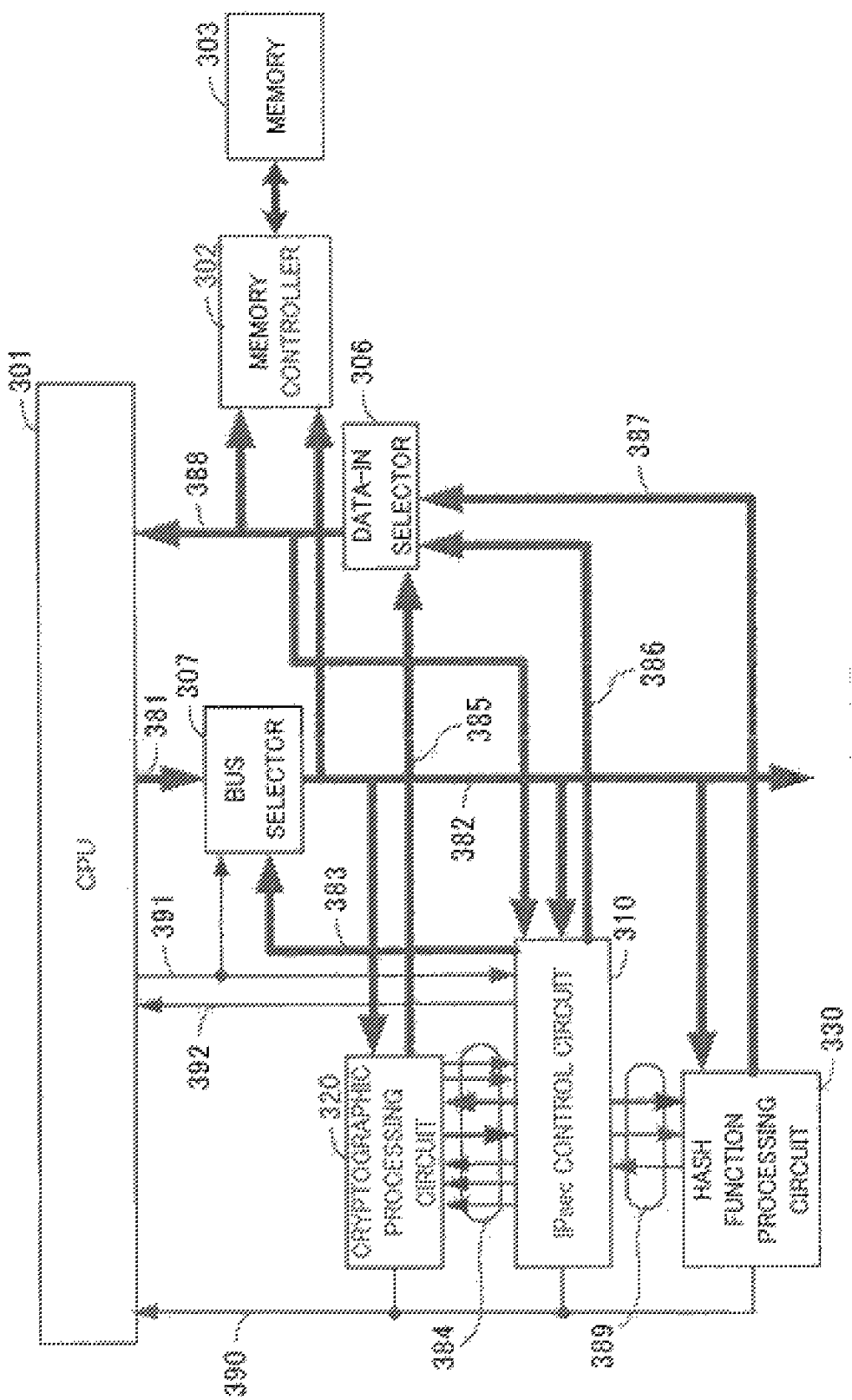
FIG. 27 is a diagram showing an example of the internal configuration of a security network controller.

FIG. 27 is a diagram showing an example of the internal configuration of the security network controller. The security network controller 300 includes the CPU 301, a bus selector 307, the cryptographic processing circuit 320, a data-in selector 306, the IPsec control circuit 310, the hash function processing circuit 330, the memory controller 302, and the memory 303.

The CPU 301 is connected to the bus selector 307 via a bus 381. The CPU 301 exchanges information with the other component elements via the bus selector 307 to thereby control the overall operation of the security network controller 300. Further, the CPU 301 receives external interrupt signals 390 from the cryptographic processing circuit 320, the IPsec control circuit 310, and the hash function processing circuit 330. Furthermore, the CPU 301 receives an external bus opening request acceptance signal 391 from the IPsec control circuit 310. An external bus opening request signal 392 is inputted from the CPU 301 to the IPsec control circuit 310 and the bus selector 307.

The bus selector 307 is connected to the cryptographic processing circuit 320, the IPsec control circuit 310, the hash function processing circuit 330, and the memory controller 302, via a bus 382. Further, the bus selector 307 is connected to the IPsec control circuit 310 via a dedicated bus 383. The bus selector 307 transmits data from the CPU 301 to each component connected to the bus 382 and transfers data from each component to the CPU 301, under the control of the CPU 301.

More specifically, the bus selector 307 selects a control signal or the like outputted from one of the CPU 301 and the IPsec control circuit 310, which is a bus master at the time, and outputs the same to another circuit. The outputted control signal or the like includes e.g. an address, a control signal, and write data, which are to be sent to another circuit.

The cryptographic processing circuit 320 is a circuit that encrypts and decrypts data. In the second embodiment, the encryption/decryption is performed by DES (Data Encryption Standard). The cryptographic processing circuit 320 is connected to the IPsec 310 control circuit via a dedicated bus 384. The cryptographic processing circuit 320 is connected to the data-in selector 306 via a dedicated bus 385. The cryptographic processing circuit 320 acquires data to be encrypted or decrypted from the IPsec control circuit 310 via the bus 384. Then, the cryptographic processing circuit 320 encrypts or decrypts the acquired data and passes the same to the IPsec control circuit 310.

In the second embodiment, the cryptographic processing circuit 320 performs 64-bit block cryptographic processing. In the cryptographic processing circuit 320, when 64-bit data is written therein, a start bit in an internal state machine is automatically turned on. Thus, encryption or decryption processing can be started immediately after writing of the data to be processed.

Further, the encryption or decryption processing performed by the cryptographic processing circuit 320 is a 16-round process. Therefore, the end signal of the internal state machine is turned on when an internal counter has counted 16. This end signal is outputted to the IPsec control circuit 310.

The cryptographic processing circuit 320 may be configured such that it performs encryption or decryption processing without operation of the IPsec control circuit 310. In this case, the cryptographic processing circuit 320 outputs the external interrupt signal 390 to the CPU 301, instead of turning on the end signal.

In addition to the connection relation described above, the data-in selector 306 is connected to the IPsec control circuit 310. The data-in selector 306 is also connected to the hash function processing circuit 330 via a bus 387. Further, the data-in selector 306 is connected to the CPU 301, the memory controller 302, and the IPsec control circuit 310, via a bus 388. The data-in selector 306 selects one of signals inputted from the cryptographic processing circuit 320, the IPsec control circuit 310, and the hash function processing circuit 330, via the respective busses 385, 386, and 387, and outputs the selected signal to the CPU 301, the memory controller 302, and the IPsec control circuit 310, via the bus 388.

As described above, the IPsec control circuit 310 is connected to the cryptographic processing circuit 320 via the bus 384, and also connected to the hash function processing circuit 330 via the bus 389. The IPsec control circuit 310 has a 256-byte internal RAM and can store data to be encrypted/decrypted and data to be hashed.

Further, the IPsec control circuit 310 incorporates a bus arbiter function performed by a DMAC (Direct Memory Access Controller), and can perform bus arbitration with the CPU 301 to thereby become a bus master. By becoming the bus master, the IPsec control circuit 310 can set a transfer source address, a transfer destination address, a transfer volume and a mode for DMA transfer.

The IPsec control circuit 310 having become the bus master basically performs operation for fetching data to be processed from a transfer source and writing processed data in a transfer destination. Then, after completion of data transfer, the IPsec control circuit 310 returns the bus right to the CPU 301. As described above, the IPsec control circuit 310 uses the function provided by the DMAC to acquire data to be encrypted/decrypted or data to be authenticated by the hash function, by the DMA function from the memory 303.

When data to be encrypted/decrypted is acquired, the IPsec control circuit 310 passes the data to the cryptographic processing circuit 320. Then, the IPsec control circuit 310 receives the encrypted or decrypted data, and transfers the same to the memory 303 by DMA processing. On the other hand, when data to be authenticated is acquired, the IPsec control circuit 310 passes the data to the hash function processing circuit 330. It should be noted that the IPsec control circuit 310 performs data fetch processing and data write processing, in parallel with encryption/decryption processing by the cryptographic processing circuit 320 and authentication processing by the hash function processing circuit 330.

Further, the IPsec control circuit 310 has an internal register that stores the length of data to be processed, and subtracts the length of a processed portion from the length of data to be processed after completion of each processing operation to manage the remainder of the data to be processed. Then, when all the processing operations have been completed, the IPsec control circuit 310 outputs a processing end interrupt signal to the CPU 301.

The hash function processing circuit 330 is a circuit that generates a hash value using the hash function. More specifically, the hash function processing circuit 330 generates a hash value based on the data received from the IPsec control circuit 310 and passes the generated hash value to the CPU 301.

It should be noted that in the second embodiment, the hash function processing circuit 330 performs 512-bit block processing. Therefore, when 512-bit data is written, a start bit of an internal state machine is turned on. With this, generation of a hash value is started.

The hash function processing circuit 330 carries out an 80-round process. Therefore, an end signal of the internal state machine is turned on when the internal counter has counted 80. The end signal turned on is outputted to the IPsec control circuit 310.

The hash function processing circuit 330 may be configured such that it performs authentication processing without operation of the IPsec control circuit 310. In this case, the hash function processing circuit 330 outputs the external interrupt signal 390 to the CPU 301, instead of turning on the end signal.

The memory controller 302 performs writing or reading data into or from the memory 303.

The memory 303 is connected to the memory controller 302. The memory 303 is a readable and writable semiconductor recording medium, such as an SRAM or a flush memory.

With the configuration described above, when the IPsec control circuit 310 and the cryptographic processing circuit 320 are combined for interrelated complex operation, processes described below are executed.

First, the IPsec control circuit 310 outputs the external bus opening request signal 392 to the CPU 301. Thereafter, the CPU 301 outputs the external bus opening request acceptance signal 391, whereby the bus right is released to the IPsec control circuit 310. As a result, encryption or decryption processing is started without operation of the CPI 301.

The IPsec control circuit 310 acquires data from the memory 303 by DMA transfer. The acquired data is stored in a memory within the IPsec control circuit 310. It should be noted that the memory within the IPsec control circuit 310 has a double-sided structure. One side of the memory stores unencrypted or undecrypted data, and the other side stores encrypted or decrypted data.

In the second embodiment, the cryptographic processing circuit 320 performs DES processing. The DES processing is executed in units of 64 bits. Therefore, when the IPsec control circuit 310 acquires data from the memory 303, DAM transfer of data having a length of an integral multiple of 64 bits is executed. In the second embodiment, it is assumed that data of 64 bytes (for eight operations of IDES processing) is acquired at one time.

Figure 28:
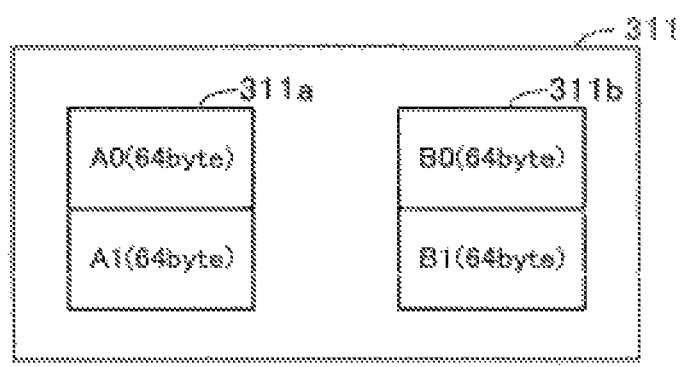
FIG. 28 is a diagram showing data stored in an internal RAM of an IPsec control circuit for DES processing.

FIG. 28 is a diagram showing data stored in the internal RAM of the IPsec control circuit for DES processing. As shown in FIG. 28, the internal RAM 311 of the IPsec control circuit 310 has an A side 311a and a B side 311b. Each of the A side 311a and the B side 311b can store data (128 bytes) for sixteen operations of the DES processing. The A-side 311a is a storage area for storing data to be processed, and the B-side 311b is a storage area for storing processed data.

The data for DES processing acquired from the memory 303 by DMA transfer is stored in the A side 311a. For example, 64-byte data is stored in an area "A0" on the A side 311a by DMA transfer. The 64-byte data stored in the area "A0" is passed first to the cryptographic processing circuit 320 and subjected to DES processing.

While DES processing is being executed on the data from the area "A0", following 64-byte data is stored in an area "A1" by DMA transfer. When the DES-processed data is outputted from the cryptographic processing circuit 320, the data is stored in a 64-byte area "B0" on the B side 311b.

In succession, the data stored in the 64-byte area "A1" on the A side 311a is passed to the cryptographic processing circuit 320 and subjected to DES processing. When the DES-processed data is outputted from the cryptographic processing circuit 320, the data is stored in a 64-byte area "B1" on the B side 311b.

When the processed data is stored in one of the areas "B0" and "B1" on the B side 311b, the data in the B-side 311b is DMA transferred to the memory 303 by the IPsec control circuit 310.

When the IPsec control circuit 310 receives data, it outputs the external bus opening request signal 392. When the reception of the data has been completed, the IPsec control circuit 310 returns the bus right to the CPU 301. At the same time, the cryptographic processing circuit 320 and the IPsec control circuit 310 start processing using the dedicated buses and dedicated control signals, without operation of the CPU 301. For the IPsec control circuit 310 to execute the above processing, the internal RAM 311 has an increment structure as to the address for the processing. The encrypted data is stored in the B side 311b of the 128-byte internal RAM 311 within the IPsec control circuit 310. For the IPsec control circuit 310 to execute this processing, the internal RAM 311 has an increment structure as to the address for indication of the storage destination. More specifically, an address obtained by adding a predetermined value (corresponding to 64 bytes) to an address used in the immediately preceding storage processing is designated.

Whenever the processing of 64-byte data is completed, the IPsec control circuit 310 outputs the external bus opening request signal 392 to the CPU 301. After having acquired the bus right, the IPsec control circuit 310 writes the result of the computation into the memory 303. When the writing is completed, the bus right is returned to the CPU 301.

It should be noted that even during computation by the cryptographic processing circuit 320, the external bus opening request signal 392 is outputted whenever the processing of 64-byte data in the internal RAM 311 storing data to be processed is completed. After the bus right is released to the IPsec control circuit 310, data to be encrypted is fetched from the memory 303. When the fetching of the data to be encrypted is completed, the bus right is returned to the CPU 301.

Similarly, even during computation by the cryptographic processing circuit 320, the external bus opening request signal 392 is outputted whenever 64-byte data is stored in the B side 311b for storing computation result data or processed data. After the bus right is released to the IPsec control circuit 310, the result of the computation is written into the memory 303. When the writing is completed, the bus right is returned to the CPU 301.

On the other hand, when the IPsec control circuit 310 and the hash function processing circuit 330 are combined for interrelated complex operation, the internal RAM 311 is used as a 128-byte double-sided structure. In this case, the two sides are both used for writing. A hash value obtained as computation result data or processed data is stored in a 160-bit hash value storage register in the hash function processing circuit 330. Then, when the computation is completed, the hash value is passed from the hash value storage register to the CPU 301. In the second embodiment, SHA1 processing is executed as hash processing.

Figure 29:
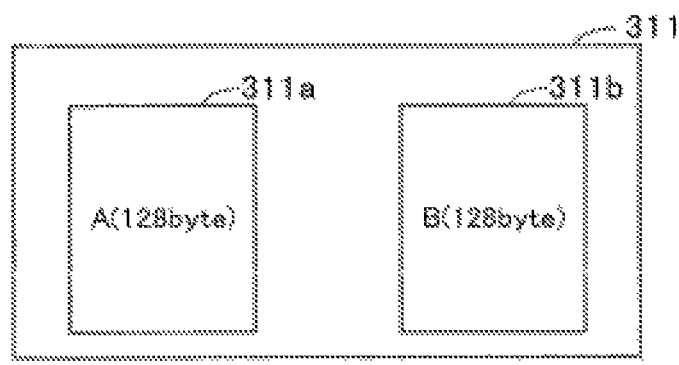
FIG. 29 is a diagram showing the configuration of the internal RAM of the IPsec control circuit when SHA1 processing is performed.

FIG. 29 is a diagram showing the configuration of the internal RAM of the IPsec control circuit when SHA1 processing is performed. As shown in FIG. 29, each of the A-side 311a and the B-side 311b of the internal RAM 311 is used as one area of 128 bytes.

The IPsec control circuit 310 fetches data to be processed by the hash function from the memory 303 by DMA transfer. In this case, after 128 bytes are continuously written, the bus right is returned to the CPU 301. Then, the IPsec control circuit 310 and the hash processing circuit 330 start hash processing without operation of the CPU 301.

The IPsec control circuit 310 immediately fetches data for hash processing from the memory 303 when one side of 128 bytes becomes empty during computation. In this case, after 128 bytes are continuously written, the bus right is returned. For the IPsec control circuit 310 to execute the above processing, the internal RAM 311 has an increment structure as to the address for the processing.

Read data from the IPsec control circuit 310, the cryptographic processing circuit 320, or the hash function processing circuit 330 is outputted to the CPU 301 or the IPsec control circuit 310 via the data-in selector 306 or outputted to the memory 303 via the memory controller 302.

Next, operations of the IPsec control circuit 310, the cryptographic processing circuit 320, and the hash function processing circuit 330 will be described in detail.

Figure 30:
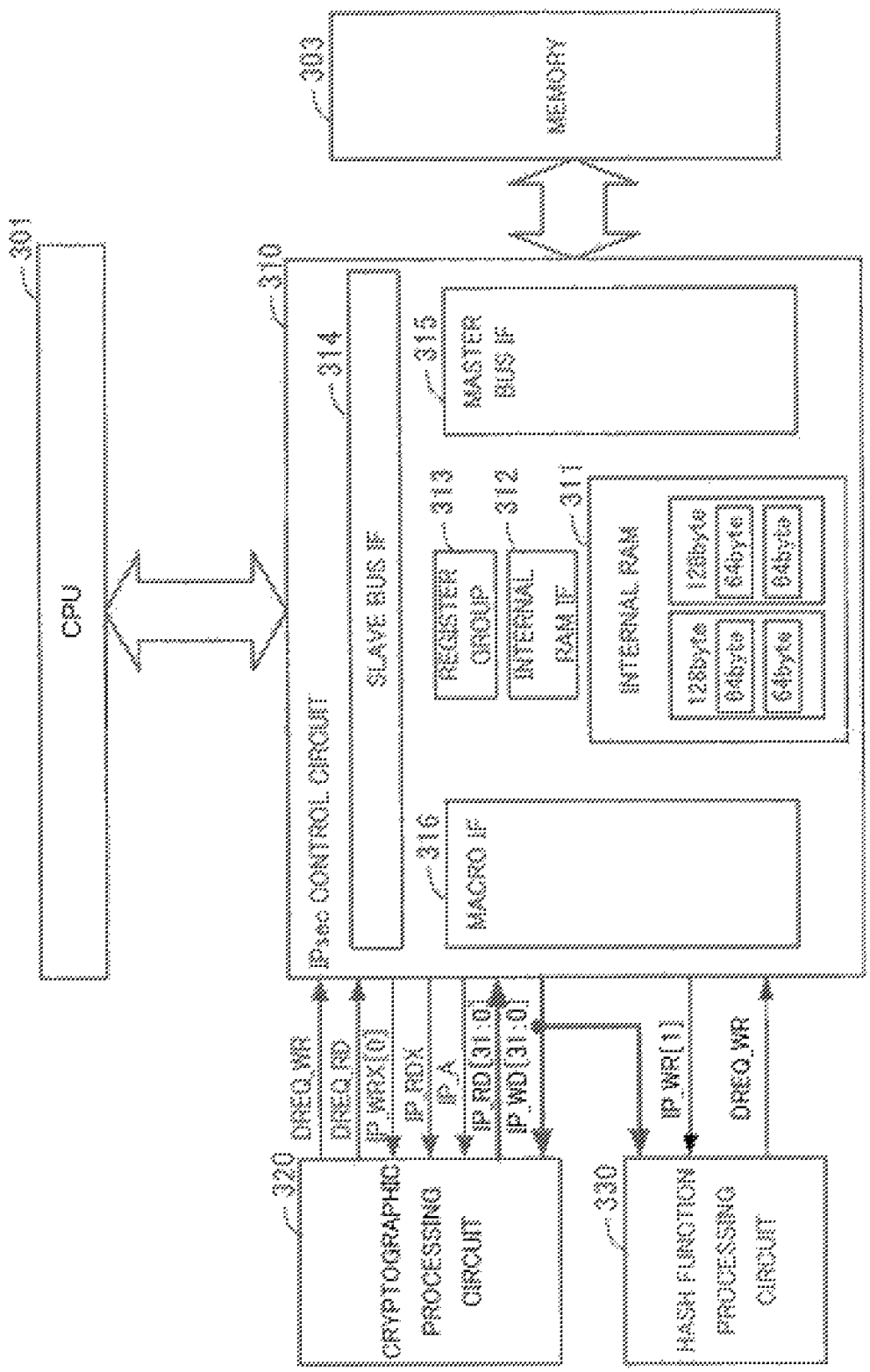
FIG. 30 is a diagram showing the internal configuration of the IPsec control circuit.

FIG. 30 is a diagram showing the internal configuration of the IPsec control circuit. As shown in FIG. 30, the IPsec control circuit 310 is comprised of the internal RAM 311, an internal RAM interface 312, a register group 313, a slave bus interface 314, a master bus interface 315, and a macro-interface 316.

The internal RAM 311 stores data to be processed and processed data, as described with reference to FIGS. 26 and 27. The internal RAM interface 312 is an interface that stores and reads data in and from the internal RAM 311. The register group 313 consists of a plurality of general-purpose registers for storing control data and the like. The slave bus interface 314 is an interface for operation as a slave on the bus 382. The master bus interface 315 is an interface for operation as a bus master on the bus 382. DAM transfer via the bus 382 is executed by the master bus interface 315. The macro-interface 316 is an interface for communication with the cryptographic processing circuit 320 and the hash function processing circuit 330.

The IPsec control circuit 310 and the cryptographic processing circuit 320 are connected by respective signals lines for transmission of a write request signal (DREQ_WR), a read request signal (DREQ_RD), a write strobe signal (IP_WRX [0]), a read strobe signal (IP_RDX), an address signal (IP_A), a read data signal (IP_RD [31:0]), and a write data signal (IP_WD [31:0]). On the other hand, the IPsec control circuit 310 and the hash function processing circuit 330 are connected by the write data signal (IP_WD [31:0]), a write strobe signal (IP_WRX [1]), and a write request signal (DREQ_WR).

The write request signal (DREQ_WR) is a signal sent from the cryptographic processing circuit 320 to the IPscc control circuit 310 to request 32-bit data writing.

The read request signal (DREQ_RD) is a signal sent from the cryptographic processing circuit 320 to the IPsec control circuit 310 to request 32-bit data reading.

The write strobe signal (IP_WRX [0]) is a signal sent from the IPsec control circuit 310 to the cryptographic processing circuit 320 for notification of data writing.

The read strobe signal (IP_RDX) is a signal sent from the IPsec control circuit 310 to the cryptographic processing circuit 320 for notification of reading data in the cryptographic processing circuit 320.

The address signal (IP_A) is a signal sent from the IPsec control circuit 310 to the cryptographic processing circuit 320 for designation of an address for data access.

The signal line for the read data signal (IP_RD [31:0]) is a dedicated bus via which 32-bit read data is passed from the cryptographic processing circuit 320 to the IPsec control circuit 310.

The signal line for the write data signal (IP_WD [31:0]) is a dedicated bus via which 32-bit write data is passed from the IPsec control circuit 310 to the cryptographic processing circuit 320 or the hash function processing circuit 320.

The write strobe signal (IP_WRX [1]) is a signal sent from the IPsec control circuit 310 to the hash function processing circuit 330 for notification of data writing.

The write request signal (DREQ_WR) is a signal sent from the hash function processing circuit 330 to the IPsec control circuit 310 to request data writing.

Figure 31:
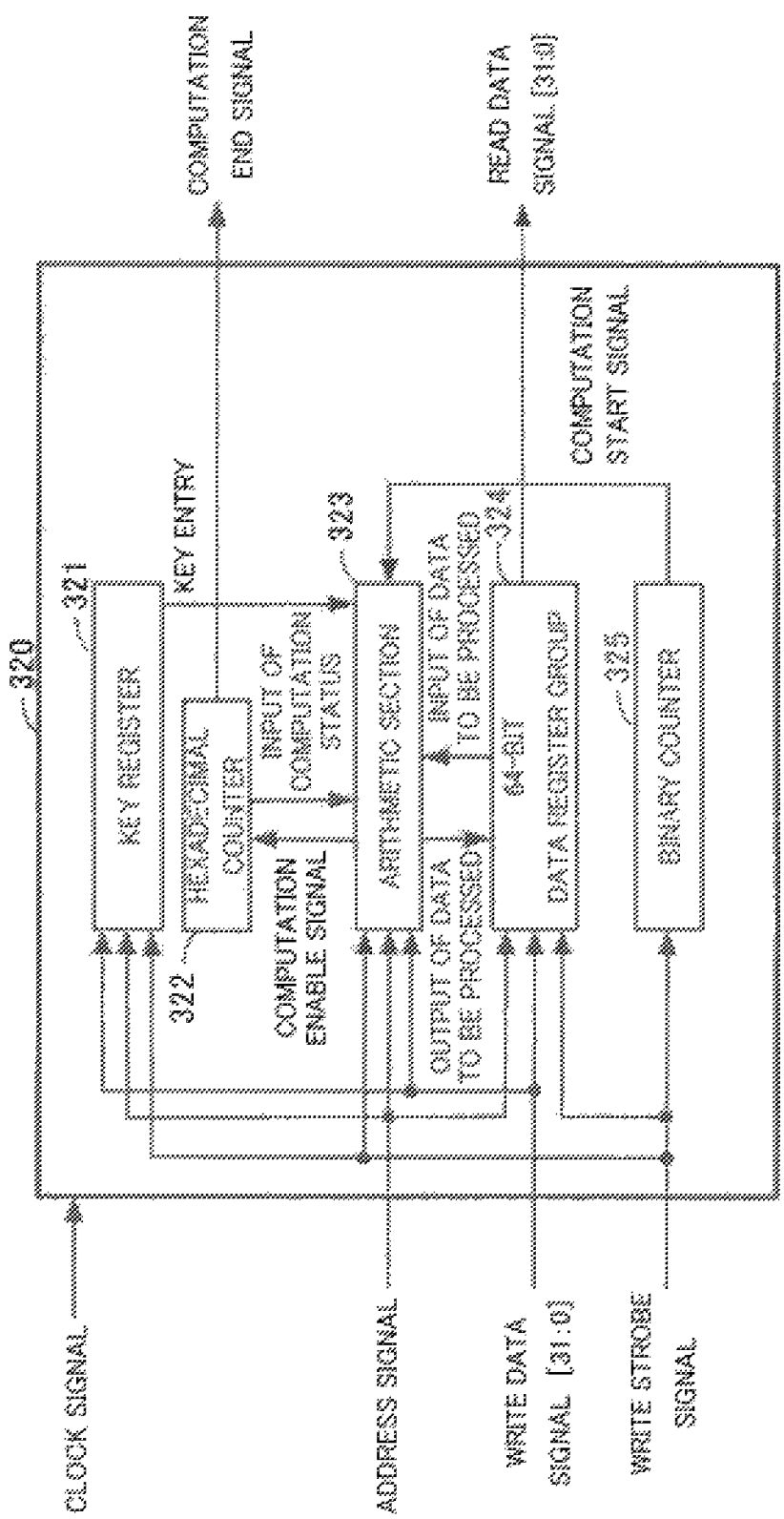
FIG. 31 is a diagram showing the internal configuration of a cryptographic processing circuit.

FIG. 31 is a diagram showing the internal configuration of the cryptographic processing circuit. The cryptographic processing circuit 320 is comprised of a key register 321, a hexadecimal counter 322, an arithmetic section 323, a 64-bit data register group 324, and a binary counter 325.

The cryptographic processing circuit 320 receives a clock signal, the address signal (IP_A), the write data signal (IP_WD [31:0]), and the write strobe signal (IP_WRX [0]). The cryptographic processing circuit 320 operates in synchronism with the clock signal. The address signal (IP_A) is inputted to the key register 321, the arithmetic section 323, and the 64-bit data register group 324. The write data signal (IP_WD [31:0]) is inputted to the key register 321 and the 64-bit data register group 324. The write strobe signal (IP_WRX [0]) is inputted to the key register 321, the arithmetic section 323, the 64-bit data register group 324, and the binary counter 325.

The key register 321 is a register for storing key data (encryption key or decryption key) to be used for encryption or decryption. The data stored in the key register 321 is inputted to the arithmetic section 323.

The hexadecimal counter 322 counts the number of computations based on a computation enable signal inputted from the arithmetic section 323. As long as the number of computations is under 16, the computation status indicating that computation is being executed is inputted to the arithmetic section 323. When the hexadecimal counter 322 has counted up to 16, a computation end signal is outputted.

The arithmetic section 323 performs operation or computation for encryption or decryption. More specifically, the arithmetic section 323 starts computation in response to input of a computation start signal from the binary counter 325. For execution of the computation, first, the arithmetic section 323 acquires data to be processed from the 64-bit data register group 324. Then, the arithmetic section 323 encrypts or decrypts the data to be processed, by using key data inputted from the key register 321. When the computation is completed, the arithmetic section 323 stores the result of the computation in a register within the 64-bit data register group. It should be noted that the result of computation (processed data) is stored in a register that data to be processed has been stored, in a manner such that the data to be processed is overwritten.

The 64-bit data register group 324 is a register group for storing data to be processed and a result of computation. More specifically, the 64-bit data register group 324 is comprised of two 32-bit registers. Data to be processed is inputted to the 64-bit data register group 324 as the 32-bit write data signal, and then stored in one of the registers. On the other hand, when a result of computation is stored in the 64-bit data register group 324, it is outputted as the read data signal (IP_RD [31:0]).

The binary counter 325 is a counter that counts the number of inputs of the write strobe signal. When the write strobe signal is inputted twice, the binary counter 325 outputs the computation start signal to the arithmetic section 323. More specifically, since the width of the bus for the write data signal is 32 bits, storage of data to be processed in the 64-bit data register group 324 is completed after two writing operations. Thus, after the write strobe signal is inputted twice, DES processing of a 64-bit unit can be started.

When DES processing is to be executed in the cryptographic processing circuit 320 described above, first, key data is stored in the key register 321. Then, data to be processed is written into the 64-bit data register group 324 as the write data signal in two writing operations. When the binary counter 325 detects that two writing operations have been performed, the computation start signal is outputted.

In response to the computation start signal, the arithmetic section 323 executes DES processing on the data to be processed, and writes the result of computation back into the 64-bit data register group 324. The result is outputted as read data from the 64-bit data register group 324. Further, whenever DES processing is carried out by the arithmetic section 323, an enable signal is outputted to the hexadecimal counter 322, and the value of the hexadecimal counter is counted up. Then, when the count of the hexadecimal counter 322 reaches 16, the computation end signal is outputted.

As described above, since the cryptographic processing circuit 320 in the second embodiment counts the number of data writes (in units of 32 bits), it is possible to automatically recognize timing for starting computation upon completion of data writing and start the operation. More specifically, the binary counter 325 functions as a data write counter which detects the start of the computation. Further, the hexadecimal counter 322 functions as a computation round counter to recognize the end of computation by termination of a predetermined number of rounds of computation and output the computation end signal. It should be noted that the result of encryption or decryption is written over the 64-bit data register group 324 (2×32 bits).

Next, a description will be given of the internal configuration of the hash function processing circuit 330.

Figure 32:
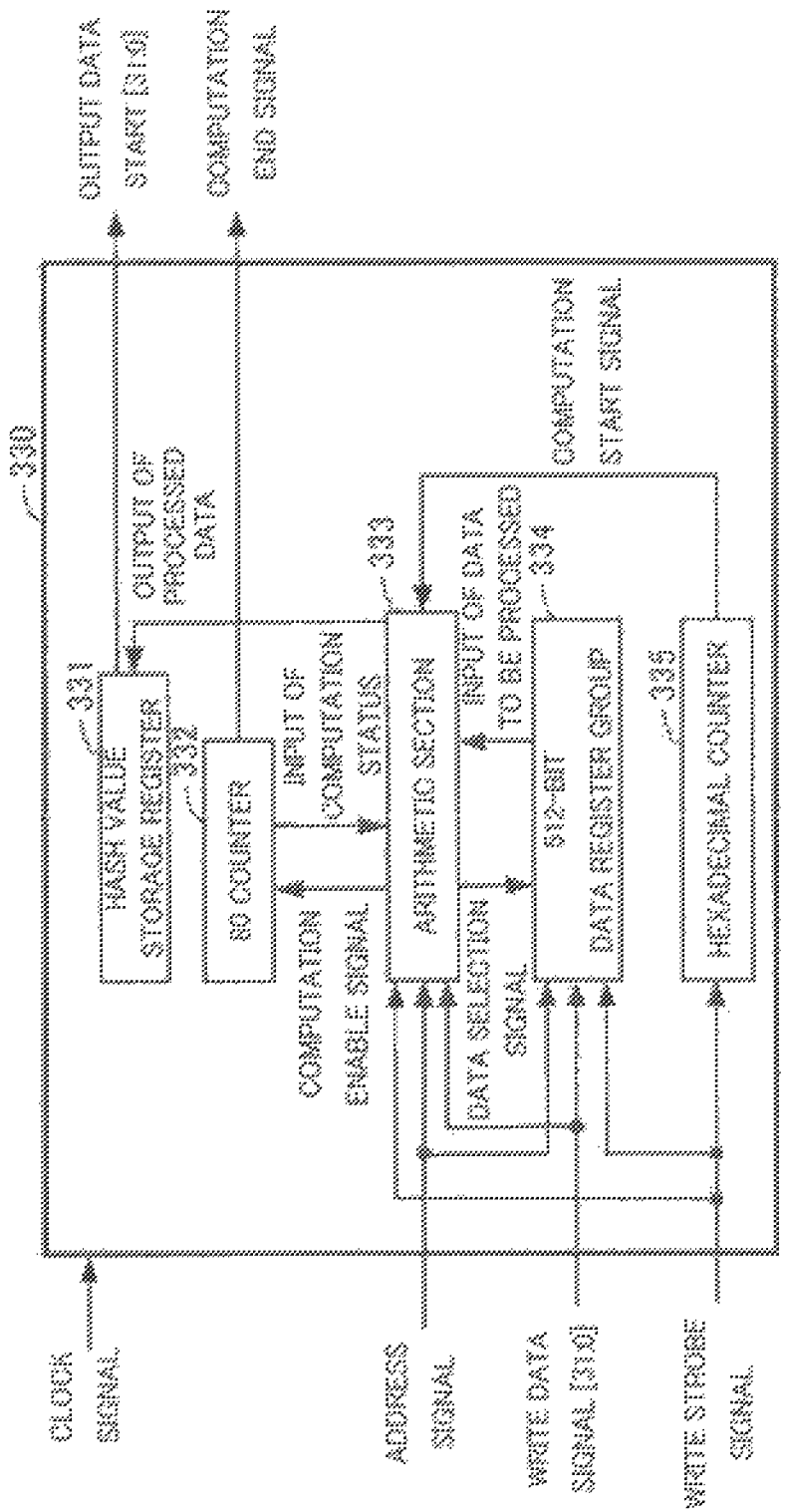
FIG. 32 is a diagram showing the internal configuration of a hash function processing circuit.

FIG. 32 is a diagram showing the internal configuration of the hash function processing circuit. The hash function processing circuit 330 is comprised of a hash value storage register 331, an 80 counter 332, an arithmetic section 333, a 512-bit data register group 334, and a hexadecimal counter 335.

The hash function processing circuit 330 receives the clock signal, the address signal, write data, and the write strobe signal. The hash function processing circuit 330 operates in synchronization with the clock signal. The address signal is inputted to the arithmetic section 333 and the 512-bit data register group 334. The write data is inputted to the arithmetic section 333 and the 512-bit data register group 334. The write strobe signal is inputted to the arithmetic section 333, the 512-bit data register group 334, and the hexadecimal counter 335.

The hash value storage register 331 is a register group for storing a hash value generated by the hash function processing. In the second embodiment, the hash value storage register 331 is comprised of five 32-bit registers and capable of storing 160-bit data in total.

The 80 counter 332 counts the number of computations based on a computation enable signal inputted from the arithmetic section 333. As long as the number of computations is smaller than 80, the computation status indicating that computation is being executed is inputted to the arithmetic section 333. When the 80 counter 332 has counted up to 80, a computation end signal is outputted.

The arithmetic section 333 performs a hash value-computing process based on the hash function. More specifically, the arithmetic section 333 starts computation in response to input of a computation start signal from the hexadecimal counter 335. To execute the computation, first, the arithmetic section 333 acquires data to be processed, from the 512-bit data register group 334. Then, the arithmetic section 333 generates a hash value based on the data to be processed. When the computation is completed, the arithmetic section 333 stores the result of computation in a register within the 512-bit data register group 334. The result of computation is stored in a register that data to be processed has been stored, in a manner such that the data to be processed is overwritten.

The 512-bit data register group 334 is a register group for storing data to be processed and a result of computation. More specifically, the 512-bit data register group 334 is comprised of sixteen 32-bit registers. Data to be processed are inputted to the 512-bit data register group 334 as the 32-bit write data signal and sequentially stored in the respective registers.

The hexadecimal counter 335 is a counter that counts the number of inputs of the write strobe signal. When the write strobe signal is inputted 16 times, the hexadecimal counter 335 outputs the computation start signal to the arithmetic section 333. More specifically, since the width of the bus for the write data signal is 32 bits, storage of data to be processed in the 512-bit data register group 334 is completed after sixteen writing operations. Thus, after the write strobe signal is inputted 16 times, hash function processing of a 512-bit unit can be started.

In the hash function processing circuit 330 configured as above, when a hash value is to be generated based on the hash function, first, data to be processed is stored in units of 32 bits in the 512-bit data register group 334. The number of writing operations is counted by the hexadecimal counter 335, and hence when the number of writing operations reaches sixteen, the computation start signal is outputted from the hexadecimal counter 335. In response to the computation start signal, the arithmetic section 333 starts computation according the hash function. More specifically, the arithmetic section 333 obtains data to be processed from the 512-bit data register group 334 and executes processing according to the hash function. The processing repeatedly carried out 80 times by the arithmetic section 333 generates a hash value, which is then stored in the hash value storage register 331. The data within the hash value storage register 331 is outputted as read data. At this time, the 80 counter 332 detects that the number of computations has reached 80, and outputs the computation end signal.

Thus, the hash function processing circuit 330 generates a hash value.

The CPU 301, the IPsec control circuit 310, the cryptographic processing circuit 320, and the hash function processing circuit 330 are discrete circuits which can process data in parallel with each other. In the following, a description will be given of the procedure of processing executed by each of the CPU 301, IPsec control circuit 310, the cryptographic processing circuit 320, and the hash function processing circuit 330.

Figure 33:
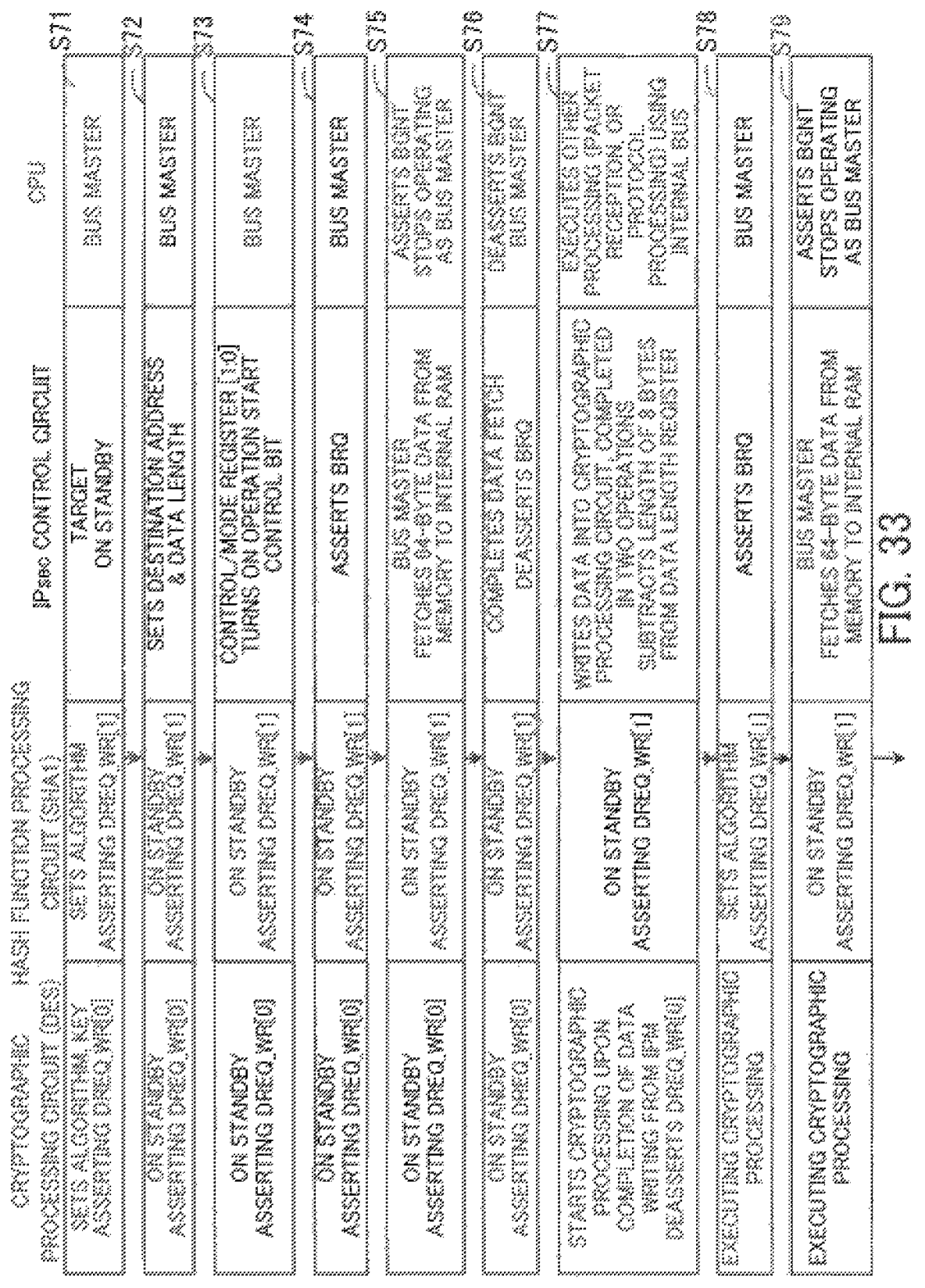

FIG. 33 is a first diagram showing operations of each circuit for cryptographic processing in a time sequence. In the following, a process shown in FIG. 33 will be described in the order of step numbers. It should be noted that in the second embodiment, the cryptographic processing circuit 320 performs DES processing, and the hash function processing circuit 330 performs SHA1 processing.

[Step S71] Each circuit sets initial values. The cryptographic processing circuit 320 sets an algorithm (DES) and a key. At this time, the write request signal (DREQ_WR [0]) has been asserted. The hash function processing circuit 330 sets an algorithm (SHA1). At this time, the write request signal (DREQ_WR [1]) has been asserted. The IPsec control circuit 310 is on standby for acquiring data to be processed (target data). At this time, the CPU 301 is operating as the bus master for the main bus.

[Step S72] The IPsec control circuit 310 sets a source address, a destination address, and a data length as parameters necessary for DMA transfer. The cryptographic processing circuit 320 enters a standby state.

[Step S73] The IPsec control circuit 310 turns on an operation start control bit within a control/mode register [1:0] (i.e. sets the value to "1").

[Step S74] The IPsec control circuit 310 asserts an external bus relinquish request signal (BRQ).

[Step S75] The CPU 301 asserts an external bus relinquish acceptance signal (BGNT) and stops operating as the bus master. The IPsec control circuit 310 becomes the bus master, and fetches 64-byte data from the memory 303 to the internal RAM 311 by DMA transfer.

[Step S76] The IPsec control circuit 310 completes the data fetch and deasserts the external bus relinquish request signal (BRQ). The CPU 301 deasserts the external bus relinquish acceptance signal (BGNT) and becomes the bus master.

[Step S77] The IPsec control circuit 310 writes the 64-bit data into the cryptographic processing circuit 320 in two operations and completes the writing. At this time point, the IPsec control circuit 310 subtracts the length of 8 bytes from the data length stored in the data length register. Upon completion of the data writing from the IPsec control circuit 310, the cryptographic processing circuit 320 starts cryptographic processing (encryption or decryption). At this time point, the cryptographic processing circuit 320 deasserts the write request signal (DREQ_WR [0]). In the meantime, the CPU 301 executes other processing (including packet reception and protocol processing) using the internal bus.

[Step S78] The cryptographic processing circuit 320 executes the cryptographic processing. The IPsec control circuit 310 asserts the external bus relinquish request signal (BRQ). At this time, the CPU 301 is still operating as the bus master.

[Step S79] The CPU 301 asserts the external bus relinquish acceptance signal (BGNT) and stops operating as the bus master. The IPsec control circuit 310 becomes the bus master, and fetches 64-byte data from the memory 303 to the internal RAM 311 by DMA transfer.

Figure 34:
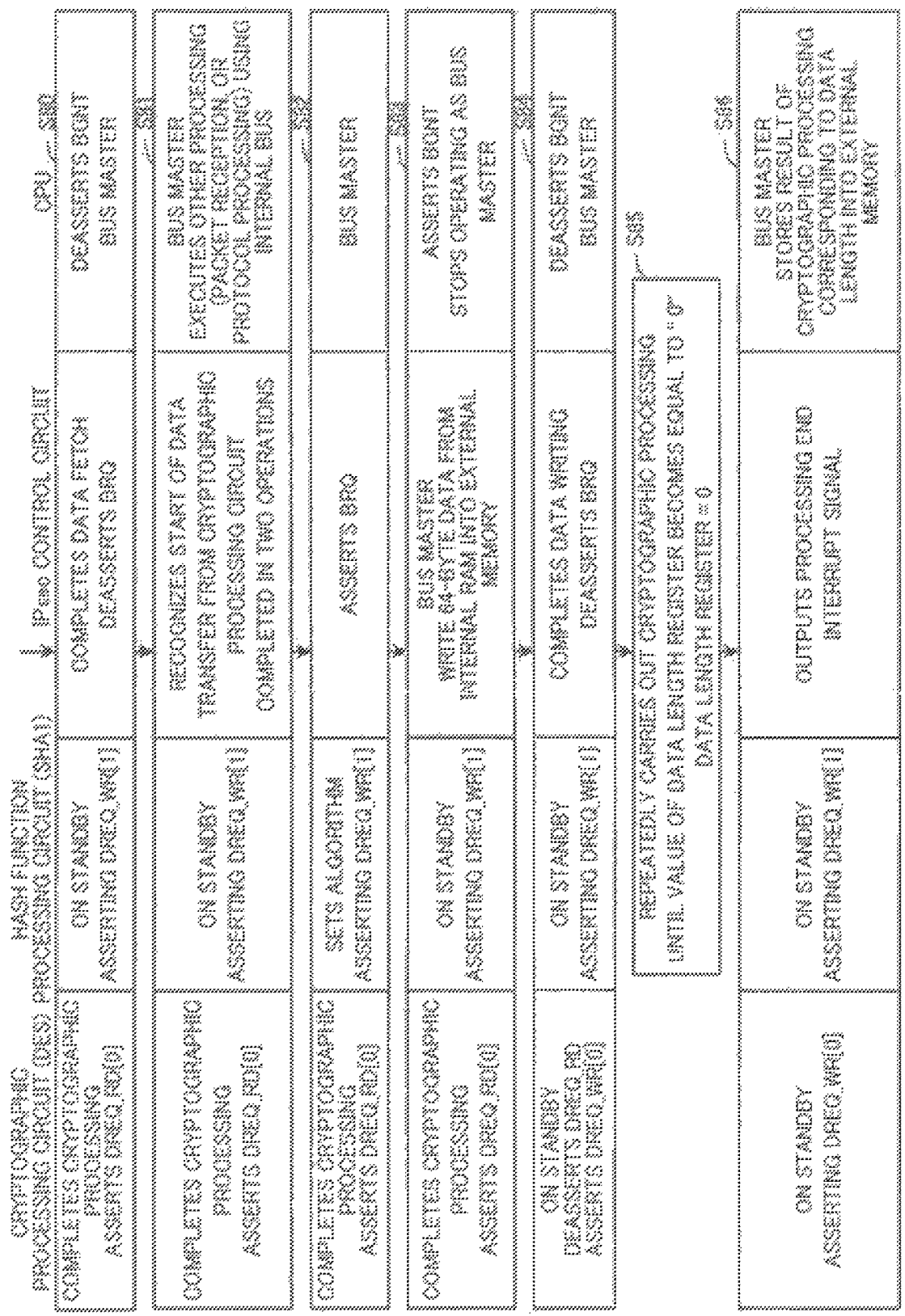
FIG. 34 is a second diagram showing operations of each circuit for cryptographic processing in a time sequence.

FIG. 34 is a second diagram showing operations of each circuit for cryptographic processing in a time sequence. In the following, a process shown in FIG. 34 will be described in the order of step numbers.

[Step S80] The IPsec control circuit 310 completes the data fetch and deasserts the external bus relinquish request signal (BRQ). The CPU 301 deasserts the external bus relinquish acceptance signal (BGNT) and becomes the bus master. In the meantime, the cryptographic processing by the cryptographic processing circuit 320 is completed, and the read request signal (DREQ_RD)) is asserted by the cryptographic processing circuit 320.

[Step S81] The IPsec control circuit 310 recognizes the start of data transfer from the cryptographic processing circuit 320, and fetches the 64-bit data in two operations. In the meantime, the CPU 301 executes other processing (including packet reception and protocol processing) using the internal bus.

[Step S82] The IPsec control circuit 310 asserts the external bus relinquish request signal (BRQ).

[Step S83] The CPU 301 asserts the external bus relinquish acceptance signal (BGNT) and stops operating as the bus master. The IPsec control circuit 310 becomes the bus master, and writes 64-byte data from the internal RAM 311 into the memory 303 by DMA transfer.

[Step S84] The IPsec control circuit 310 completes data writing and deasserts the external bus relinquish request signal (BRQ). The CPU 301 deasserts the external bus relinquish acceptance signal (BGNT) and becomes the bus master. The cryptographic processing circuit 320 deasserts the read request signal (DREQ_RD) and asserts the write request signal (DREQ_WR [0]) at the same time, and enters a standby state.

[Step S85] The above steps S74 to S84 are repeatedly carried out until the value of the data length register becomes equal to "0". When the value of the data length register becomes equal to "0", the processing proceeds to a step S86.

[Step S86] The IPsec control circuit 310 outputs a processing end interrupt signal. The CPU 301 stores the result of the cryptographic processing corresponding to the data length in the memory 303.

Next, a description will be given of hash value generation processing based on the hash function.

Figure 35:
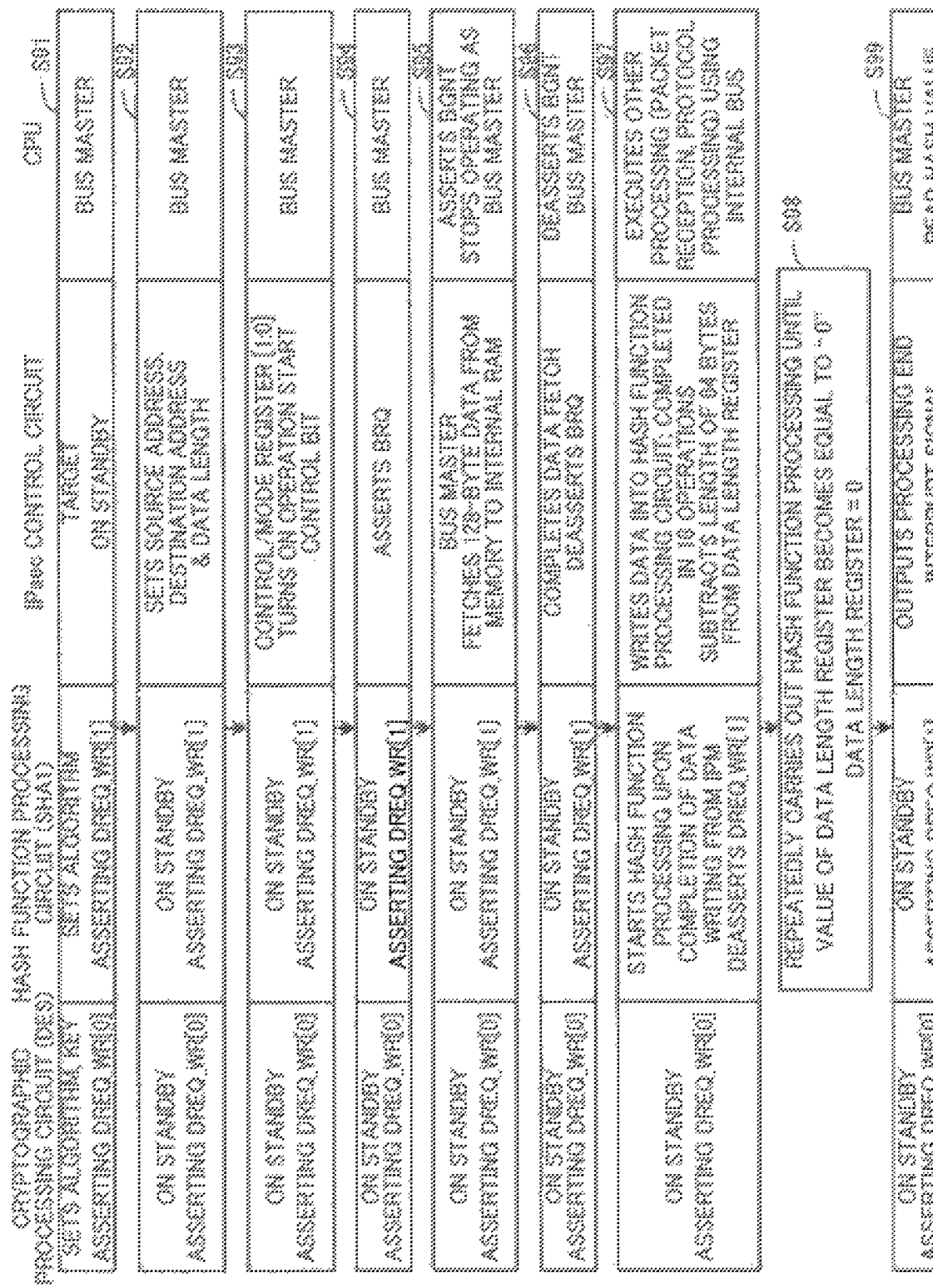
FIG. 35 is a diagram showing operations of circuits for hash value generation processing in a time sequence.

FIG. 35 is a diagram showing operations of circuits for hash value generation processing in a time sequence. In the following, a process shown in FIG. 35 will be described in the order of step numbers.

[Step S91] Each circuit sets the initial values. The cryptographic processing circuit 320 sets the algorithm (DES) and the key. At this time, the write request signal (DREQ_WR [0]) has been asserted. The hash function processing circuit 330 sets the algorithm (SHA1). At this time, the write request signal (DREQ_WR [1]) has been asserted. The IPsec control circuit 310 is on standby for acquiring data to be processed (target data). At this time, the CPU 301 is operating as the bus master for the main bus.

[Step S92] The IPsec control circuit 310 sets a source address, a destination address, and a data length as parameters necessary for DMA transfer.

[Step S93] The IPsec control circuit 310 turns on the operation start control bit within the control/mode register [1:0] (i.e. sets the value to "1").

[Step S94] The IPsec control circuit 310 asserts the external bus relinquish request signal (BRQ).

[Step S95] The CPU 301 asserts the external bus relinquish acceptance signal (BGNT) and stops operating as the bus master. The IPsec control circuit 310 becomes the bus master, and fetches the 128-byte data from the memory 303 to the internal RAM 311 by DMA transfer.

[Step S96] The IPsec control circuit 310 completes the data fetch and deasserts the external bus relinquish request signal (BRQ). The CPU 301 deasserts the external bus relinquish acceptance signal (BGNT) and becomes the bus master.

[Step S97] The IPsec control circuit 310 writes 512-bit data into the hash function processing circuit 330 in sixteen operations and completes the writing. At this time point, the IPsec control circuit 310 subtracts the length of 64 bytes from the data length stored in the data length register. Upon completion of data writing from the IPsec control circuit 310, the hash function processing circuit 330 starts hash function processing. At this time point, the hash function processing circuit 330 deasserts the write request signal (DREQ_WR [1]). In the meantime, the CPU 301 executes other processing (including packet reception and protocol processing) using the internal bus.

[Step S98] The steps S94 to S97 are repeatedly carried out until the value of the data length register becomes equal to "0". When the value of the data length register becomes equal to "0", the process proceeds to a step S99.

[Step S99] The IPsec control circuit 310 outputs the processing end interrupt signal. The CPU 301 reads a generated hash value.

Next, operation waveforms during execution of cryptographic processing and hash function processing will be described with reference to timing charts.

Figure 36:
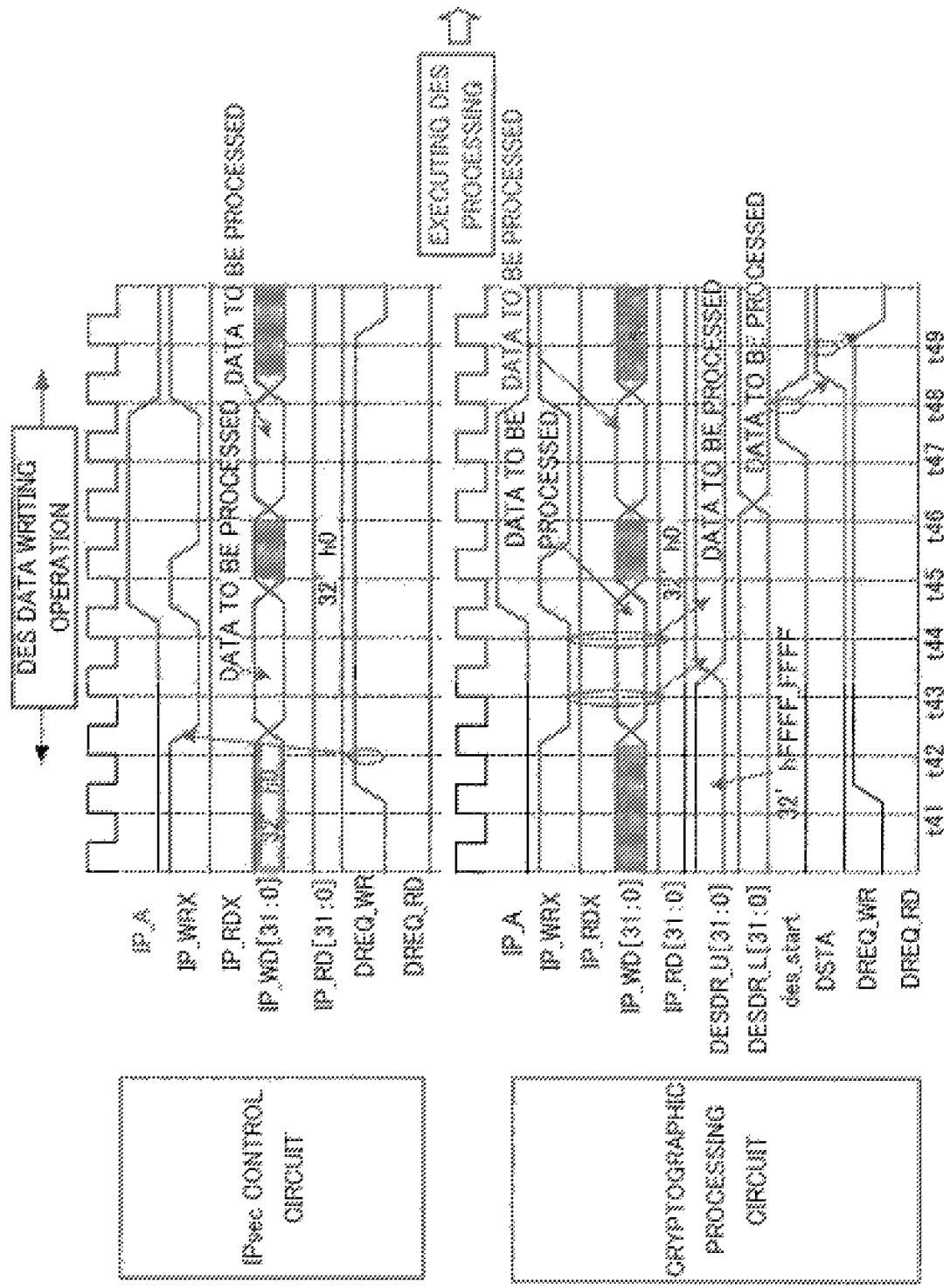
FIG. 36 is a first timing chart showing operation waveforms of signals in buses between the IPsec control circuit and the cryptographic processing circuit.

FIG. 36 is a first timing chart showing operation waveforms of the signals in the buses between the IPsec control circuit and the cryptographic processing circuit. In FIG. 36, the signals at the terminals of the IPsec control circuit 310 are shown in the upper half, and the signals at the terminals of the cryptographic processing circuit 320 and data within the cryptographic processing circuit 320 are shown in the lower half.

As signals on the side of the IPsec control circuit 310, there are shown the address signal (IP_A), the write strobe signal (IP_WRX [0]), the read strobe signal (IP_RDX), the write data signal (IP_WD [31:0]), the read data signal (IP_RD [31:0]), the write request signal (DREQ_WR), and the read request signal (DREQ_RD).

As signals on the side of the cryptographic processing control circuit 320 side, there are shown the address signal (IP_A), the write strobe signal (IP_WRX [0]), the read strobe signal (IP_RDX), the write data signal (IP_WD [31:0]), the read data signal (IP_RD [31:0]), a first data register value (DESDR_U), a second data register value (DESDR_L), the computation start signal (des_start), an computation status (DSTA), the write request signal (DREQ_WR), and the read request signal (DREQ_RD). The first data register value (DESDR_U) is indicative of the value of one data register (first data register) within the 64-bit data register group 324. The second data register value (DESDR_L) is the value of the other data register (second data register) within the 64-bit data register group 324.

It should be noted that each signal shown in FIG. 36 is a active-low signal.

In response to a write signal, data from the IPsec control circuit 310 is written in units of 32 bits into the first data register and the second data register. When the data is written into the registers, the computation start signal (des_start) is asserted. At the same time, the computation status (DSTA) is also turned on. The completion of computation is recognized by the hexadecimal counter 322 showing a terminating number, whereupon a control signal is outputted, and the computation status (DSTA) is turned off.

The address signal (IP_A) is a one-bit signal that operates as an address for designating the first data register or the second data register. When writing in the first register is to be performed, the address signal (IP_A) shows "0" (low level) and when writing in the second data register is to be performed, the address signal (IP_A) shows "1" (high level).

The write request signal (DREQ_WR) is a signal sent from the cryptographic processing circuit 320 to the IPsec control circuit 310 for data request. This signal is asserted when computation is not being carried out and when reading of a result of computation is not being awaited. First, the write request signal (DREQ_WR) is asserted before computation, and deasserted after completion of data writing in the 64-bit data register group 324. After completion of the computation, the read request signal (DREQ_RD) is asserted. The read request signal (DREQ_RD) is a data read request signal indicating that data is ready for reading, in a state stored in the 64-bit data register group 324 in an overwriting manner. After the IPsec control circuit 310 carries out reading, the read request signal (DREQ_RD) is deasserted, and the write request signal (DREQ_WR) is asserted again. Further, as far as the cryptographic processing circuit is concerned, the bus for carrying the write data signal (IP_WD [31:0]) from the IPsec control circuit 310 to the cryptographic processing circuit and the bus for carrying the read data signal (IP_RD [31:0]) from the cryptographic processing circuit to the IPsec control circuit 310 are provided so that the IPsec control circuit 310 can perform both writing and reading of data to be processed.

In the following, changes of each signal shown in FIG. 36 will be described in a time sequence.

At a time t41, the write request signal (DREQ_WR) is asserted.

At a time t42 (one cycle after the time t41), the write strobe signal (IP_WRX [0]) is asserted. At the same time, data (32 bits) to be processed is outputted from the IPsec control circuit 310 as the write data signal (TP_WD [31:0]).

At a time t43 (one cycle after the time t42), the target data to be processed is stored as the first data register value (DESDR_U) in the first data register of the 64-bit data register group 324 of the cryptographic processing circuit 320.

At a time t44 (one cycle after the time t43), the output of the data to be processed as the write data signal (IPWD [31:0]) is stopped, and the write strobe signal (IP_WRX [0]) is deasserted. At the same time, the address signal (IP_A) is set to "1" by the IPsec control circuit 310. More specifically, the address of the second data register of the 64-bit data register group 324 is designated.

At a time t45 (one cycle after the time t44), the write strobe signal (IP_WRX [0]) is asserted. At the same time, the data (32 bits) to be processed is outputted from the IPsec control circuit 310 as the write data signal (IP_WD [31:0]).

At a time t46 (one cycle after the time t45), the data to be processed is stored as the second data register value (DESDR_L) in the second data register of the 64-bit data register group 324 of the cryptographic processing circuit 320.

At a time t47 (one cycle after the time t46), the address signal (IP_A) is set to "0" by the IPsec control circuit 310, and the write strobe signal (IP_WRX [0]) is deasserted. At the same time, data output as the write data signal (IP_WD [31:0]) is stopped. Further, in the cryptographic processing circuit 320, the computation start signal (des_start) is asserted.

At a time t48 (one cycle after the time t47), the computation status (DSTA) is turned on, and the computation start signal (des_start) is deasserted.

At a time t49 (one cycle after the time t48), the write request signal (DREQ_WR) is negated. Then, DES processing is executed in the cryptographic processing circuit 320.

Figure 37:
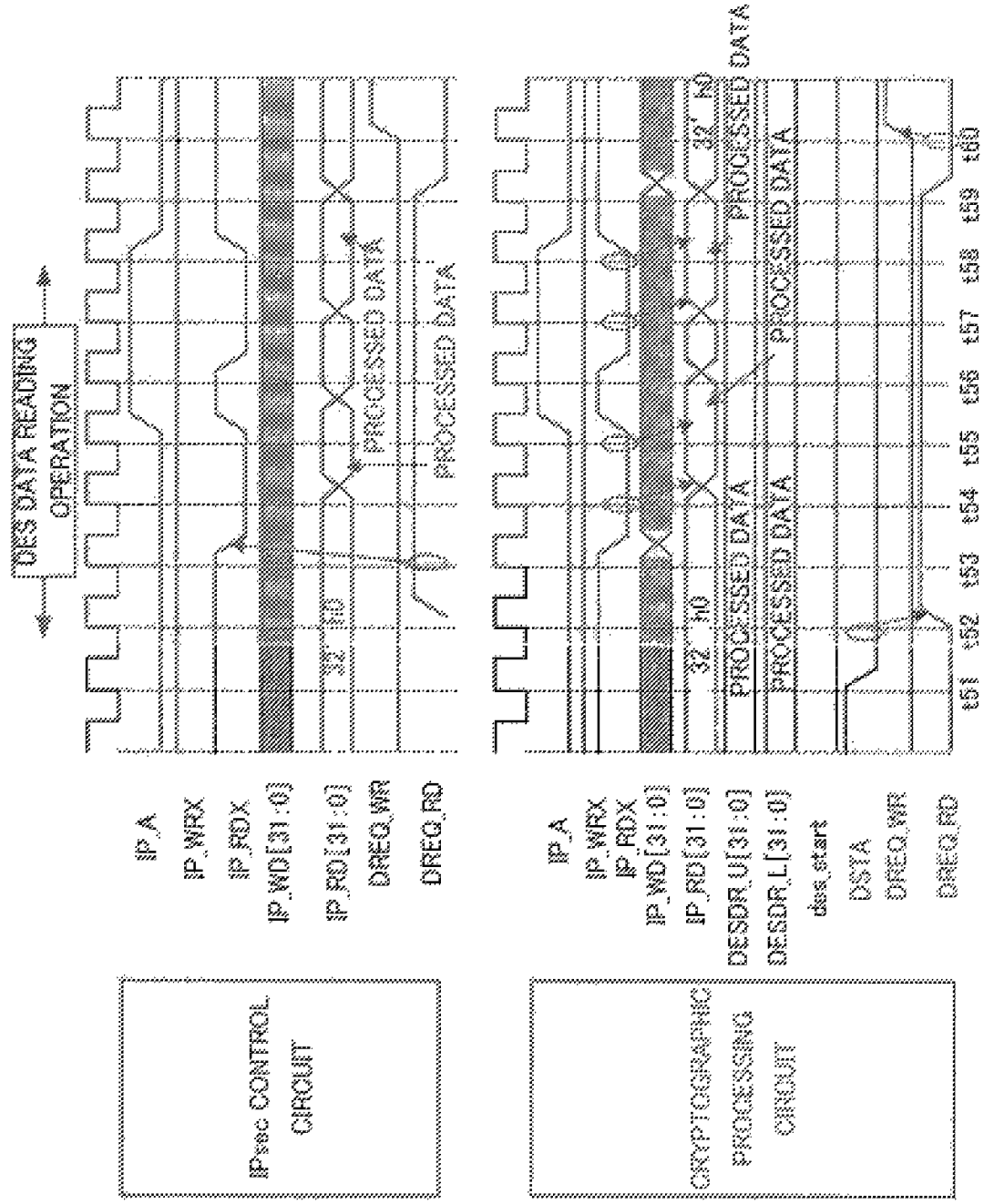
FIG. 37 is a second timing chart showing operation waveforms of the signals in the buses between the IPsec control circuit and the cryptographic processing circuit.

FIG. 37 is a second timing chart showing operation waveforms of the signals in the buses between the IPsec control circuit and the cryptographic processing circuit. The operation waveforms shown in FIG. 37 are those after completion of the DES processing.

At a time t51 when the DES process is completed, the computation status (DSTA) is turned off.

At a time t52 (one cycle after the time t51), the read request signal (DREQ_RD) is asserted by the cryptographic processing circuit 320.

At a time t53 (one cycle after the time t52), the read strobe signal (IP_RDX) is asserted.

At a time t54 (one cycle after the time t53), processed data (32 bits) is outputted from the cryptographic processing circuit 320 as the read data signal (IP_RD [31:0]) and read in by the IPsec control circuit 310. At this time, since the address signal (IP_A) assumes "0", the data in the first data register is outputted as the read data signal (IP_RD [31:0]).

At a time t55 (one cycle after the time t54), the read strobe signal (IP_RDX) is deasserted, and the address signal (IP_A) is set to "1" by the IPsec control circuit 310.

At a time t56 (one cycle after the time t55), the read strobe signal (IP_RDX) is asserted. At the same time, data output as the read data signal (IP_RD [31:0]) is temporarily stopped.

At a time t57 (one cycle after the time t56), processed data (32 bits) is outputted from the cryptographic processing circuit 320 as the read data signal (IP_RD [31:0]) and read in by the IPsec control circuit 310. At this time, since the address signal (IP_A) assumes "1", the data in the second data register is outputted as the read data signal (IP_RD [31:0]).

At a time t58 (one cycle after the time t57), the read strobe signal (IP_RDX) is deasserted, and the address signal (IP_A) is set to "1" by the IPsec control circuit 310.

At a time t59 (one cycle after the time t58), the read request signal (DREQ_RD) is deasserted. At the same time, data output as the read data signal (IP_RD [31:0]) is stopped.

At a time t60 (one cycle after the time t99), the write request signal (DREQ_WR) is asserted, and DES processing for following data is carried out.

Figure 38:
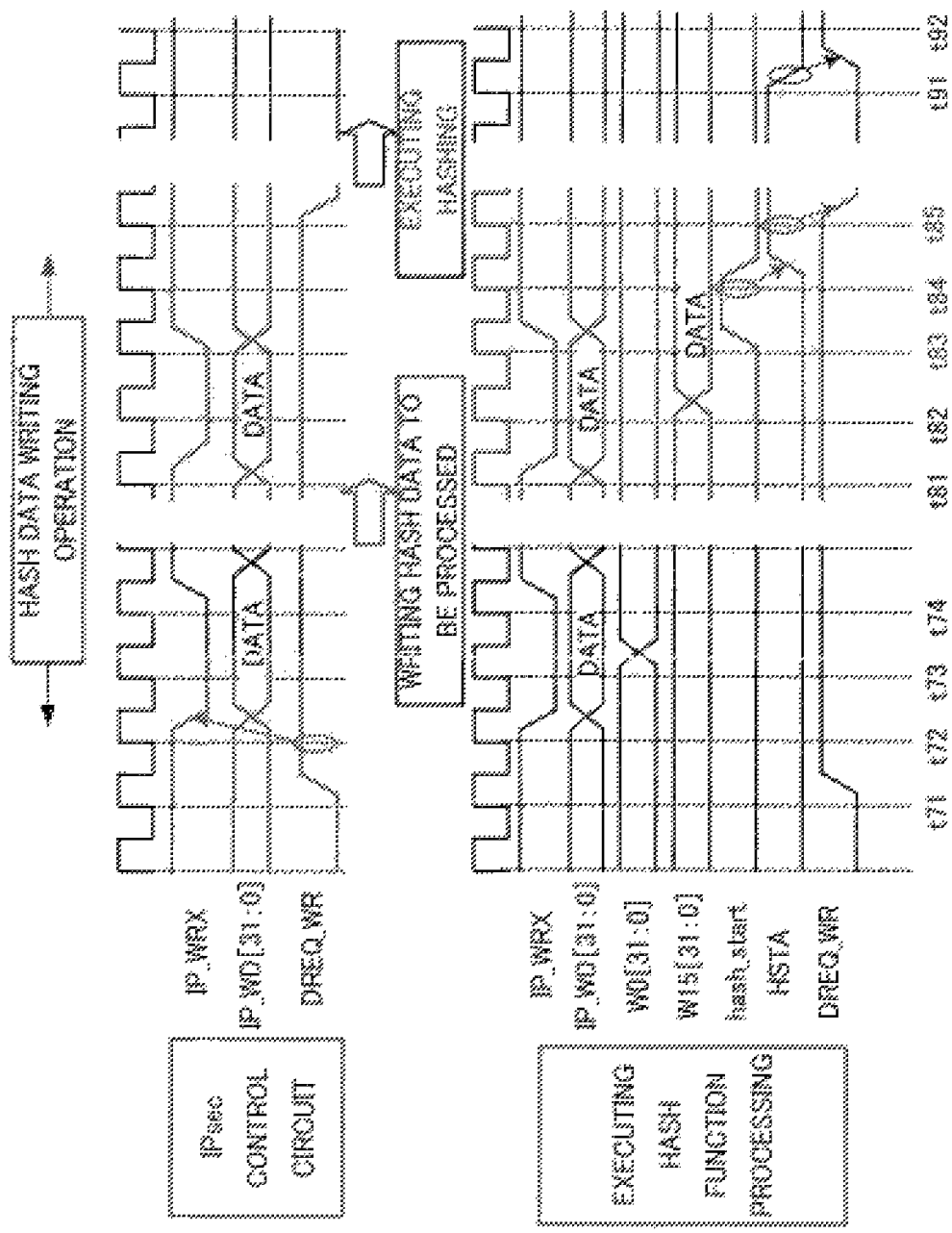
FIG. 38 is a timing chart showing operation waveforms of the signals in the buses between the IPsec control circuit and the hash function processing circuit.

FIG. 38 is a timing chart showing operation waveforms of the signals in the buses between the IPsec control circuit and the hash function processing circuit. In FIG. 38, signals at the terminals of the IPsec control circuit 310 are shown in the upper half, and signals at the terminals of the hash function processing circuit 330 and data within the hash function processing circuit 330 are shown in the lower half. It should be noted that this example shows operation waveforms in SHA1 processing by the hash function processing circuit 330.

As signals on the side of the IPsec control circuit 310, there are shown the write strobe signal (IP_WRX [1]), the write data signal (IP_WD [31:0]), and the write request signal (DREQ_WR).

As signals on the side of the hash function processing circuit 330, there are shown the write strobe signal (IP_WRX [1]), the write data signal (TP_WD [31:0]), a first data register value (W0 [31:0]), a sixteenth data register value (W15 [31:0]), the computation start signal (hash_start), the computation status (HSTA), and the write request signal (DREQ_WR).

In response to the write strobe signal (IP_WRX [1]), data from the IPsec control circuit 310 is written into the sixteen data registers that form the 512-bit data register group 334. When the data is written into all of the sixteen registers, it is recognized that data set is completed, and the computation start signal (hash_start) is asserted and the computation status (HSTA) is turned on. The completion of computation is recognized by the 80 counter 322 showing a terminating number, whereupon a computation end signal is outputted, and the computation status (HSTA) is turned off.

It should be noted that each of the data registers forming the 512-bit data register group 334 is formed by a shift register. More specifically, data is written into a first data register of the register group 334 each time, and whenever the write strobe signal is inputted, the value of each data register is shifted to a data register at the next stage. Therefore, a signal for identifying the address of each data register of the 512-bit data register group is not required.

It should be noted that the write request signal (DREQ_WR) sent from the hash function processing circuit 330 to the IPsec control circuit 310 for data request is asserted when the hash function processing circuit 330 is not carrying out computation. More specifically, first, the write request signal (DREQ_WR) is asserted before computation, and deasserted after completion of data writing into the 512-bit data register group 334. When the computation is completed, the write request signal (DREQ_WR) is asserted again.

As shown in FIG. 30, within the hash function processing circuit 330, there exist the hash value storage register 331 for storing the result of computation and the 512-bit data register group 334 for hash computation. According to the configuration of the algorithm, hash function processing is completed after padding a processing unit to a multiple of 512 bits, and processing the processing unit by the hash function at least once, usually several times.

In a first computation, a constant peculiar to the algorithm is used as a hash value, and in a second computation et seq., the preceding result of computation is added to an intermediate result of computation to obtain a result of computation, which is stored in a register within the hash function processing circuit. In the case of packet authentication, hash processing is completed when processing of one packet is executed, and reading from the hash value storage register within the hash function can be conducted at the end. Since the IPsec control circuit 310 performs writing of only data to be processed, there is provided the dedicated bus for the write data signal (IP_WD [31:0]) via which write data is carried from the IPsec control circuit 310 to the hash function processing circuit 330.

In the following, changes of each signal shown in FIG. 38 will be described in a time sequence.

First, at a time t71, the write request signal (DREQ_WR) is deasserted.

At a time t72 (one cycle after the time t71), the write strobe signal (IP_WRX [0]) is asserted, and at the same time, data to be processed is outputted as the write data (IP_WD [31:0]) by the IPsec control circuit 310.

At a time t73 (one cycle after the time t72), the data to be processed which is outputted as the write data signal (IP_WD [31:0]) is set in the first data register (WO [31:0]).

At a time t74 (one cycle after the time t73), the write strobe signal (IP_WRX [0]) is deasserted, and at the same time, the output of the data to be processing as the write data (IP_WD [31:0]) is stopped.

Then, data is repeatedly transferred until data transfer is carried out sixteen times.

At a time t81 when the sixteenth data transfer starts, the write strobe signal (IP_WRX [0]) is asserted, and at the same time, data to be processed is outputted as the write data (IP_WD [31:0]) by the IPsec control circuit 310.

At a time t82 (one cycle after the time t81), the target data outputted as the write data (IP_WD [31:0]) is set in the first data register (WO [31:0]). At the same time, the data units within the 512-bit data register group 334 are sequentially shifted, and the 32-bit data transferred first is stored in the sixteenth data register value (W15 [31:0]).

At a time t83 (one cycle after the time t82), the write strobe signal (IP_WRX [1]) is deasserted, and at the same time, the output of the data to be processed, as the write data (IP_WD [31:0]) is stopped. At this time, it is recognized that the sixteen data writing operations are completed, and the computation start signal (hash_start) is asserted.

At a time t84 (one cycle after the time t83), the computation status (HSTA) is turned on, and the computation start signal (hash_start) is deasserted.

At a time t85 (one cycle after the time t84), the write request signal (DREQ_WR) is asserted, and the hash function processing is executed.

When the number of computations reaches eighty, it is judged that the hash function processing is completed, and at this time t91, the computation status (HSTA) is turned off.

At a time t92 (one cycle after the time t91), the write request signal (DREQ_WR) is deasserted.

As described above, according to the security network controller 300, since the IPsec control circuit 310 performs data input/output to and from the cryptographic processing circuit 320 and the hash function processing circuit 330, processing load on the CPU 301 is reduced.

It should be noted that the ranges of encryption and authentication of communication data vary with communication protocols.

FIGS. 39A and 39B are diagrams useful in explaining the respective ranges of encryption and authentication in the transport mode ESP. FIG. 39A shows an IPv4 packet, while FIG. 39B shows an IPv6 packet.

The IPv4 packet 50 is comprised of an IP) header 51, an ESP header 52, a TCP header 53, data 54, an ESP trailer 55, and an ESP authentication header 56. In the IPv4 packet 50, the TCP header 53, the data 54, and the ESP trailer 55 form the range of encryption. The ESP header 52, the TCP header 53, the data 54, and the ESP trailer 55 form the range of authentication.

The IPv6 packet 60 is comprised of an IPv6 header 61, a routing header 62, an ESP header 63, a destination options header 64, a TCP header 65, data 66, an ESP trailer 67, and an ESP authentication header 68. In the IPv6 packet 60, the destination options header 64, the TCP header 65, the data 66, and the ESP trailer 67 form the range of encryption. The ESP header 63, the destination options header 64, the TCP header 65, the data 66, and the ESP trailer 67 form the range of authentication.

In packet generation using the transport mode ESP, for example, authentication processing using a keyed hash function (HMAC-SHA1 or HMAC-MD5) is carried out for information of a range.

Figure 40:
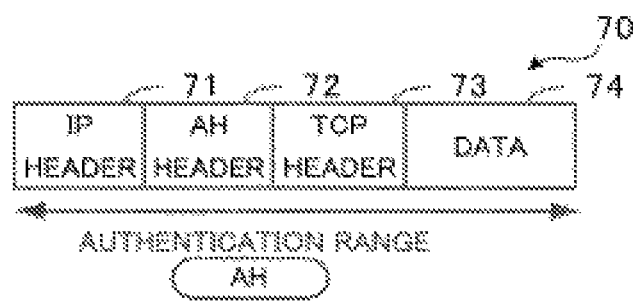
FIG. 40 is a diagram showing an authentication range of AH.

FIG. 40 is a diagram showing an authentication range of the AH (Authentication Header). The configuration of the AH packet 70 is the same as that of the IPv4 or IPv6 packet. The AH packet 70 is comprised of an IP header 71, an AH header 72, a TCP header 73, and data 74. In the AH packet 70, all the elements form the authentication range. In other words, it is required to subject the whole packet to authentication processing using a keyed hash function (HMAC-SHA1 or HMAC-MD5).

Further, the maximum packet size is determined depending on a connection medium of the network. The following description will be given by taking the example of the size of an IP packet generated when a network (IEEE802.3) called Ethernet (registered trademark) is used as the connection medium.

It should be noted that the effects of the present invention will be described by taking the example of authentication processing of one packet when the IEEE802.3 network is used. In the authentication processing, HMAC processing is executed at the start and at the end, and hence, as far as the function is concerned, setting (mode setting concerning whether or not HMAC processing should be executed, or whether the algorithm is MD5 or SHA1) is executed by the CPU, whereafter hardware processing is carried out seamlessly. This makes it possible to reduce load on the CPU and to fully utilize the performance of the hardware. Further, it is also possible to use a DMAC (Direct Memory Access Controller) to carry out authentication processing by the CPU independently.

Figure 41:
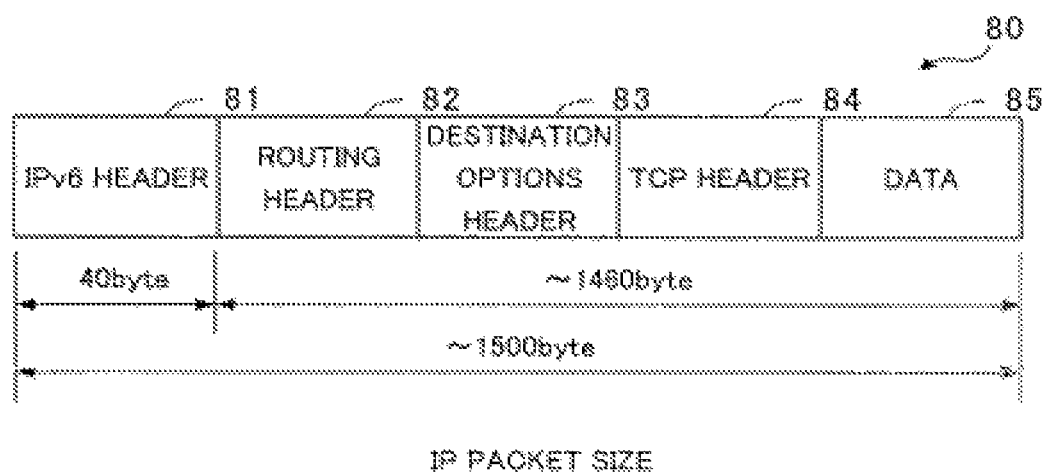
FIG. 41 is a diagram showing the size of an IP packet.

FIG. 41 is a diagram showing the size of an IP packet. As shown in FIG. 41, the IP packet 80 is comprised of an IPv6 header 81, a routing header 82, an destination options header 83, a TCP header 84, and data 85. The maximum size of the IP packet configured as above and generated in the IEEE802.3-compliant network is approximately 1,500 bytes (40 bytes for the IPv6 header and 1,460 bytes or less for the remainder).

The MD5 or SHA1 authentication algorithm used as a hash function is a 64-byte (512-bit) block function. Therefore, even in processing of one packet, hash processing is executed more than twenty times at the maximum. The hash function is also used in key management.

Figure 42:
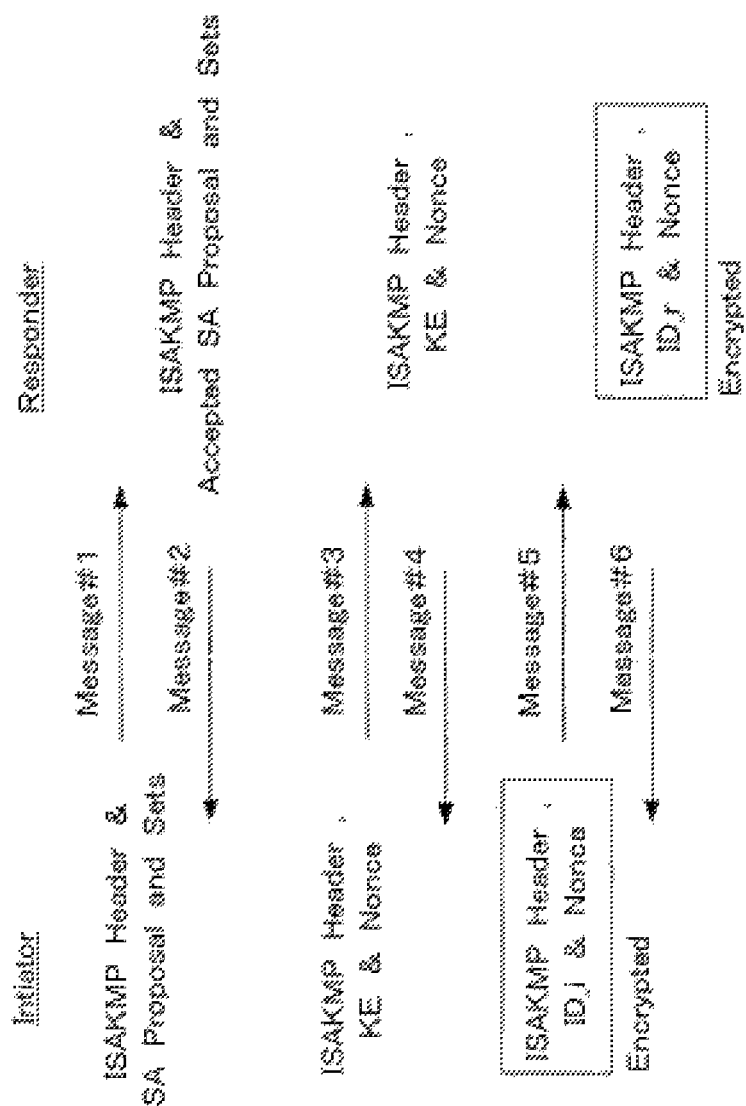
FIG. 42 is a diagram showing a phase 1 using IKE main mode.

FIG. 42 is a diagram showing a phase 1 using IKE main mode. The phase 1 is the first half of a key exchange protocol. FIG. 42 shows messages exchanged between an initiator and a responder. In a first message (Message #1), ISAKMP-SA (source address) negotiation is started. In a second message (Message #2), a basic SA is approved. In a third message (Message #3) and a fourth message (Message #4), the each others' keys are exchanged. In a fifth message (Message #5), the initiator is identified by the responder. In a sixth message (Message #6), the responder is identified by the initiator. It should be noted that the fifth message (Message #5) and the sixth message (Message #6) has encrypted payloads.

The IPsec as an essential function in the IPv6 protocol generates a packet to be sent via the network, in the form of a MAC frame containing an IP packet, after encryption and authentication processing, and then transmits the packet via the communication interface.

Figure 39:
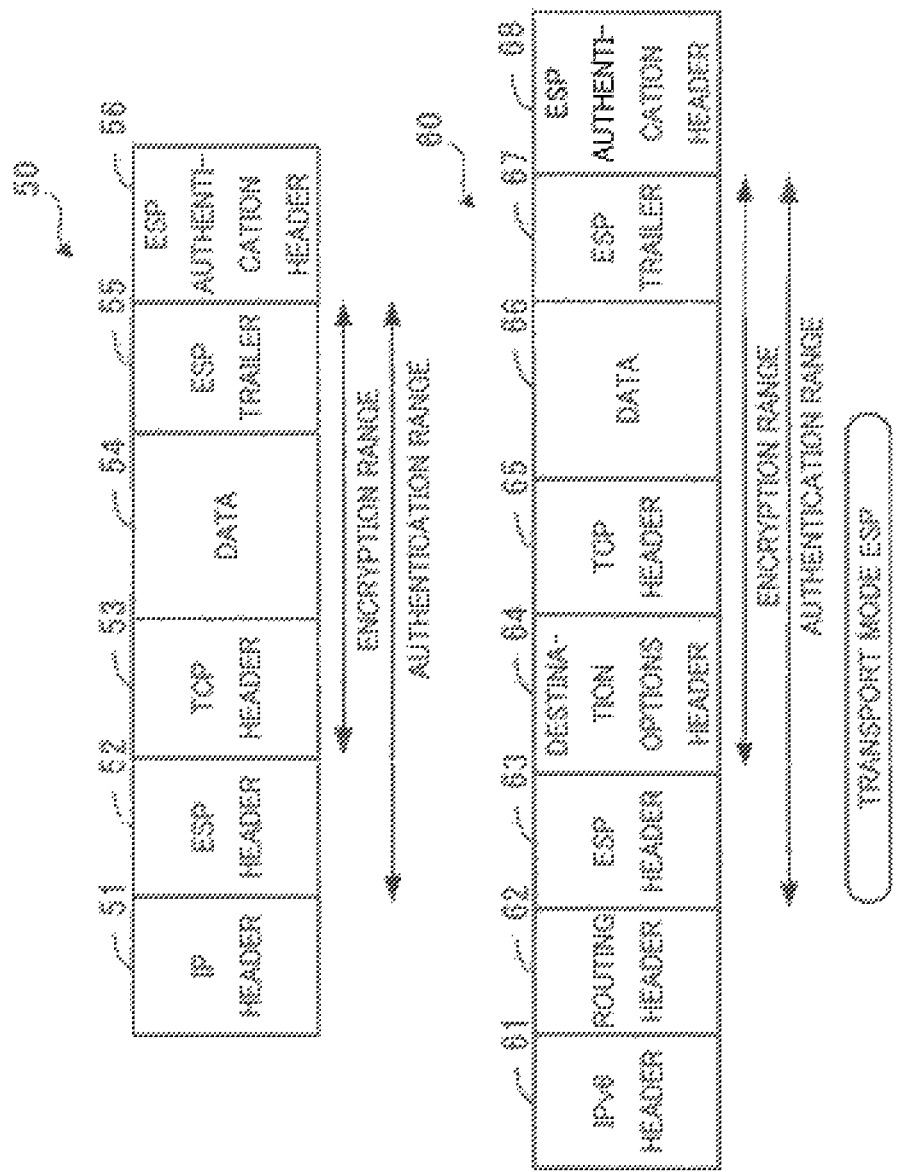

When the packet is received, authentication processing and decryption processing are carried out. The range for decryption processing and the range for authentication processing are as shown in FIG. 39. The encrypted range corresponds to the range for decryption processing to be executed at the time of reception. The term "authentication" is intended here to mean processing of applying hash function processing to the data in the authentication range illustrated in FIG. 39 and adding the processed data to the end of the packet.

When the Ethernet (registered trademark) defined by IEEE802.3 is used as the physical layer of the network, the maximum size of an IP packet is approximately 1,500 bytes. In other words, for authentication by the hash function, processing is executed approximately twenty times at the maximum, and for encryption in a case where DES or 3DES is used as the cryptographic algorithm, cryptographic processing is executed approximately 180 times at the maximum.

Further, as processing in the faze 1 which is the first half of the key exchange protocol shown in FIG. 42, the cryptographic processing is carried out in transmission and reception of each of the first to the sixth messages. Further, in the following faze 2, in a session for establishing SAs, the cryptographic processing and the hash function processing are carried out a large number of times. In the third and the fourth messages, for example, values for key generation are exchanged, and in each case, the exchange values required for key generation are generated by using the hash function and the cryptographic algorithm.

As described above, the cryptographic processing and the hash function processing are used very frequently in IPsec. Consequently, the second embodiment which makes it possible to achieve fast cryptographic processing and hash processing (authentication processing), bypassing the CPU, as described above, is advantageous in enhancing processing capability of a system as a whole. Moreover, since installation of an IPsec control circuit in a security network controller can be realized at a lower cost, compared with increasing the operating speed of a CPU, it is possible to provide a comfortable communication speed at a reasonable price meeting the needs of the market.

FIG. 43 is a diagram showing results of evaluations of performance of the cryptographic processing by the prior art and that of the cryptographic processing by the second embodiment. This is an example of a case where 3DES-CBC cryptographic processing is executed on 1,496-byte data. In the example in FIG. 43, software-based processing (in which a CPU executes a program describing an encryption procedure), processing by a combination of a CPU and a cryptographic processing circuit (in which the CPU controls data input/output) and processing by a combination of an IPsec control circuit and a cryptographic processing circuit (i.e. the configuration according to the second embodiment) are compared.

To be more specific, in the case of software-based processing, the program of the processing, which is coded in the C language and stored in a flush memory, is executed by the CPU. Further, the configuration of the combination of the IPsec control circuit and the cryptographic processing circuit is implemented by a PLD (Programmable Logic Device).

In the software-based processing, it takes 264,917 micro seconds for encryption and 264919 micro seconds for decryption. In the processing by the combination of the CPU and the cryptographic processing circuit, it takes 2977 micro seconds for encryption and 2979 micro seconds for decryption. In the processing by the combination of the IPsec control circuit and the cryptographic processing circuit, it takes 579 micro seconds for encryption and 581 micro seconds for decryption.

FIG. 44 is a diagram showing results of evaluations of performance of the hash function processing by the prior art and that of the hash function processing by the second embodiment. This is an example of a case where HMAC-SHA1 hash function processing is executed on 1500-byte data. In the example in FIG. 44, software-based processing, processing by a combination of a CPU and a hash function processing circuit and processing by a combination of an IPsec control circuit and a hash function processing circuit are compared. It should be noted that the configuration of the combination of the IPsec control circuit and the hash function processing circuit is implemented by a PLD (Programmable Logic Device).

In the software-based processing, it takes 41,309 micro seconds for encryption in the hash function processing. In the processing by the combination of the CPU and the hash processing circuit, it takes 2,258 micro seconds for encryption in the hash function processing. In the processing by the combination of the IPsec control circuit and the hash processing circuit, it takes 297 micro seconds for encryption in the hash function processing.

As described above, the actual processing performance was evaluated as to the 3DES-CBC cryptographic processing and the HMAC-SHA1 processing. As a result, in the 3DES-CBC cryptographic processing, the application of the second embodiment thereto makes it possible to achieve approximately 457 times faster process speed, compared with the conventional software-based processing. Further, the application of the second embodiment thereto makes it possible to achieve approximately 5 times faster processing speed, compared with the processing by a combination of the dedicated cryptographic circuit and the CPU.

In the HMAC-SHA1 hash function processing, the application of the second embodiment thereto makes it possible to achieve approximately 139 times faster processing speed, compared with the software-based processing. Further, the application of the second embodiment thereto makes it possible to achieve approximately 8 times faster processing speed, compared with the processing executed by the dedicated hash function processing circuit and the CPU.

As described above, according to the second embodiment, it is possible to perform secure data communication at a very high speed. Therefore, even in streaming distribution of moving image data, it is possible to stably transmit/receive secure data.

Further, since the cryptographic processing circuit 320 and the hash function processing circuit 330 monitor the volume of inputted data and automatically start encryption and authentication processing when a predetermined volume of data has been written, it is possible to start the processing without applying load to the CPU and other components. This is especially effective when data to be processed is continuously inputted like streaming data.

Furthermore, the cryptographic processing circuit 320 and the hash function processing circuit 330 automatically recognize timing for starting processing using a hardware macro, and the IPsec control circuit 310 continuously supplies data to be processed by cryptographic processing and authentication processing without a break via the respective dedicated buses, in place of the CPU 301. This makes it possible to realize seamless encryption and authentication processing, and to make the most of the processing capabilities of the cryptographic processing circuit 320 and the hash function processing circuit 330.

As a result, even with a low-performance CPU (e.g. with a low operation frequency), high-speed processing in consideration of streaming can be achieved. If a low-speed CPU is employed, lower power consumption and low-cost manufacturing can be easily achieved.

Moreover, since a large work memory area of the CPU 301 is not occupied, processing efficiency of other processing executed by the CPU 301 is enhanced. Further, the CPU occupation rate for cryptographic processing and authentication processing is reduced, when employed as a part of a system, it is possible to ensure secure performance. It is also possible to realize a network service using IPsec, which is provided at a comfortable communication speed.

Third Embodiment

A third embodiment is provided for making it possible to perform parallel processing of cryptographic processing and hash function processing.

Figure 45:
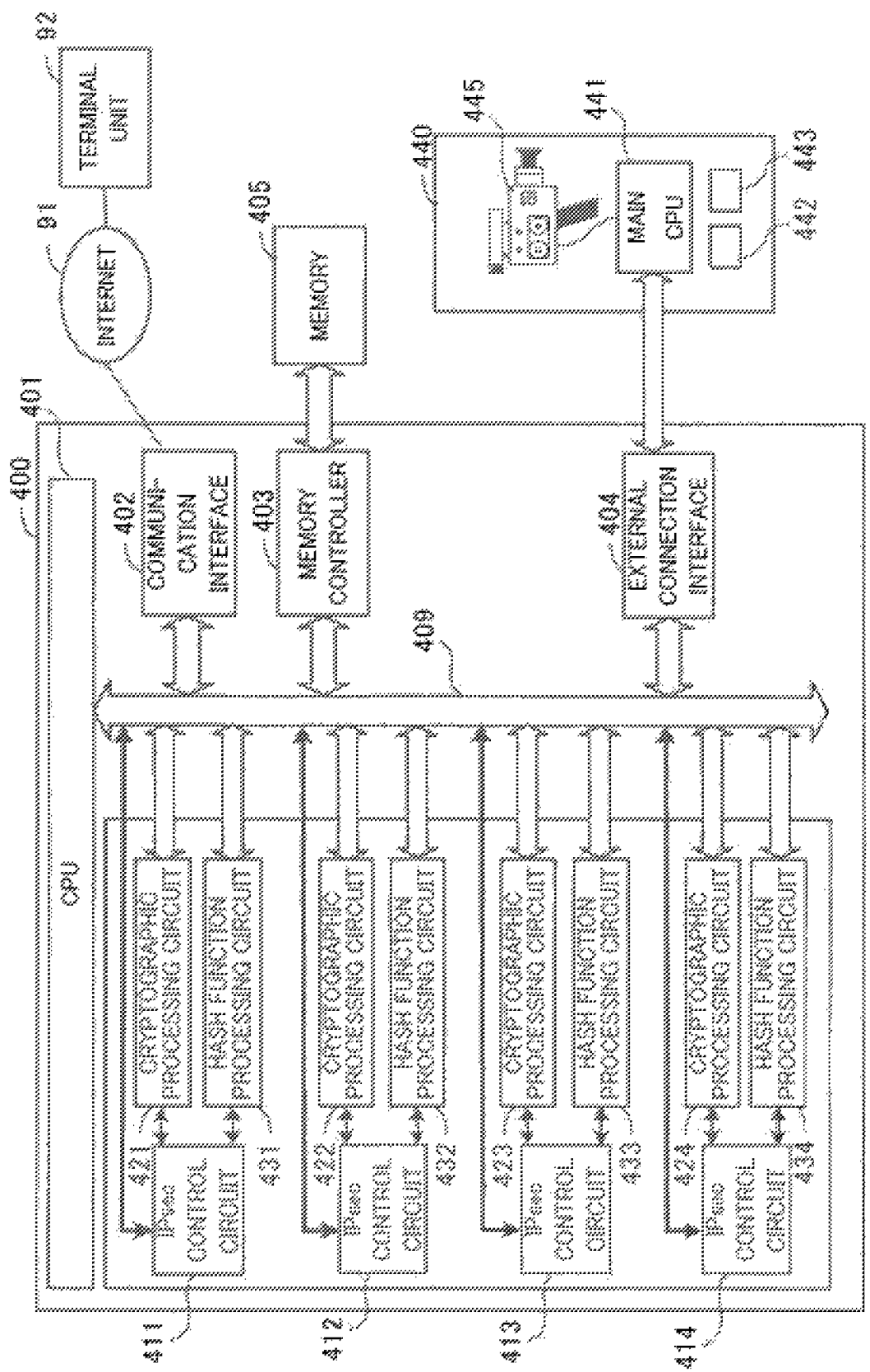
FIG. 45 is a diagram showing an example of the system configuration of a third embodiment of the present invention.
Figure 46:
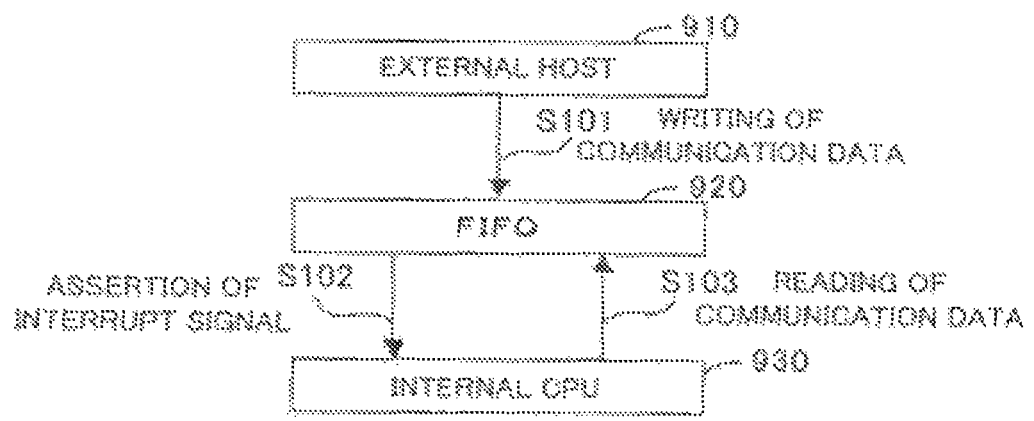
FIG. 46 is a conceptual view showing a method employed by the internal CPU in receiving data from the external host.
Figure 47:
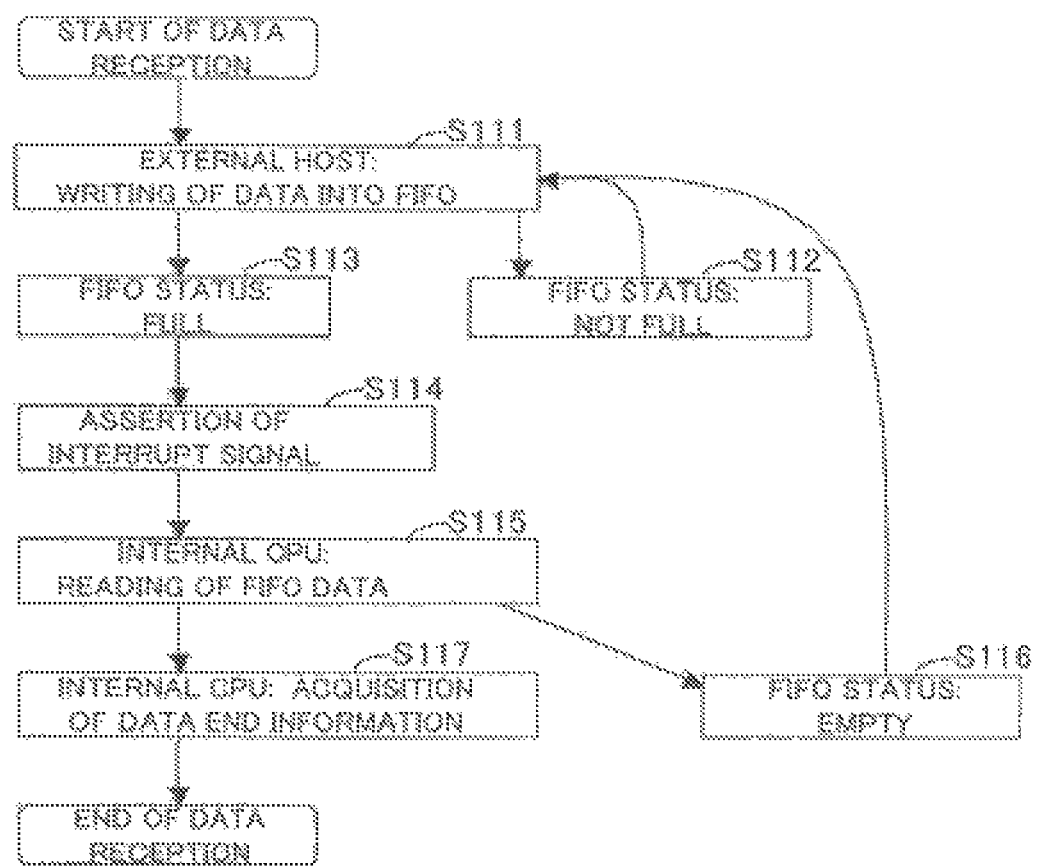
FIG. 47 is a flowchart showing the procedure of operations executed in a process for receiving data from the external host by the internal CPU.
Figure 48:
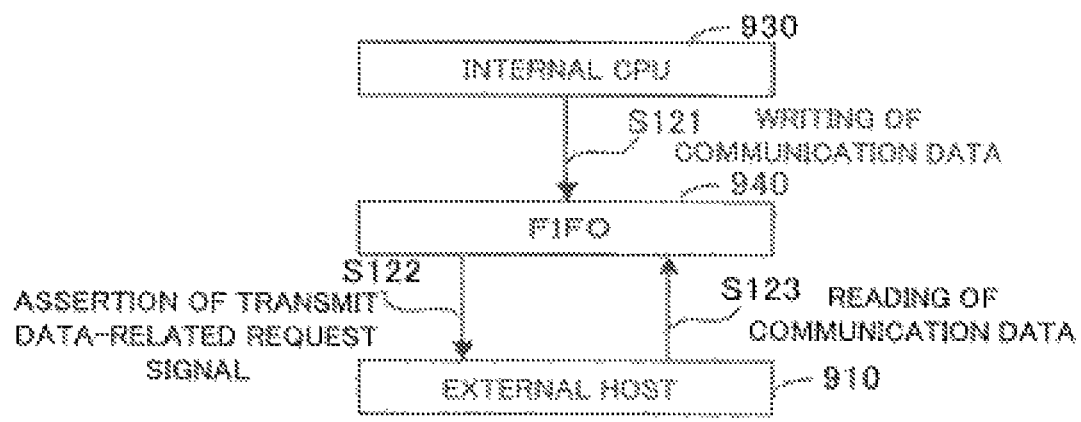
FIG. 48 is a conceptual view showing a method employed by the internal CPU for transmitting data to the external host.
Figure 49:
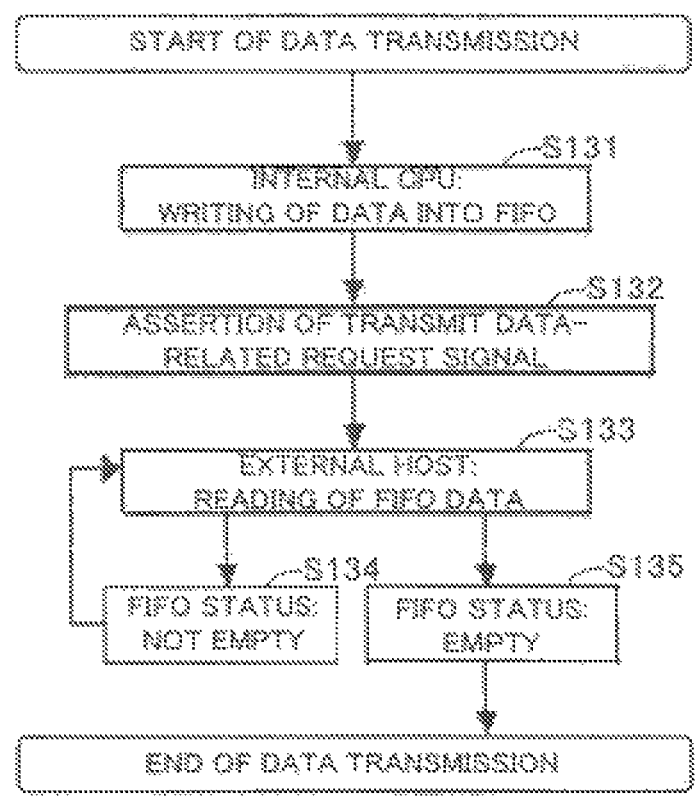
FIG. 49 is a flowchart showing the procedure of operations executed in a process for transmitting data to the external host by the internal CPU.

FIG. 45 is a diagram showing an example of the system configuration of a third embodiment. A security network controller 400 according to the third embodiment is comprised of a CPU 401, a communication interface 402, a memory controller 403, an external connection interface 404, a plurality of IPsec control circuits 411 to 414, a plurality of cryptographic processing circuits 421 to 424, and a plurality of hash function processing circuits 431 to 434. These components are connected by a bus 409.

The IPsec control circuit 411 is connected to the cryptographic processing circuit 421 and the hash function processing circuit 431 via respective dedicated buses. The IPsec control circuit 412 is connected to the cryptographic processing circuit 422 and the hash function processing circuit 432 via respective dedicated buses. The IPsec control circuit 413 is connected to the cryptographic processing circuit 423 and the hash function processing circuit 433 via respective dedicated buses. The IPsec control circuit 414 is connected to the cryptographic processing circuit 424 and the hash function processing circuit 434 via respective dedicated buses.

The communication interface 402 is connected to a terminal unit 92 via the Internet 91. The memory controller 403 is connected to a memory 405. The external connection interface 404 is connected to a main CPU 441 within a camera system 440. The main CPU 441 controls circuits 442 and 443 and a camera mechanism section 445 within the camera system 440.

As described above, in the third embodiment, the circuit for performing the cryptographic processing and the authentication processing is multiplexed. In the example illustrated in FIG. 45, there are provided four sets of circuits each for the cryptographic processing and authentication processing.

Data to be processed is allocated to the plurality of IPsec control circuits 411 to 414. Each of the IPsec control circuits 411 to 414 controls the cryptographic processing and hash function processing of the allocated data.

Through multiplexing of the circuits as described above, it is possible to process the data at a high speed when there are a lot of data to be subjected to the cryptographic processing and the hash function processing. Further, also when a very high speed performance is required in transferring data (e.g. in transferring a printer image, e.g. at 500 to 1000 Mbps), it is possible to obtain a desired processing speed by multiplexing the circuits. Although the processing performance of the security network controller 400 is enhanced by enhancing the processing power of the CPU 401, the increase in the processing speed of the CPU 401 demands a very highly sophisticated manufacturing technique, which results in the increased manufacturing costs of the circuits. If the circuit for performing the cryptographic processing and the hash function processing is multiplexed as shown in FIG. 45, it is possible to carry out the cryptographic processing and the hash function processing in parallel with each other even with a CPU not high in performance, whereby the speed at which each packet of data is processed is increased. Approximate calculation shows that the multiplexed circuit can perform the processing at a speed four times as fast as that of a non-multiplexed circuit.

Although in the above second and third embodiments, the security network controllers 300 and 400 are mounted in the camera systems 30 and 440, respectively, by way of example, the same security network controllers can be mounted on the sides of the terminal units 30 and 92, respectively.

Further, the security network controller 300 may be externally connected to a device or apparatus to be controlled, such as the camera system 30. Even without input means, such a configuration makes it possible to control the camera system 30 via the Internet 31. Moreover, by incorporating only the security network controller according to the second or third embodiment in a device or apparatus without changing the existing circuits thereof, it is possible to connect the same to various kinds of devices and apparatuses via the Internet to realize secure and convenient services provided at a comfortable communication speed using the IPsec function.

Although in the above second and third embodiments, the cryptographic processing (encryption or decryption) and the authentication processing (e.g. the hash function processing) are carried out on data to be transmitted or received, by way of example, this is not limitative, but the present invention may be applied to a security network controller for performing only one of the cryptographic processing and the authentication processing. In a security network controller for performing only the cryptographic processing, the hash function processing circuit is dispensed with, whereas in a security network controller for performing only the authentication processing, the cryptographic processing circuit is dispensed with.

Further, although in the above second and embodiments, data to be processed is once stored in a memory, and the IPsec control circuit 310 obtains the data from the memory by DMA transfer, this is not limitative, but when the IPsec control circuit 310 includes a built-in or internal memory having a sufficient capacity, it is also possible to directly store the data into the IPsec control circuit 310 from the communication interface 305 or the like.

As described hereinbefore, according to the present invention, data to be processed is obtained via the first bus, stored in the internal memory of the data input/output control circuit, and inputted to the cryptographic processing circuit via the second bus. Therefore, once the data to be processed is stored in the internal memory of the data input/output control circuit, it is possible to carry out cryptographic processing on the data without operation of the CPU or using the first bus, which reduces processing load on the CPU controlling the system.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A data security device, comprising:
    a data input/output control circuit configured to couple with a first central processing unit (CPU) and a memory via a first bus;
    a cryptographic processing circuit coupled to the data input/output control circuit via a second bus, the second bus dedicated to data transfer between the data input/output control circuit and the cryptographic processing circuit, the cryptographic processing circuit to provide encryption and decryption processing; and
    an authentication processing circuit coupled to the data input/output control circuit via a third bus, the third bus dedicated to data transfer between the data input/output control circuit and the authentication processing circuit, the authentication processing circuit configured to generate authentication data,
    wherein data input/output control circuit is configured to transfer first data between the data input/output control circuit and the memory via the first bus without using the first CPU, transfer second data to and from the cryptographic processing circuit via the second bus without using the third bus, and transfer third data to and from the authentication processing circuit via the third bus without using the second bus.

2. The data security device of claim 1, comprising a direct memory access controller coupled to the data input/output control circuit, wherein the direct memory access controller is configured to transfer the first data between the data input/output control circuit and the memory via the first bus without using the first CPU.

3. The data security device of claim 1, wherein the first bus is an external bus to the data security device and the second and third busses are internal busses to the data security device.

4. The data security device of claim 1, wherein the transfer of second data between the data input/output control circuit and the cryptographic processing circuit comprises transfer of encrypted first data or decrypted first data without using the first bus, wherein the input/output control circuit is configured to transfer the encrypted first data or decrypted first data to the memory.

5. The data security device of claim 4, wherein the authentication processing circuit is configured to perform hash processing on the encrypted first data to generate hashed encrypted data.

6. The data security device of claim 5, wherein the first CPU is configured to access the memory via the first bus to transfer the decrypted first data to a second CPU.

7. The data security device of claim 1, wherein the transfer of third data between the data input/output control circuit and the authentication processing circuit comprises transfer of hashed encrypted data without using the first bus, wherein the input/output control circuit is configured to transfer the hashed encrypted data to the memory.

8. The data security device of claim 7, wherein the first CPU is configured to access the memory via the first bus to authenticate the hashed encrypted data.

9. The data security device of claim 7, wherein the first CPU is configured to access the memory via the first bus to transfer the hashed encrypted data to a computer network.

10. The data security device of claim 1 further comprising an external connection interface coupled to the first bus and coupled to a second CPU that is external to the device, wherein the external connection interface is configured to transfer the first data between the second CPU and the memory via the first bus.

11. The device of claim 1 further comprising a communication interface coupled to the first bus and coupled to an external computer network, wherein the communication interface is configured to transfer the first data between the external computer network and the memory via the first bus.

12. The device of claim 11, wherein the external computer network includes the Internet.

13. A method of a data security device comprising:
    using a direct memory access controller, transferring first data from a memory to an input/output control circuit via a first bus;
    transferring the first data from the input/output control circuit to an authentication processing circuit via a second bus, without using the first bus and without using a third bus;
    using the authentication processing circuit, generating authentication data based on the first data;
    transferring the first data from the input/output control circuit to a cryptography processing circuit via a third bus, without using the first bus and without using the second bus;
    responsive to authentication of the first data by a first central processing unit (CPU) coupled to the first bus, using the cryptography processing circuit, decrypting the first data; and
    using the direct memory access controller, transferring the decrypted first data from the input/output control circuit to the memory via the first bus.

14. The method of claim 13, further comprising using a communication interface, transferring the first data from a computer network to the memory via the first bus, wherein the computer network is external to the data security device.

15. The method of claim 13, further comprising using an external connection interface, transferring the decrypted first data from the memory to a second CPU via the first bus, wherein the second CPU is external to the data security device.

16. The method of claim 13 further comprising using the input/output control circuit, transferring hashed encrypted first data as the generated authentication data from the authentication processing circuit to the input/output control circuit via the second bus, without using the first bus, and using the direct memory access controller to transfer the authentication data from the input/output control circuit to the memory via the first bus.

17. The method of claim 13, further comprising:
using an external connection interface transferring the first data from a second CPU to the memory via the first bus, wherein the second CPU is external to the data security device;
using the cryptography processing circuit, encrypting the first data;
using the authentication processing circuit, performing a hash function on the encrypted first data; and
using the direct memory access controller, transferring the hashed encrypted first data from the input/output control circuit to the memory via the first bus.

18. The method of claim 17, further comprising using a communication interface, transferring the hashed encrypted first data from the memory to a computer network via the first bus, wherein the computer network is external to the data security device.

19. The method of claim 18, wherein transferring the hashed encrypted first data to a computer network comprises using the first CPU to packetize the hashed encrypted first data.

20. The method of claim 17, comprising using the input/output control circuit, transferring the encrypted first data from the cryptography processing circuit to the input/output control circuit via the third bus, without using the first bus.

* * * * *